(12) United States Patent
Rhodes et al.

(10) Patent No.: US 10,682,638 B2
(45) Date of Patent: Jun. 16, 2020

(54) CATALYST NANOARCHITECTURES WITH HIGH ACTIVITY AND STABILITY

(71) Applicant: Texas State University, San Marcos, TX (US)

(72) Inventors: Christopher P. Rhodes, San Marcos, TX (US); Jose Fernando Godinez-Salomon, Austin, TX (US)

(73) Assignee: Texas State University—San Marcos, San Marcos, TX (US)

( * ) Notice: Subject to any disclaimer, the term of this patent is extended or adjusted under 35 U.S.C. 154(b) by 139 days.

(21) Appl. No.: 15/789,651

(22) Filed: Oct. 20, 2017

(65) Prior Publication Data

US 2018/0154346 A1    Jun. 7, 2018

Related U.S. Application Data

(60) Provisional application No. 62/411,161, filed on Oct. 21, 2016.

(51) Int. Cl.
*B01J 35/10* (2006.01)
*B01J 23/40* (2006.01)
(Continued)

(52) U.S. Cl.
CPC ........... *B01J 35/1061* (2013.01); *B01J 23/40* (2013.01); *B01J 23/48* (2013.01); *B01J 23/892* (2013.01);
(Continued)

(58) Field of Classification Search
CPC ... B01J 23/40; B01J 23/48; B01J 23/70; B01J 23/72; B01J 23/74; B01J 23/745;
(Continued)

(56) References Cited

U.S. PATENT DOCUMENTS 6,162,530 A * 12/2000 Xiao .................... B82Y 30/00
428/292.1
7,094,499 B1 * 8/2006 Hung ...................... H01B 1/04
252/182.1
(Continued)

OTHER PUBLICATIONS

Huang et al. ( Highly Active and Durable Methanol Oxidation Electrocatalyst based on the Synergy of Platinum-Nickel Hydroxide-graphene, Nature Communications, 2015, 6:10035, p. 1-8).*

(Continued)

*Primary Examiner* — Jun Li
(74) *Attorney, Agent, or Firm* — Kowert, Hood, Munyon, Rankin & Goetzel, P.C.; Mark R. DeLuca

(57) ABSTRACT

In some embodiments, a method may include forming a catalytic nanoarchitecture. The method may include heating a non-catalytic metal compound within a specified temperature range and atmosphere in the presence of a catalytic metal. In some embodiments, heating the non-catalytic metal may include heating within a hydrogen-containing atmosphere. The method may include transforming a first architecture of the non-catalytic metal to a second architecture. The second architecture may include openings in the second architecture. The method may include incorporating the catalytic metal into the openings in the second architecture such that the catalytic metal is integrated into the second architecture. In some embodiments, the method may include increasing a catalytic activity of the catalytic metal by integrating the catalytic metal into the second architecture.

19 Claims, 35 Drawing Sheets

(51) Int. Cl.

| | | |
|---|---|---|
| *B01J 23/48* | (2006.01) | |
| *B01J 35/00* | (2006.01) | |
| *B01J 35/02* | (2006.01) | |
| *B01J 23/89* | (2006.01) | |
| *B01J 37/08* | (2006.01) | |
| *B01J 37/16* | (2006.01) | |
| *B01J 37/02* | (2006.01) | |
| *B82Y 40/00* | (2011.01) | |
| *B82Y 30/00* | (2011.01) | |

(52) U.S. Cl.
CPC .......... *B01J 35/002* (2013.01); *B01J 35/006* (2013.01); *B01J 35/0013* (2013.01); *B01J 35/0033* (2013.01); *B01J 35/0053* (2013.01); *B01J 35/023* (2013.01); *B01J 35/1014* (2013.01); *B01J 35/1057* (2013.01); *B01J 35/1066* (2013.01); *B01J 37/0217* (2013.01); *B01J 37/08* (2013.01); *B01J 37/16* (2013.01); *B82Y 30/00* (2013.01); *B82Y 40/00* (2013.01); *C01P 2002/72* (2013.01); *C01P 2004/03* (2013.01)

(58) Field of Classification Search
CPC ...... B01J 23/75; B01J 23/755; B01J 35/1061; B01J 23/892; B01J 35/1066; B01J 37/0217; B01J 37/08; B01J 37/16; B82Y 30/00; B82Y 40/00
See application file for complete search history.

(56) References Cited

U.S. PATENT DOCUMENTS

| | | | |
|---|---|---|---|
| 8,895,206 B2 | 11/2014 | Erlebacher et al. | |
| 9,680,160 B2 | 6/2017 | Yan et al. | |
| 2007/0056659 A1 | 3/2007 | Mirkin et al. | |
| 2007/0151456 A1* | 7/2007 | Ovshinsky | C01G 53/04 96/108 |
| 2008/0164239 A1 | 7/2008 | Mirkin et al. | |
| 2012/0116094 A1* | 5/2012 | Swager | A24D 3/163 548/256 |
| 2012/0175585 A1 | 7/2012 | Banin et al. | |
| 2013/0211106 A1* | 8/2013 | El-Shall | B01J 19/126 549/445 |
| 2013/0240439 A1* | 9/2013 | Pradeep | B01J 20/06 210/502.1 |
| 2013/0260282 A1 | 10/2013 | Yan et al. | |
| 2014/0138585 A1* | 5/2014 | Moon | B01J 37/0219 252/373 |
| 2014/0326611 A1 | 11/2014 | Yan et al. | |
| 2015/0119581 A1* | 4/2015 | Loh | B01J 21/18 549/59 |
| 2015/0132684 A1* | 5/2015 | Huang | H01M 4/921 429/532 |
| 2015/0236355 A1 | 8/2015 | Yang et al. | |
| 2015/0360952 A1* | 12/2015 | Fan | H01G 11/86 252/506 |
| 2016/0043384 A1* | 2/2016 | Zhamu | H01M 4/587 429/231.4 |
| 2016/0126562 A1 | 5/2016 | Pivovar et al. | |
| 2016/0379764 A1* | 12/2016 | Tour | H01G 11/30 429/223 |

OTHER PUBLICATIONS

Kappe (How to Measure Reaction Temperature in Microwave-heated Transformations, Chem. Soc. Rev., 2013, vol. 42, p. 4977-4990).*
( Ultrathin Platinum Nanowires Grown on Single-layered Nickel Hydroxide with High Hydrogen Evolution Activity, Nature Communications, 2015, 6:6430, p. 1-8).*
Harvey et al., Production of Ni(OH)2 nanosheets by liquid phase exfoliation: from optical to electrochemical application, Journal of Materials Chemistry A, Jun. 21, 2016, vol. (4), p. 11046-11059.*
Zhang et al., (β-Nickel Hydroxide Nanosheets and Their Thermal Decomposition to Nickel Oxide Nanosheets, J. Phys. Chem. B., 2004, 108, 11, p. 3488-3491.*
Pan, Synthesis of Ag/NiO composite nanosheets and empty microspheres and their highly effetive electrocatalytic properties, J. Sol-Gel Sci. Technol(2014) 72, p. 161-170.*
Alia, S. M. et al. "Exceptional Oxygen Reduction Reaction Activity and Durability of Platinum-Nickel Nanowires through Synthesis and Post-Treatment Optimization", ACS Omega 2017, 2, 1408-1418.
Chen, C et al. "Highly Crystalline Multimetallic Nanoframes with Three-Dimensional Electrocatalytic Surfaces", Science vol. 343 Mar. 21, 2014, 1339-1343.
Hong, J. W. et al. "Ultrathin Free-Standing Ternary-Alloy Nanosheets", Angew. Chem. Int. Ed. 2016, 55, 2753-2758.
Li, Y. et al. "Ultrathin Two-Dimensional Pd-Based Nanorings as Catalysts for Hydrogenation with High Activity and Stability", small 2015, 11, No. 36, 4745-4752.
Jia, Q. Y. et al. "Activity Descriptor Identification for Oxygen Reduction on Platinum-Based Bimetallic Nanoparticles: In Situ Observation of the Linear Composition-Strain-Activity Relationship", ACS Nano 2015, 9, 387-400.
Stamenkovic, V. R. et al. "Improved Oxygen Reduction Activity on Pt3Ni(111) via Increased Surface Site Availability", Science 2007, 315, 493-497.
Oh, A. et al. "Skeletal Octahedral Nanoframe with Cartesian Coordinates via Geometrically Precise Nanoscale Phase Segregation in a Pt@Ni Core-Shell Nanocrystal", ACS Nano 2015, 9, 2856-2867.
Chen, Z. W. et al. "Supportless Pt and PtPd Nanotubes as Electrocatalysts for Oxygen-reduction Reactions", Angew. Chem. Int. Ed. 2007, 46, 4060-4063.
Nong, H. N. et al. "Oxide-Supported IrNiOx Core-Shell Particles as Efficient, Cost-Effective, and Stable Catalysts for Electrochemical Water Splitting", Angewandte Chemie-International Edition 2015, 54, 2975-2979.
Moghaddam, R. B. et al. "Easily prepared, high activity Ir—Ni oxide catalysts for water oxidation", Electrochem. Commun. 2015, 60, 109-112.
Lim, J. et al. "Shaped Ir—Ni bimetallic nanoparticles for minimizing Ir utilization in oxygen evolution reaction", Chem. Commun. 2016, 52, 5641-5644.

* cited by examiner

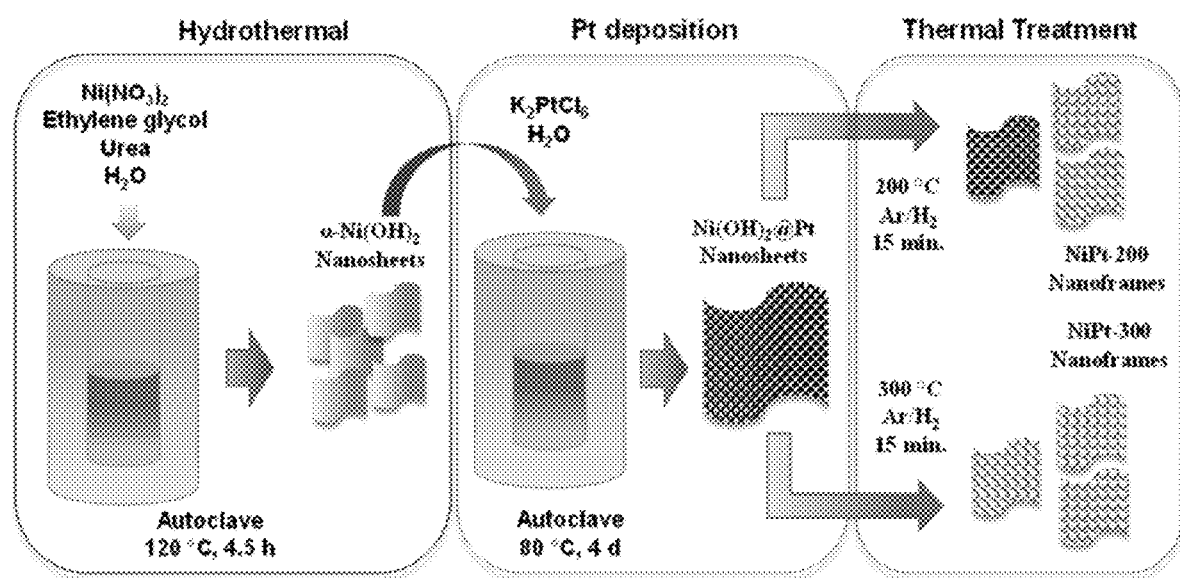
FIG. 1A
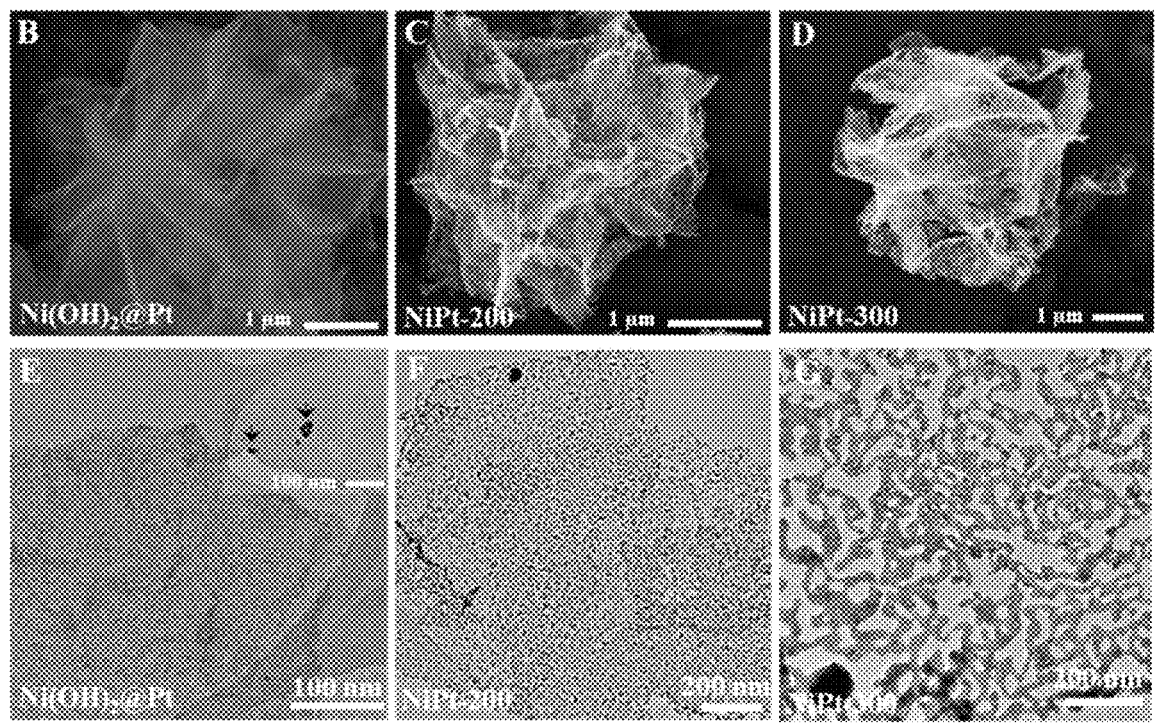
FIGS. 1B-G

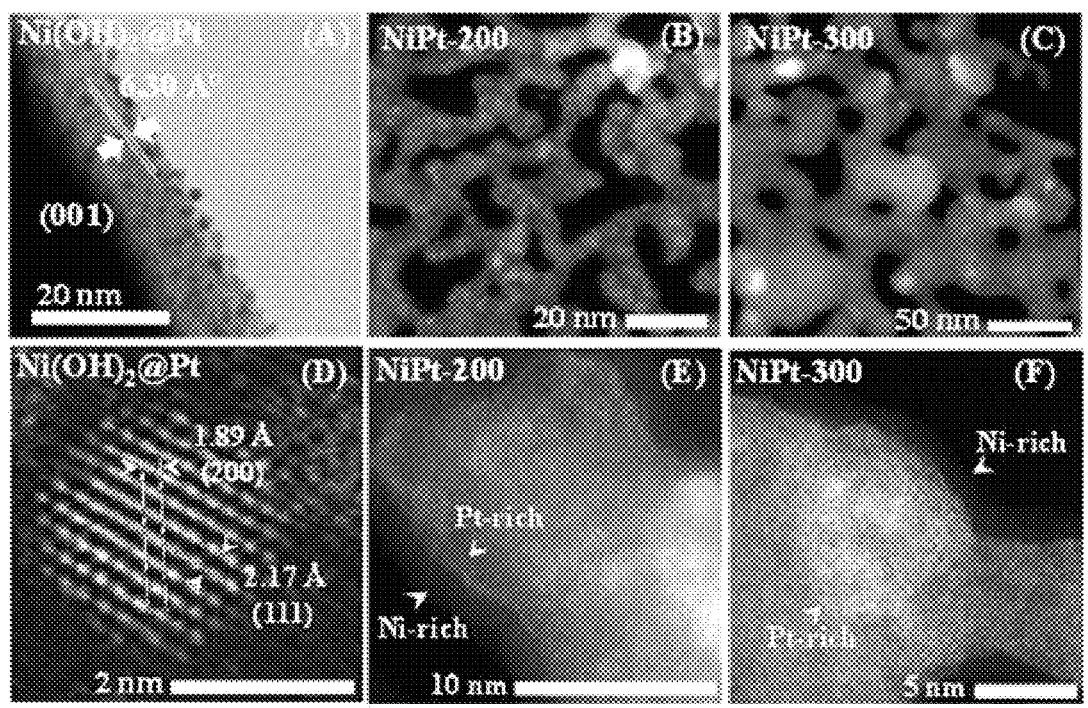
FIGS. 2A-F
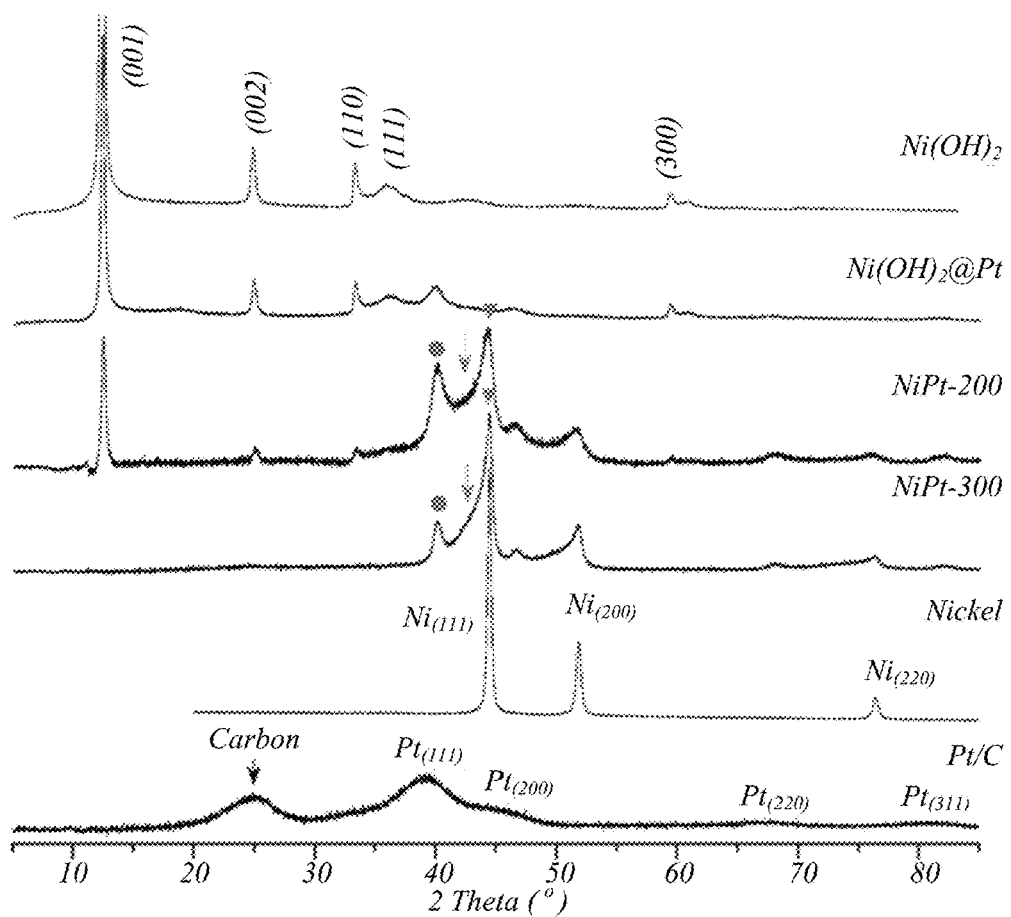
FIG. 3

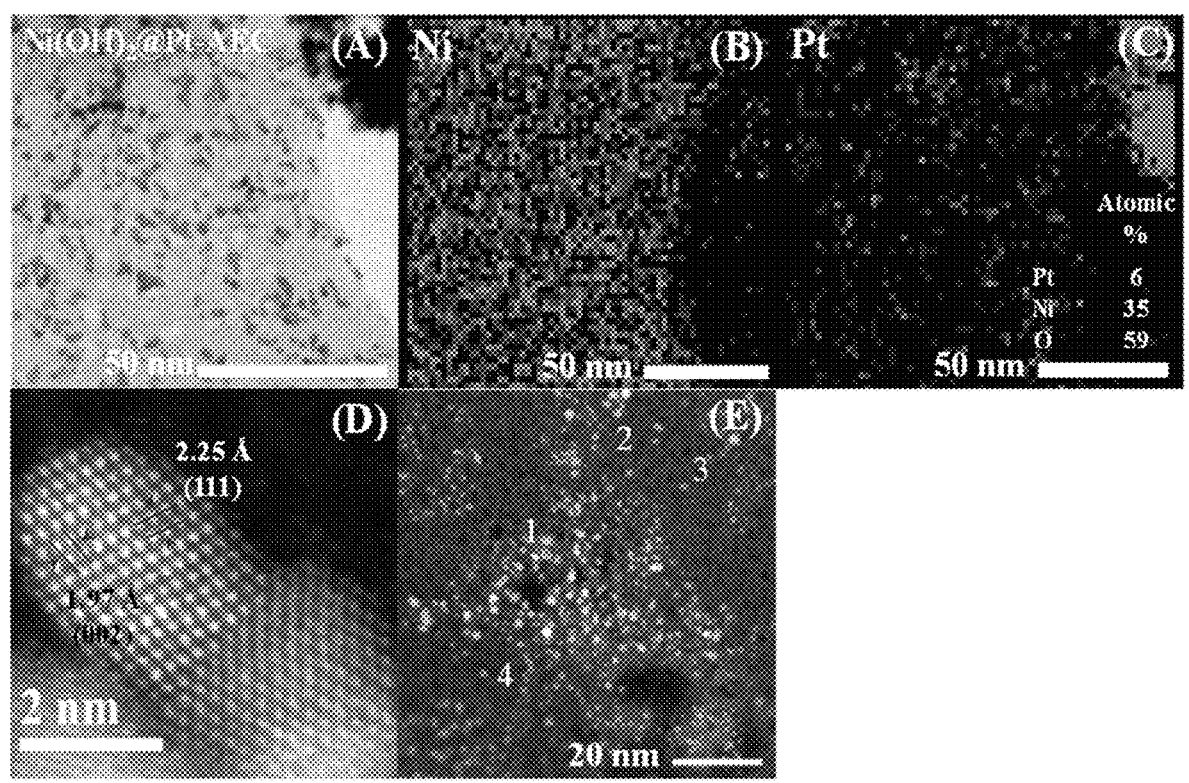
FIGS. 4A-E
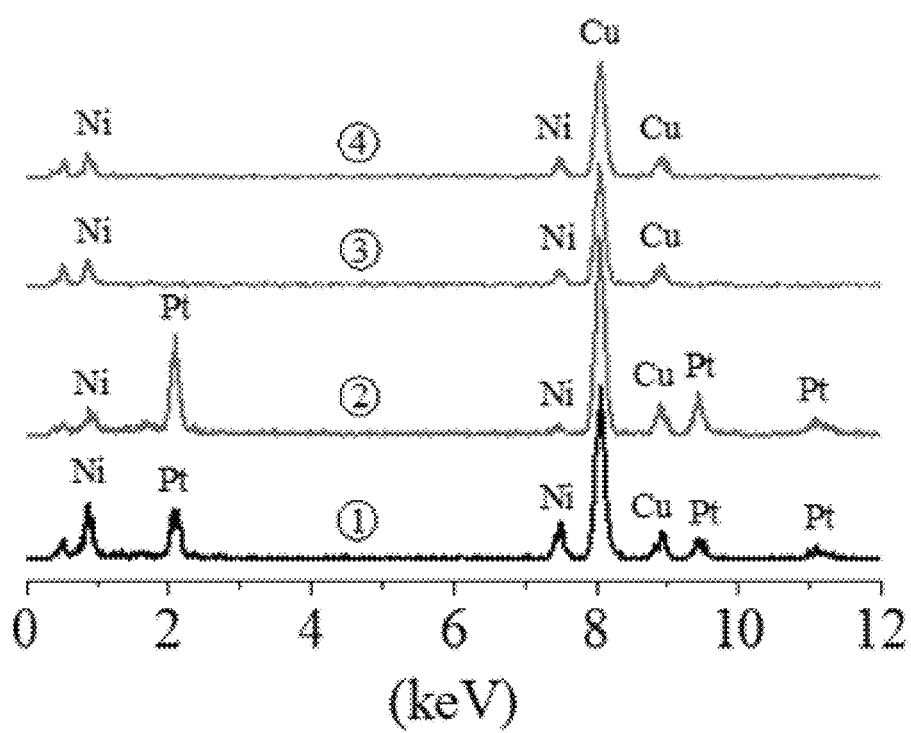
FIG. 4F

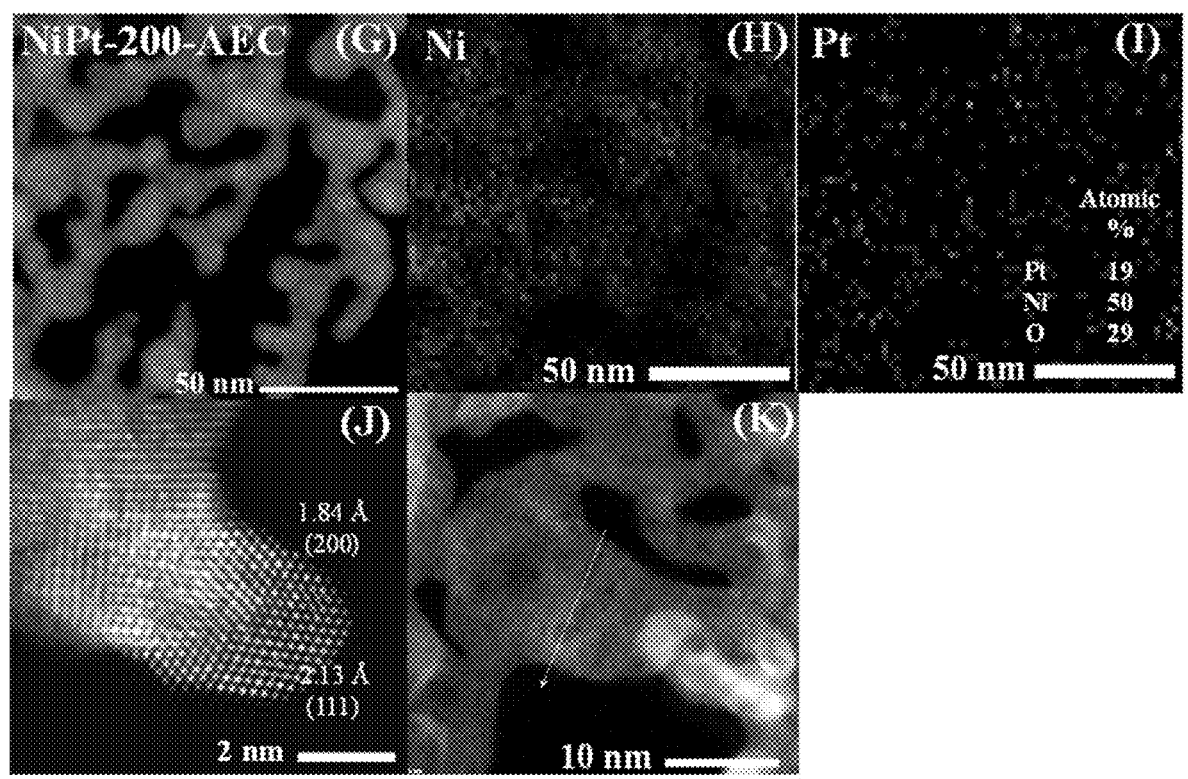
FIGS. 4G-K
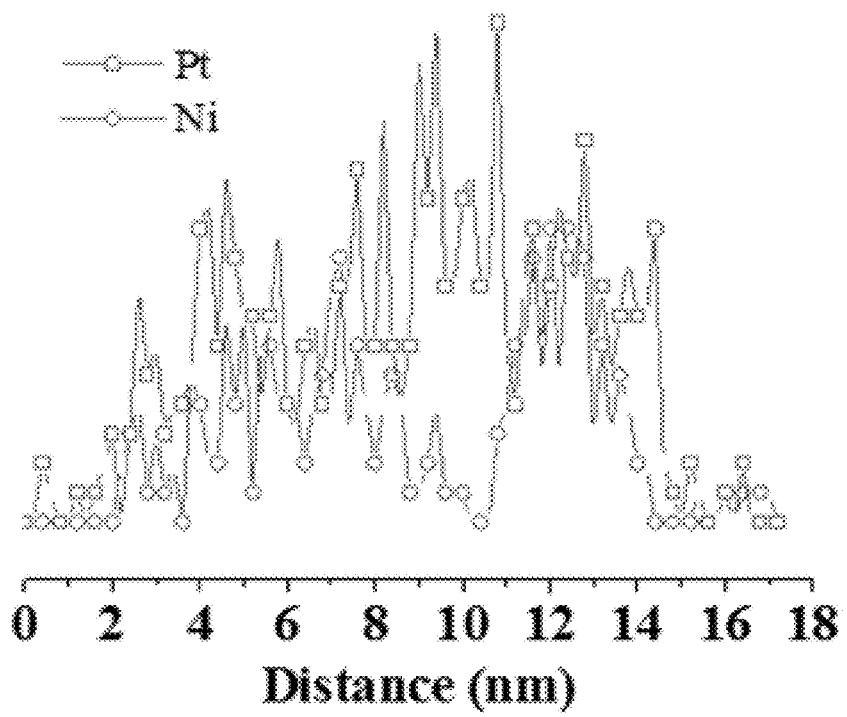
FIG. 4L

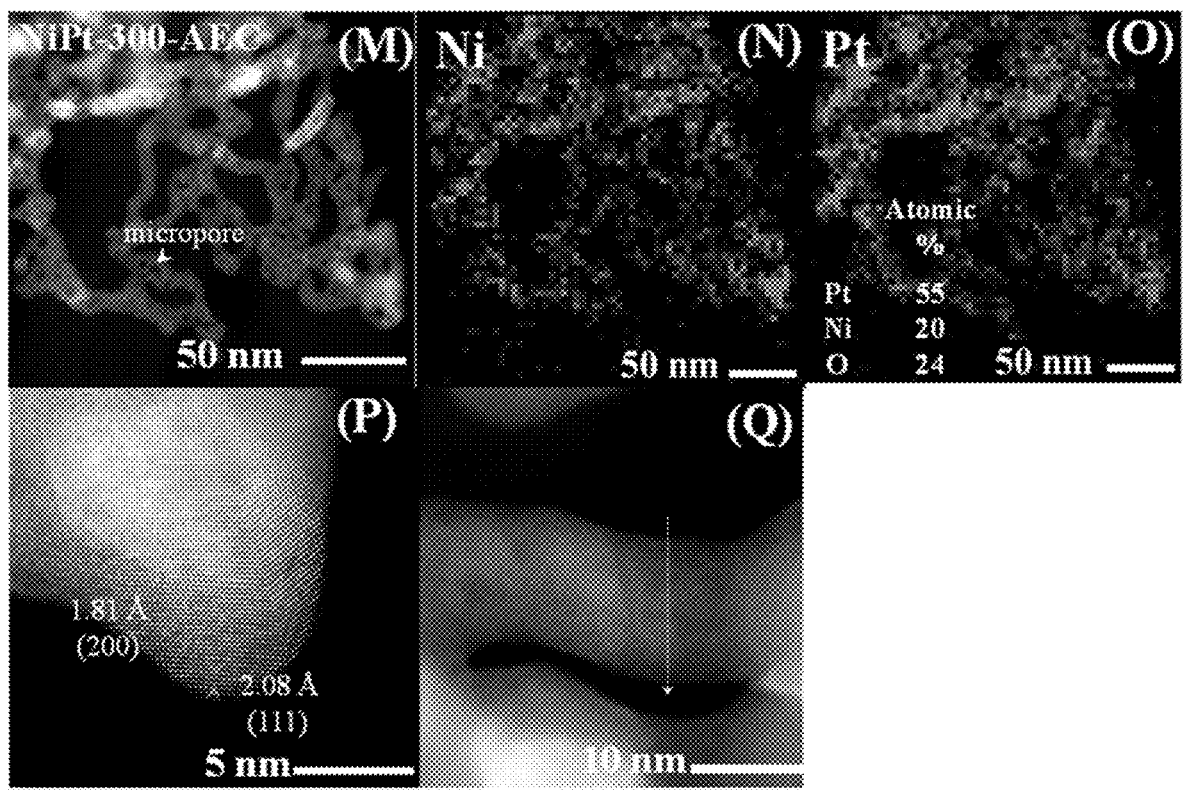
FIGS. 4M-Q
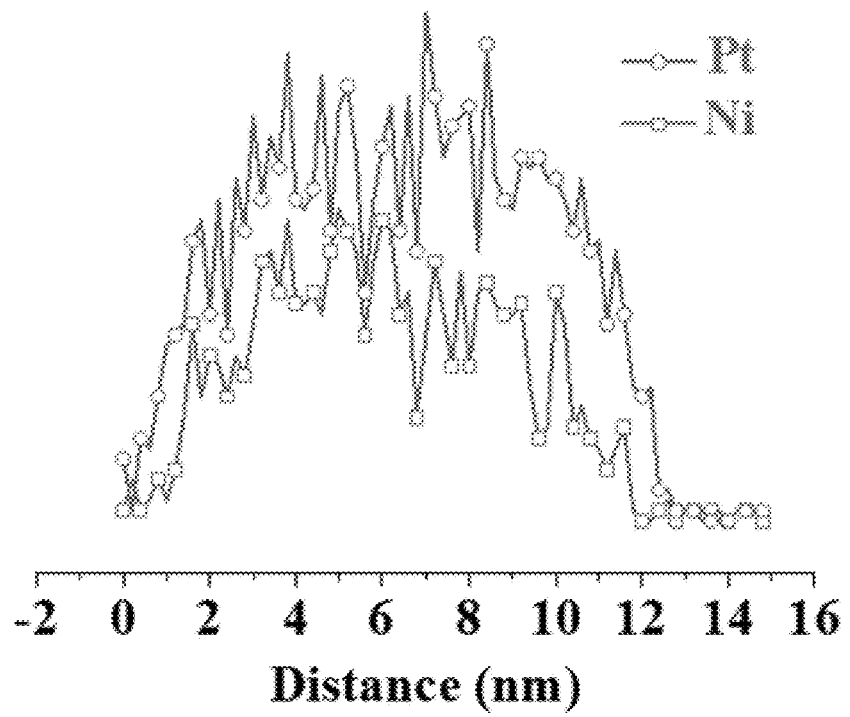
FIG. 4R

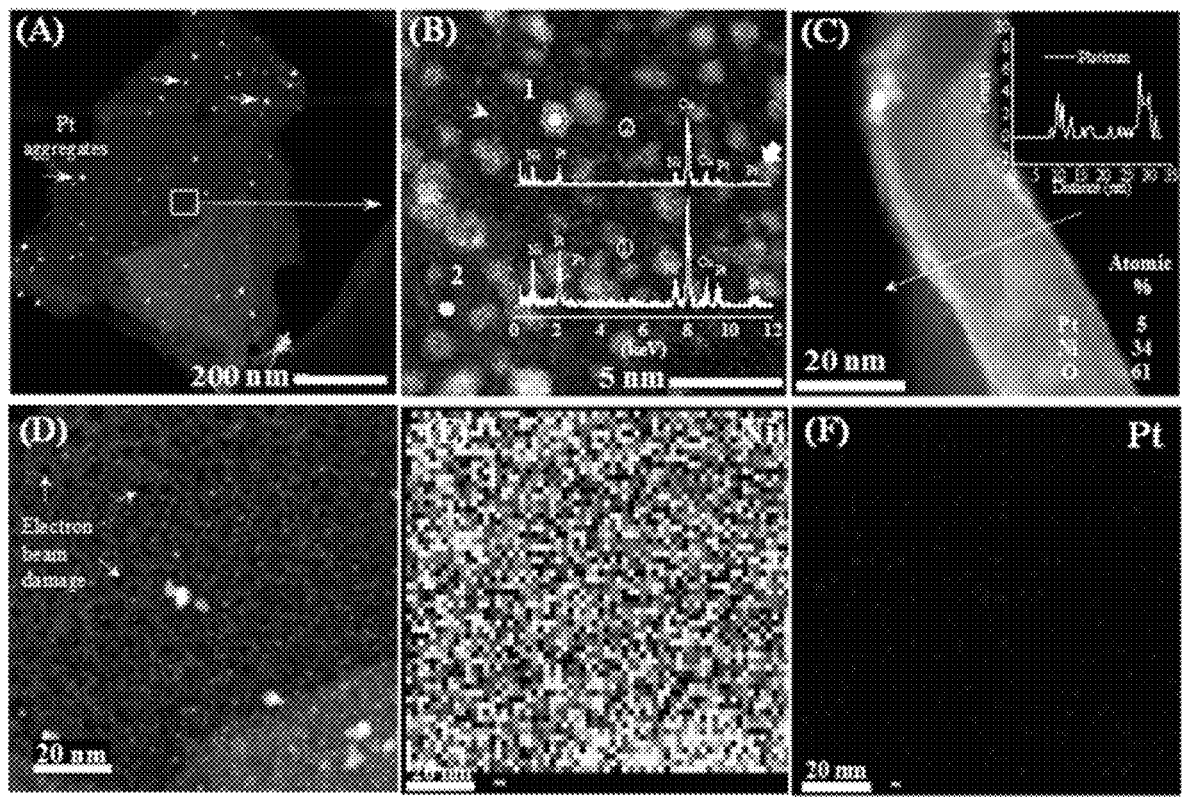
FIGS. 11A-F

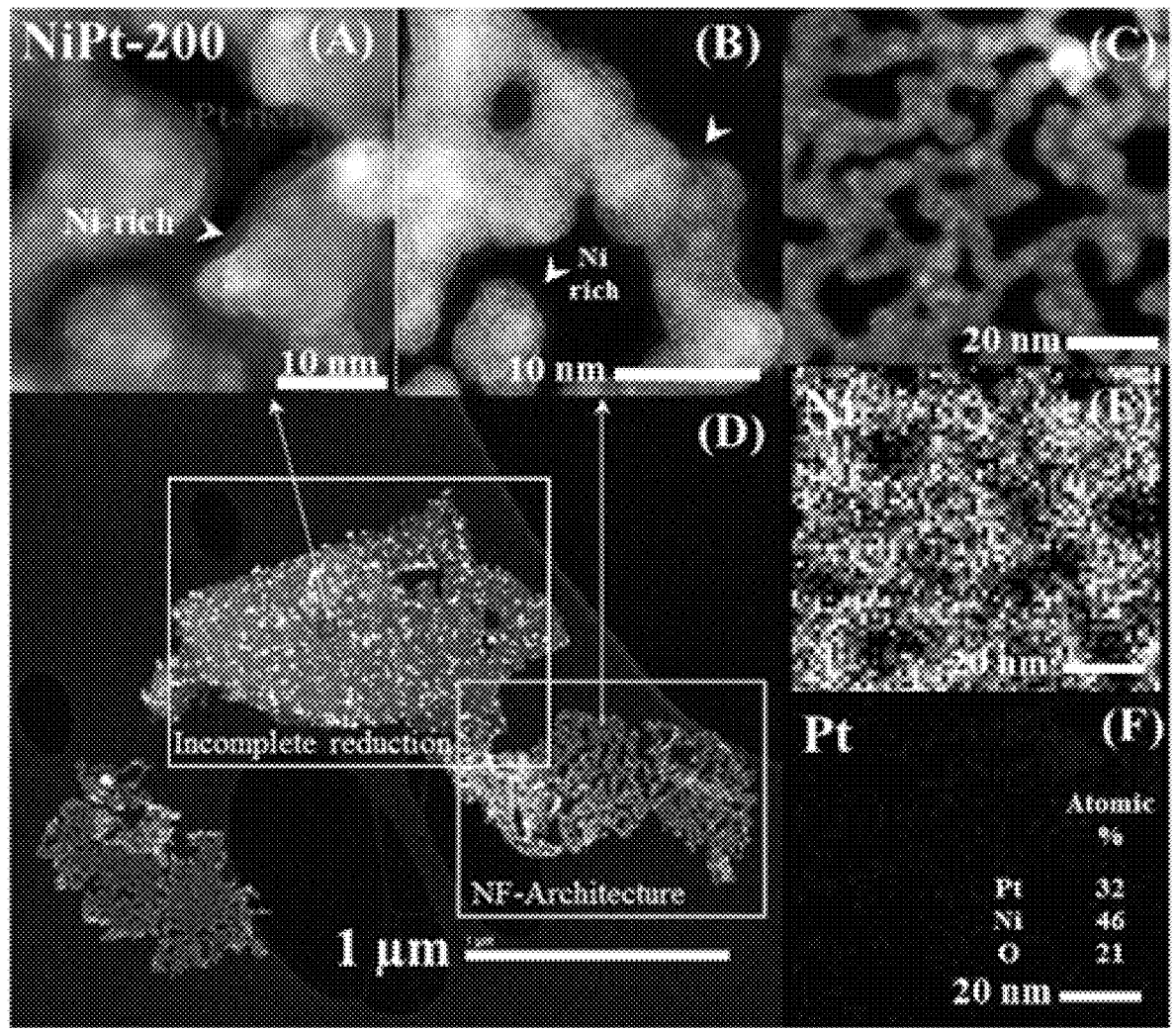
FIGS. 12A-F

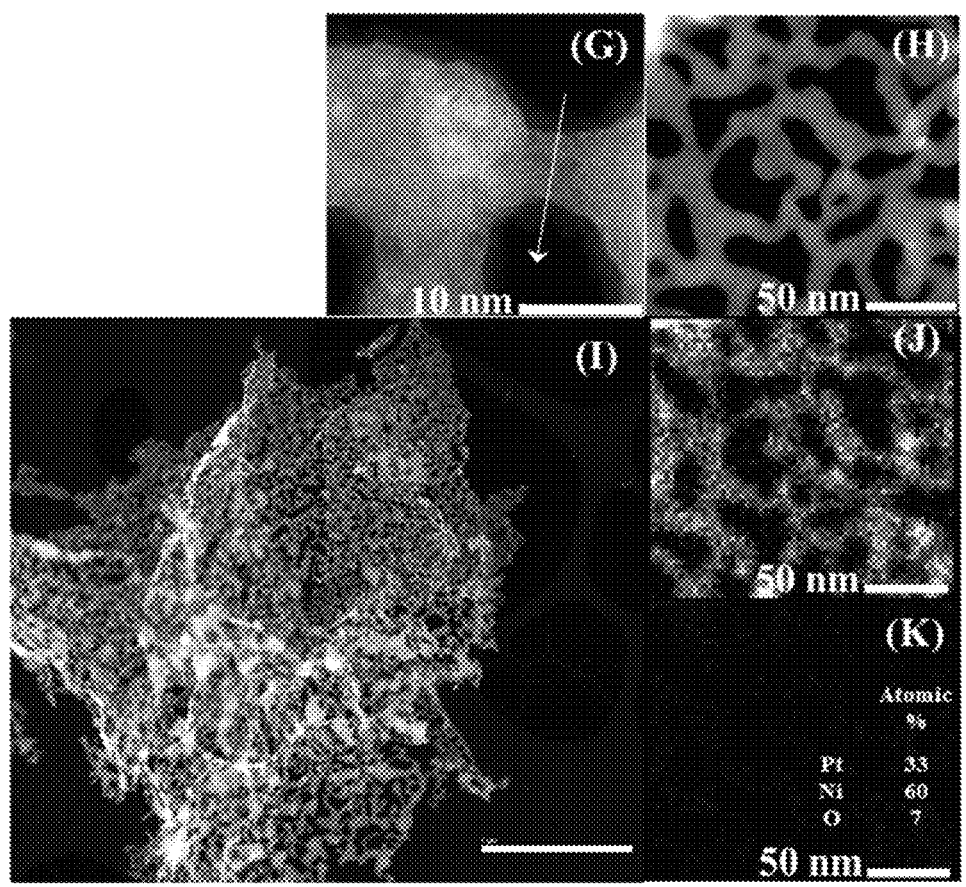
FIGS. 12G-K
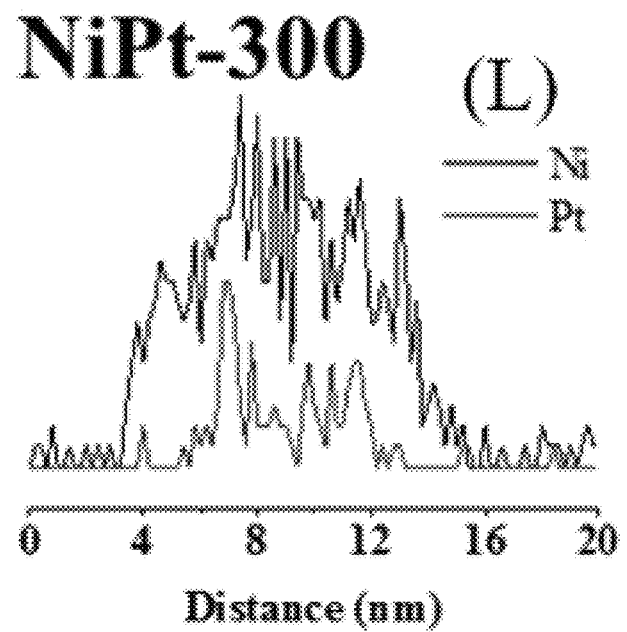
FIG. 12L

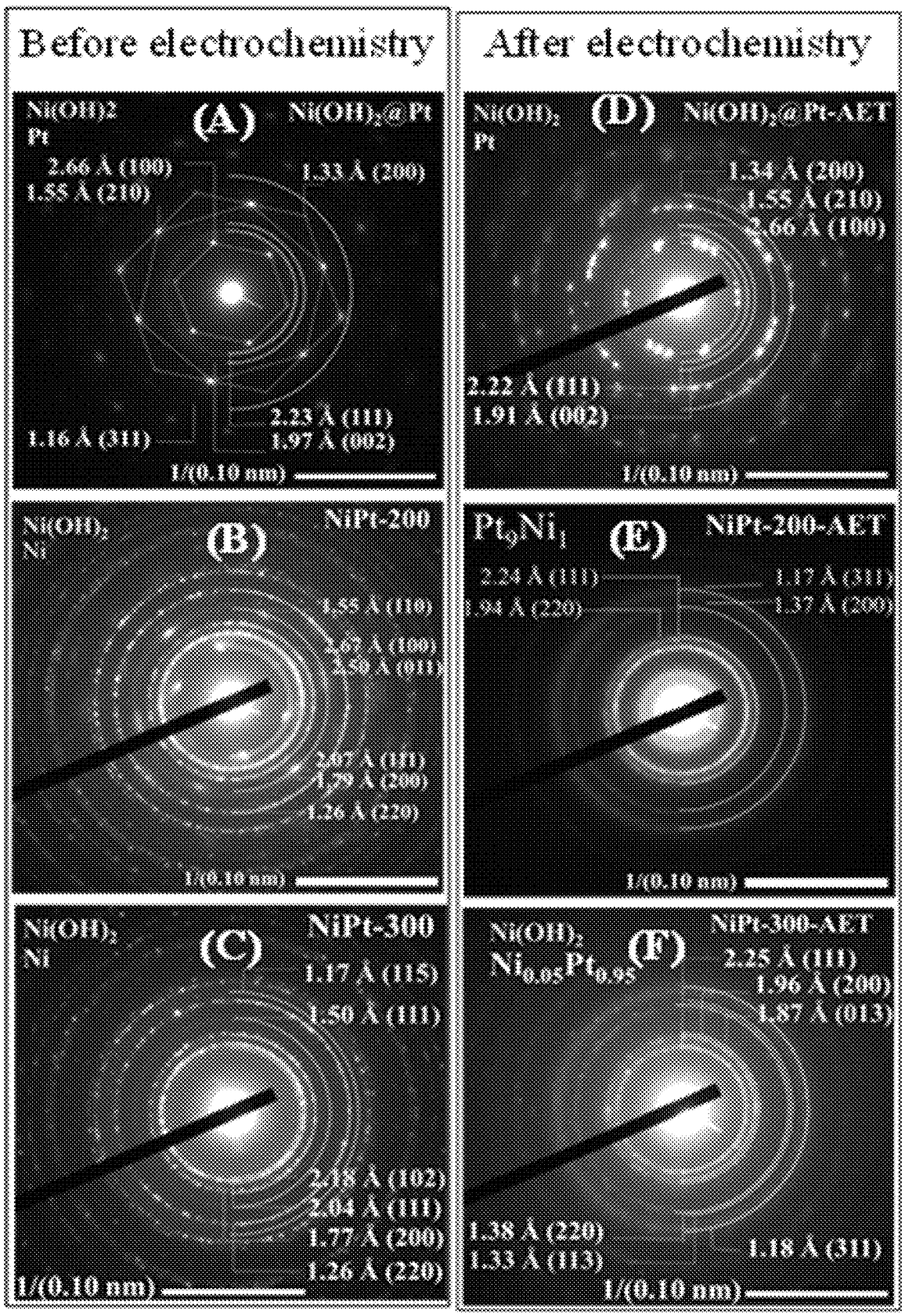
FIGS. 13A-F

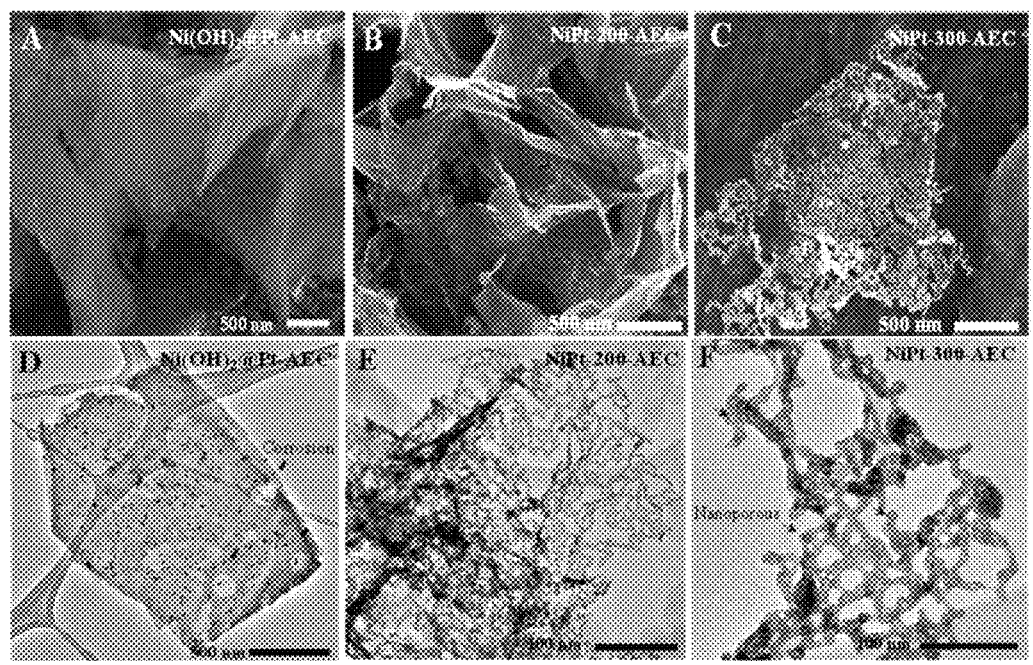
FIGS. 14A-F
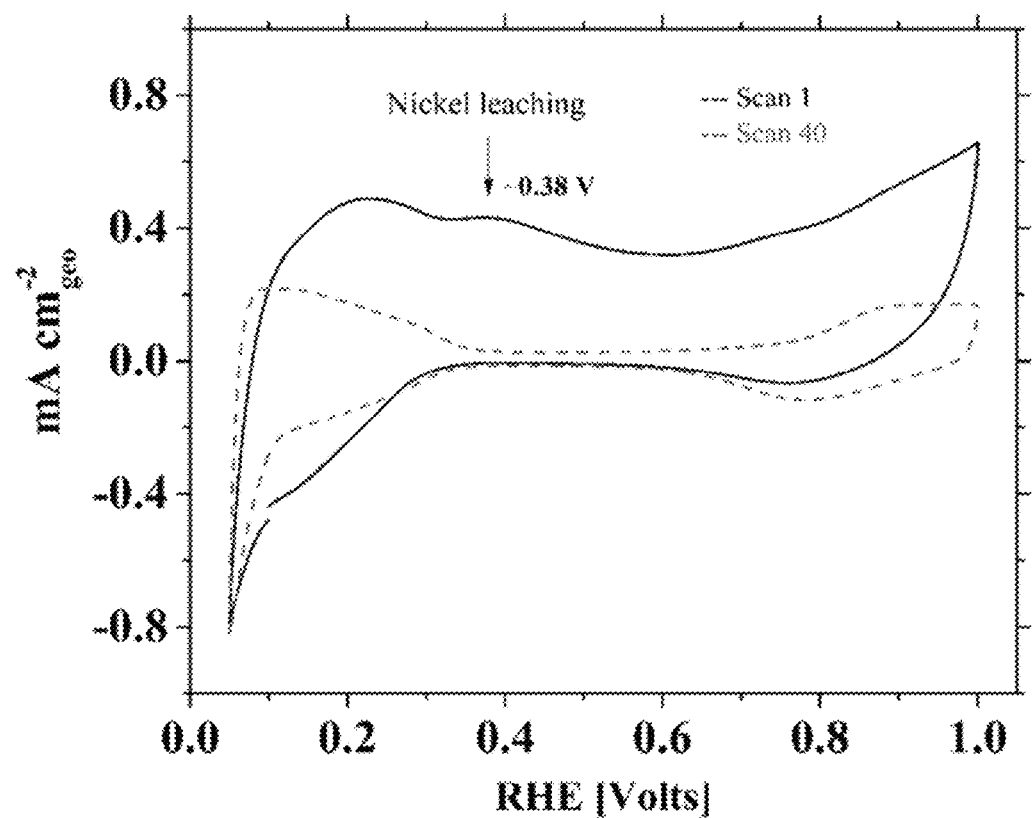
FIG. 15

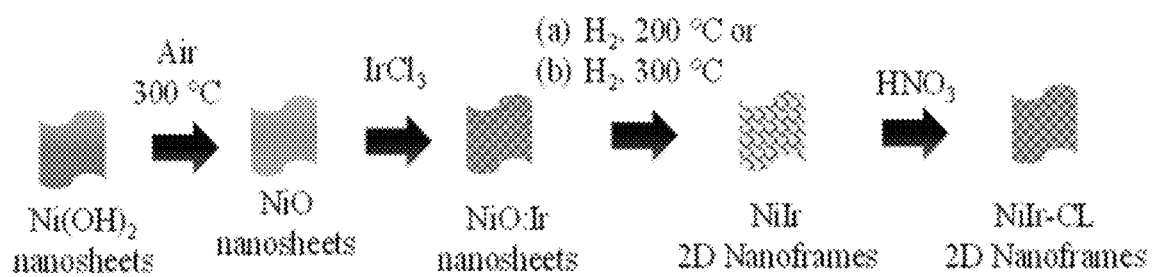
FIG. 20A
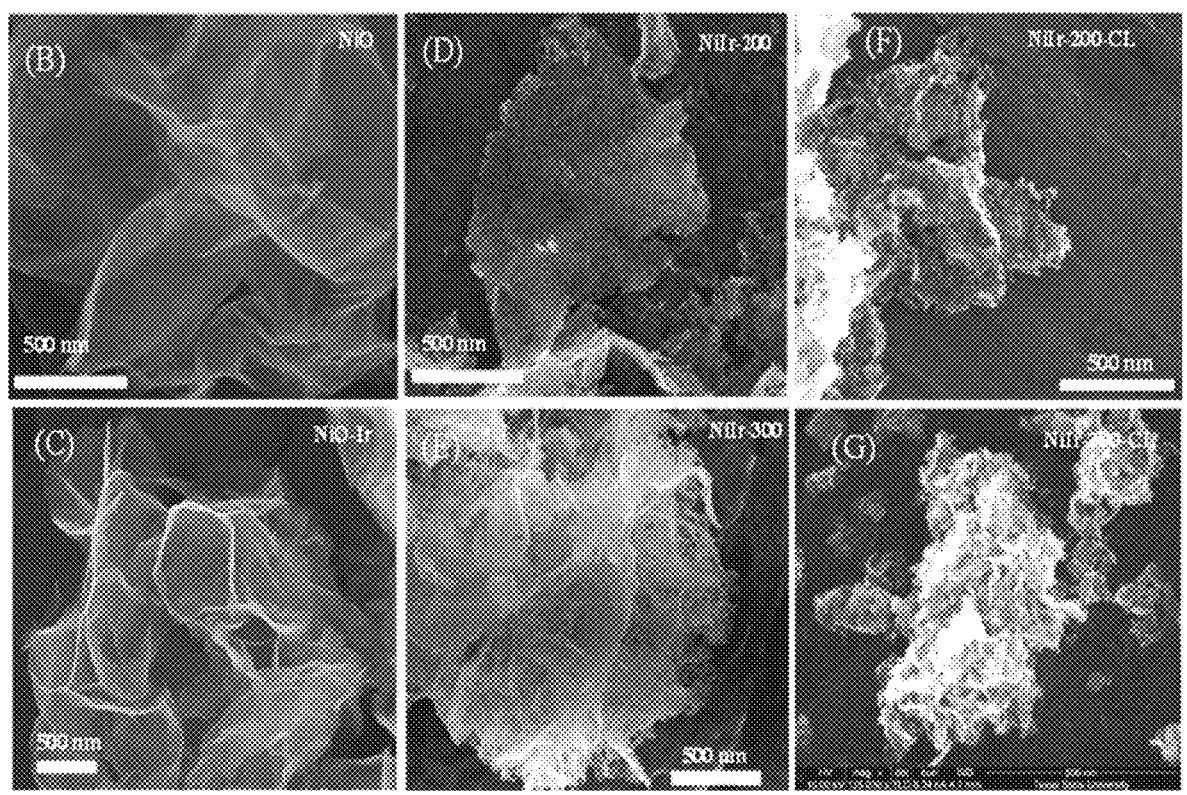
FIGS. 20B-G

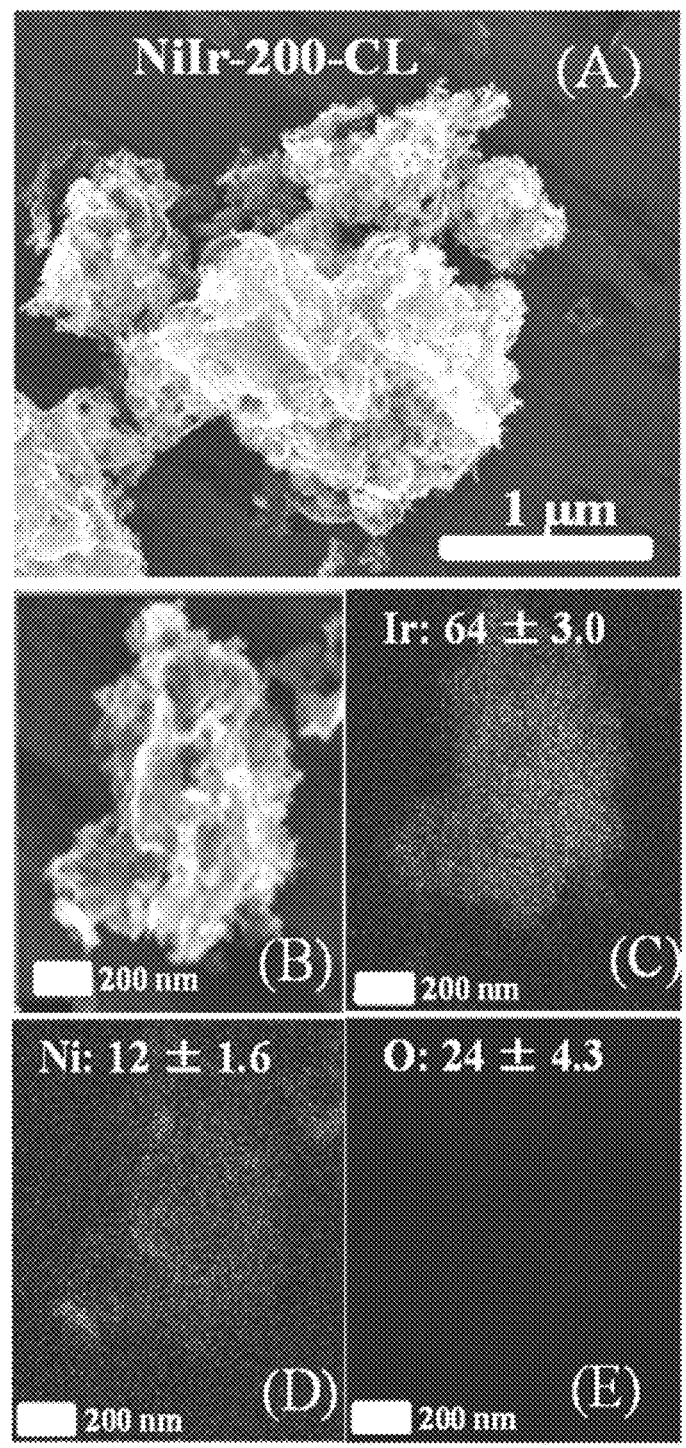
FIGS. 21A-E

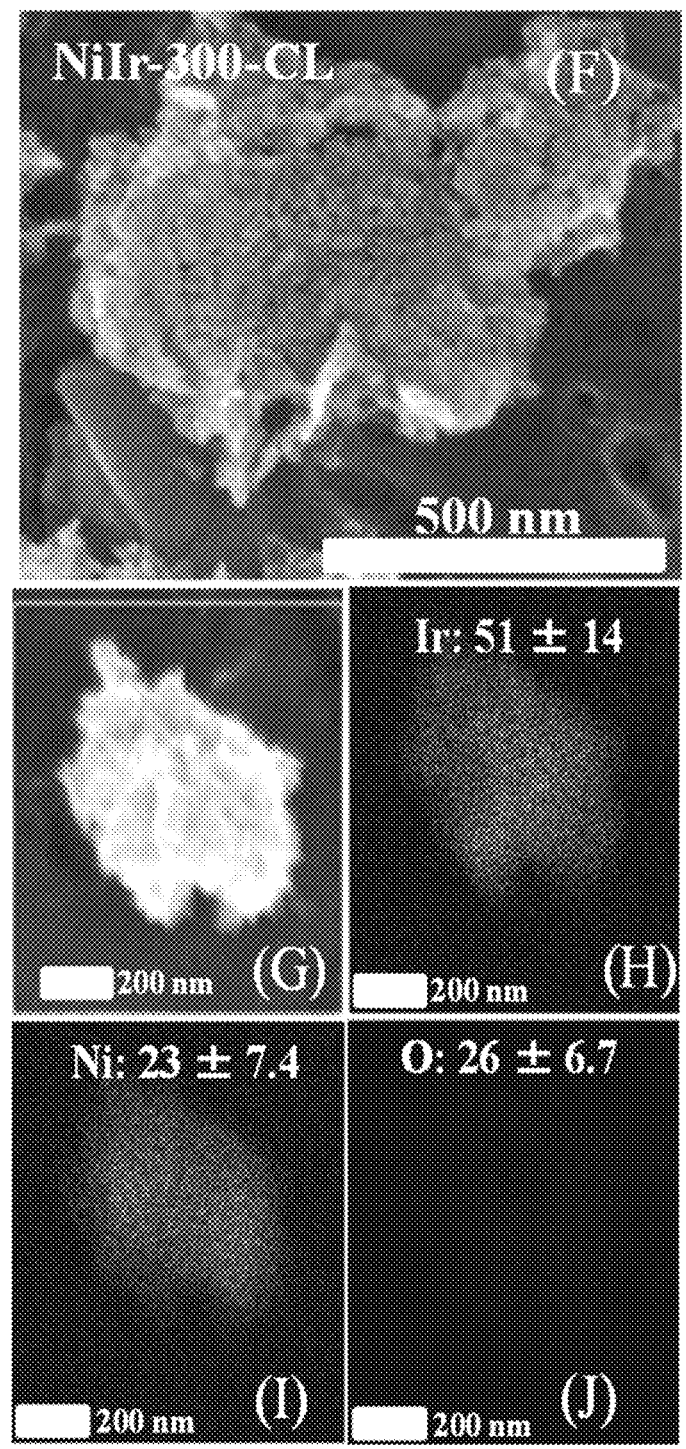
FIGS. 21F-J

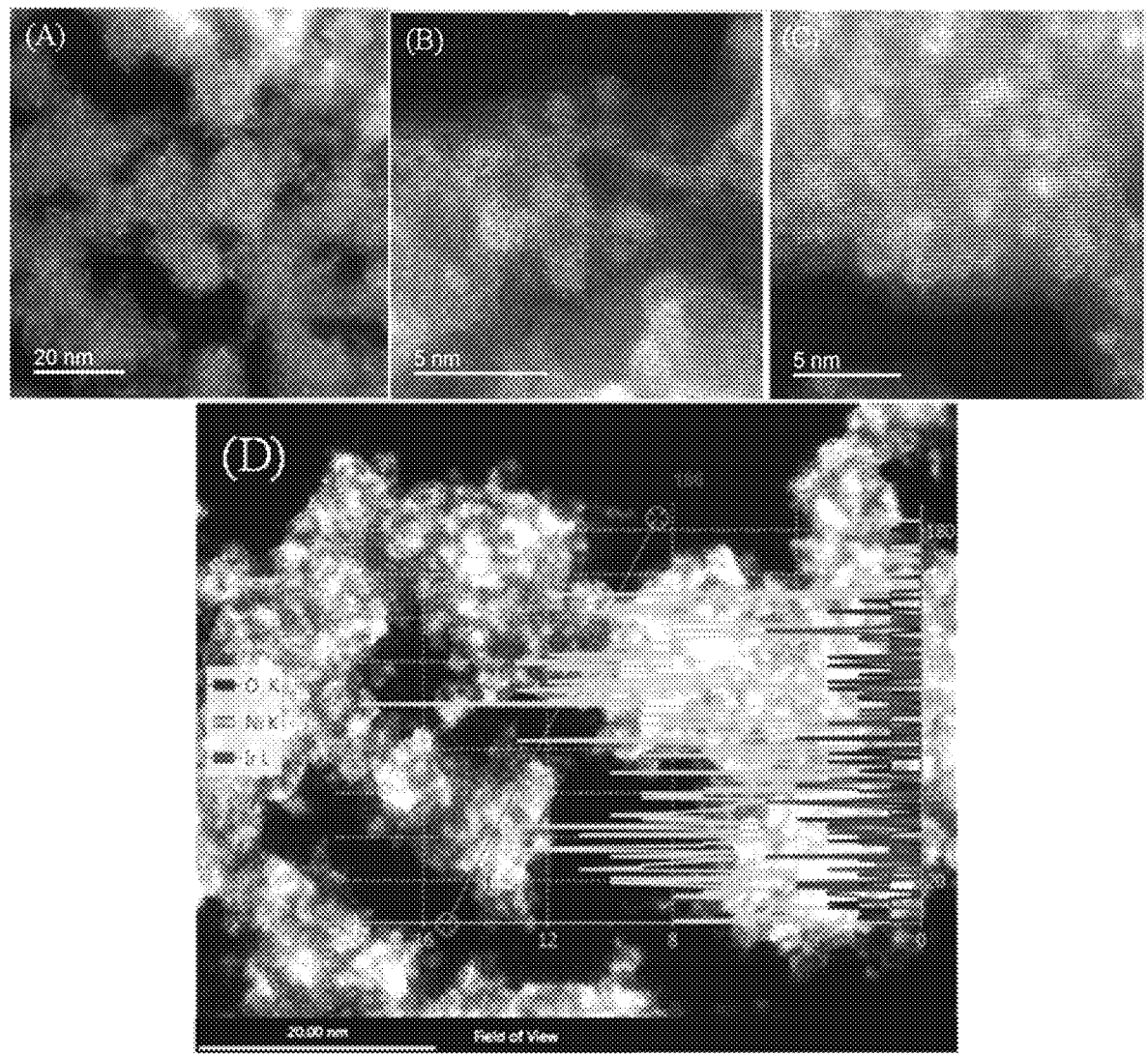
FIGS. 23A-D

CATALYST NANOARCHITECTURES WITH HIGH ACTIVITY AND STABILITY

PRIORITY CLAIM

This application is a claims priority to U.S. Provisional Patent Application No. 62/411,161 entitled "TWO-DIMENSIONAL NANOFRAMES FOR HIGH ACTIVITY AND STABILITY CATALYSTS" filed on Oct. 21, 2016, all of which is incorporated by reference herein.

STATEMENT REGARDING FEDERALLY SPONSORED RESEARCH OR DEVELOPMENT

This invention was made with government support under grant number N00014-16-127777 awarded by Office of Naval Research. The government has certain rights in the invention.

BACKGROUND OF THE INVENTION

1. Field of the Invention

The present disclosure generally relates to catalysts. More particularly, the disclosure generally relates to systems and methods for forming catalyst nanoarchitectures based on two-dimensional structures for high activity and stability catalysts.

2. Description of the Relevant Art

Catalysts including electrocatalysts are used for numerous applications and throughout various industries. Electrocatalysts are used for numerous electrochemical energy conversion and storage devices including fuel cells, metal-air batteries, electrolyzers and electrosynthesis devices. Many catalytic and electrocatalytic processes require the use of noble metals such as platinum, iridium, ruthenium, gold, palladium, and other metals. Noble metals are expensive and have scarcity issues (i.e. limited global supply), and approaches that reduce the noble metal content of catalysts and that allow high catalytic activity and stability are of significant interest.

Electrocatalysts are used for the oxygen reduction reaction (ORR) within devices including fuel cells, metal-air batteries, and other applications. The development of oxygen reduction catalysts with high activity, long-term stability, and low cost is a key challenge. For low-temperature polymer electrolyte fuel cells (PEMFCs), cell performance is substantially compromised by the kinetically sluggish oxygen reduction reaction (ORR), which results in the use of high catalyst loadings at the cathode side.

Currently, supported platinum (Pt) and Pt-based alloys are used as oxygen reduction reaction (ORR) electrocatalysts for commercial PEMFCs for vehicles, back-up power, and other applications. While the short-term performance of Pt-based catalysts has met many current demands of these applications, there is a significant need to obtain ORR electrocatalysts that have not only high activity but also long-term stability and substantially decreased cost.

Numerous methods to increase Pt activity and stability and reduce the Pt content compared with conventional Pt/C materials have been explored with significant efforts aimed at developing carbon-supported Pt or Pt-based alloy nanoparticles with improved activity and durability. Interacting Pt with non-noble transition metals resulting in $PtM_x$ alloys (M=Ni, Co, Fe, etc.) has been shown to provide higher ORR activities by modifying the electronic structure of Pt [Toda, T.; Igarashi, H.; Uchida, H.; Watanabe, M Enhancement of the Electroreduction of Oxygen on Pt Alloys with Fe, Ni, and Co. *J. Electrochem. Soc.* 1999, 146, 3750-3756].

In addition to high activity catalytic sites, electrocatalysts also require a three-dimensional (3D) structure that is both electrically conductive and contains porosity that allows transport of reactants and removal of products to the active catalytic sites (hereby referred to as an "architecture") While carbon is a typically used as a support for electrocatalysts, the corrosion of the carbon support by electrochemical oxidation results in aggregation and separation of the noble metals from the carbon support causing significant performance degradation. The catalyst architecture plays a key role in both activity and stability.

The prior art has demonstrated the ability to produce Pt-transition metal alloys of nanoparticles, individual (distinct) nanoframes, and nanotubes. US 20150236355 "Nanoframes with Three-Dimensional Electrocatalytic Surfaces" discloses bimetallic Pt—Ni nanoframes obtained from nanoparticles, however the nanoframes are distinct particles rather than an interconnected network and were incorporated into a carbon black matrix which is prone to degradation.

U.S. Pat. No. 9,680,160 "Extended Two-Dimensional Metal Nanotubes and Nanowire Useful as Fuel Cell Catalysts and Fuel Cells Containing the Same" discloses Pd metal nanotubes with Pt, Ag or Cu on the surface of the nanotubes.

US 20160126562 "Platinum Nickel Nanowires as Oxygen Reducing Electrocatalysts and Methods of Making the Same" discloses Pt—Ni and Ir—Ni nanowires which are produced by depositing Pt or Ir onto a metal nanowire nanostructure followed by thermal treatment. However, this prior art did not disclose the ability to produce a metallic architecture from a metallic compound rather than a metal.

In other related catalytic processes, electrocatalysts are used to generate hydrogen and oxygen. Hydrogen has numerous uses including industrial processes, chemical synthesis, and as a fuel for fuel cells, which can be used to power automobiles, forklifts, and other applications. Currently a significant proportion of hydrogen is made from fossil fuels. Hydrogen and oxygen can be produced from electrochemical water splitting that can be powered by clean, renewable sources such as wind and solar energy. Since many renewable energy sources are intermittent, water electrolyzers also provide the ability to store excess energy as hydrogen. The development of water electrolyzers that are cost-effective is a key factor to enabling wide scale adoption of fuel cells.

Proton exchange membrane (PEM) electrolyzers that function under acidic conditions have distinct advantages of allowing high voltage efficiencies at high current densities, high pressure operation, and fast kinetics for the cathodic hydrogen evolution reaction (HER). In contrast to the HER, the anodic oxygen evolution reaction (OER) occurs at high overpotentials due to sluggish reaction kinetics and results in significant efficiency losses. In addition, due to the highly oxidative potential and highly corrosive acidic conditions, stability of oxygen evolution catalysts is a significant challenge, with most highly active OER catalysts being also highly unstable. Improved OER electrocatalysts with reduced cost, improved efficiency, and long durability are of significant interest.

Ru-based catalysts (e.g., metallic Ru and RuOx) have shown among the highest activities of acidic OER catalysts, however under practical operating conditions, Ru-based catalysts show significant instability with substantial dissolution that leads to catalyst degradation. Based on the instability of Ru-based catalysts, Ir-based catalysts (e.g., metallic Ir and $IrO_x$) have recently been investigated to provide acidic OER catalysts that have both high activities and improved stabilities. Ir is a platinum-group metal (PGM) with high costs and limited supply, and reducing the amount of Ir required can reduce the cost of PEM electrolyzers. Increasing the OER mass activity (A $g_{Ir}^{-1}$) of Ir provides the ability to reduce the mass of iridium required to achieve the same current.

Rather than using nanoparticles or nanotubes, two-dimensional (2D) materials consisting of single or few atomic layers with nanosheet structures exhibit unique features including quantum confinement and distinct edge and surface structures. For electrocatalysts, 2D materials allow the ability to create catalysts that consist of planes and edges with specific surface coordination environments that are highly catalytically active. By controlling the specific type of surface structures, 2D materials can provide high activity electrocatalysts. In contrast to nanoparticles that inherently contain multiple crystal facets with both high and low activities, a nanosheet contains a higher relative concentration of surface sites within the plane as well as edge sites due to its planar structure.

Prior work reported $IrO_2$ nanosheets that exhibited an OER mass activity six (6) times higher than that of $IrO_2$ nanoparticles [Takimoto, D.; Fukuda, K.; Miyasaka, S.; Ishida, T.; Ayato, Y.; Mochizuki, D.; Shimizu, W.; Sugimoto, W. Synthesis and Oxygen Electrocatalysis of Iridium Oxide Nanosheets. *Electrocatalysis* 2017, 8, 144-150], however this study did not disclose the ability to interact Ir with a transition metal within an architecture.

Methods that produce catalyst structures with high activity and stability employing carbon-free architectures that allow contain porosity that allows molecular accessibility to the reactive surface remains a key challenge.

Therefore a system and/or method for forming catalysts and electrocatalysts at scalable level without the inclusion of carbon and with highly active catalytic sites, extended durability, three-dimensional molecular accessibility, and lower cost would be highly desirable.

SUMMARY OF THE INVENTION

The present invention provides for the use of a catalytic structure that is composed of an interconnected network of particles or domains rather than distinct, separate particles. In some embodiments, the catalytic nanoarchitecture is formed by combining a non-catalytic metal compound that is within a two-dimensional or nanosheet architecture with a catalytic metal and heating within a specified temperature range and atmosphere, hereby referred to as "temperature-atmosphere treatment condition". The temperature-atmosphere treatment condition results in the formation of a catalyst architecture composed of both a network of interconnected solid domains (crystalline and/or amorphous) and a network of interconnected pores. In some embodiments, a method may include heating the combination of a non-catalytic metal compound that is within a first architecture and a catalytic metal within a specified temperature range and atmosphere. The first architecture may include a network composed of interconnected solid domains and porosity. In some embodiments, the first architecture may be formed from non-catalytic metal moieties and nonmetallic moieties of the non-catalytic metal compound. As such the first architecture may be formed from something other than metal (excluding for example minor amounts of nonmetallic moieties which have reacted with the surface).

The catalytic structure is composed of a catalytic metal or metals and one or more non-catalytic metals that are within an interconnected matrix. The non-catalytic metals act within the structure to increase the activity of the catalytic metal, increase the stability of the catalytic metal, and/or act as a supporting matrix for the catalytic metal. The catalytic structure includes both a network of solid particles or domains and a network of void (empty) space, where the former allows the catalytic reaction to occur and the later allows the transport of reactants and removal of products. The interconnected solid network contributes to improved stability by reducing particle-particle agglomeration.

Specific temperature ranges are required to obtain a catalytic structure that maintains (i) beneficial interaction of the catalytic metal with the non-catalytic metal and (ii) results in a highly porous structure that allows transport of reactions and removal of products. Using either too low or too high a temperature-atmosphere treatment condition will result in either (i) not producing the desired interaction of the catalytic metal and non-catalytic metal within the structure or (ii) formation of phases that are either less active and/or less stable. Too high temperature-atmosphere treatment conditions will result in particle growth, phase segregation, and/or structural collapse that reduces surface area and/or reduces the porosity leading to lower catalytic activity and stability. In some embodiments, specific temperature ranges range from below 700 Celsius, from about 150 to about 350 degrees Celsius, or from about 150 to about 250 degrees Celsius.

The unique catalytic nanoarchitecture combines a local catalytic site that combines a catalytic metal with a non-catalytic metal within an interconnected (carbon-free) matrix that provides 3D molecular accessibility. Rather than existing as distinct particles, the catalyst nanoarchitecture combines interconnected solid and pore networks that allow 3D molecular accessibility. In some embodiments, the network is composed of interconnected solid domains with at least one dimension of at least 100 nm. In some embodiments, the network is composed of pores with dimensions of at least 2 nm.

In some embodiments, a method may include forming a catalytic two-dimensional structure. The method may provide a structure that is composed of an interconnected network of particles or domains rather than distinct, separate particles. The method may include heating a non-catalytic metal compound within a specified temperature range in the presence of a catalytic metal. In some embodiments, heating the non-catalytic metal compound may include heating within a hydrogen-containing atmosphere. The method may include transforming a first architecture of the non-catalytic metal compound to a second architecture. The second architecture may include openings in the second architecture. The method may include incorporating the catalytic metal into the openings in the second architecture such that the catalytic metal is integrated into the second architecture. In some embodiments, the method may include increasing a catalytic activity and/or stability of the catalytic metal by integrating the catalytic metal into the second architecture. In some embodiments, the first and/or the second architecture comprises a two-dimensional architecture consisting of nanosheets with thicknesses of less than 20 nm. In some embodiments, the first and/or the second architecture comprises a two-dimensional architecture consisting of nanosheets with a thickness to lateral dimensions (width or length) ratios of greater than or equal to 4.

In some embodiments, a method may include heating the non-catalytic metal compound within a hydrogen-containing atmosphere.

In some embodiments, the second architecture comprises more openings that the first architecture. In some embodiments, the first and/or the second architecture comprises a two-dimensional architecture. In some embodiments, the second architecture does not comprise carbon.

In some embodiments, the specified temperature range ranges from about 150 to about 350 degrees Celsius. The specified temperature range may range from about 150 to about 250 degrees Celsius.

In some embodiments, the non-catalytic metal compound may include a metal hydroxide. In some embodiments, the non-catalytic metal may include a nickel hydroxide. In some embodiments, the catalytic metal may include platinum.

In some embodiments, the non-catalytic metal may include a metal oxide. In some embodiments, the non-catalytic metal may include a nickel oxide. In some embodiments, the catalytic metal may include iridium.

In some embodiments, a catalyst may include a two-dimensional architecture formed of a non-catalytic metal compound. The catalyst may include a catalytic metal incorporated into openings in the second architecture such that the catalytic metal is integrated into the second architecture. The catalytic activity and/or stability of the catalytic metal may be increased relative to an unincorporated catalytic metal. The catalytic stability of the catalytic metal may be increased relative to an unincorporated catalytic metal.

BRIEF DESCRIPTION OF THE DRAWINGS

Advantages of the present invention may become apparent to those skilled in the art with the benefit of the following detailed description of the preferred embodiments and upon reference to the accompanying drawings.

FIGS. 1A-G depict (A) Schematic representation of the experimental procedure for the synthesis of 2D $Ni(OH)_2$@Pt and Ni—Pt 2D nanoframe; (B-D) Scanning electron microscopy (SEM) and Bright field Scanning Transmission Electron Microscopy (BF-STEM) images (E-G) of the as-prepared electrocatalysts.

FIGS. 2A-F depicts low (A-C) and high resolution (D-F) HAADF-STEM images of the as-prepared electrocatalysts $Ni(OH)_2$@Pt, NiPt-200, and NiPt-300.

FIG. 3 depicts X-ray diffraction (XRD) of as-prepared catalysts and their corresponding references: Ni, Pt/C and α-$Ni(OH)_2$.

FIGS. 4A-S depict representative BF- and HAADF-STEM images, EDS elemental mapping and linear scan distribution of electrocatalysts after electrochemical conditioning: $Ni(OH)_2$@Pt-AEC (A-F), NiPt200-AEC (G-L), and NiPt300-AEC (M-R); (S) representation of atomic structure.

FIGS. 11A-F depict scanning transmission electron microscopy (STEM) (A,E), EDS spot analysis (B) EDS line scans (C), and elemental mapping (E,F) of as-prepared $Ni(OH)_2$@Pt.

FIGS. 12A-L depict HAADF-STEM images and EDS elemental mapping of as-prepared NiPt-200 (A-F) and NiPt-300 (G-L).

FIGS. 13A-F depict selected area electron diffraction (SAED) pattern of A-C as-prepared catalysts ($Ni(OH)_2$@Pt, NiPt-200 and NiPt-300) and D-F after electrochemical conditioning ($Ni(OH)_2$@Pt-AEC, NiPt-200-AEC, and NiPt-300-AEC).

FIGS. 14A-F depict scanning electron microscopy (SEM) A-C and scanning transmission electron microscopy (STEM) images D-F of the electrocatalysts after electrochemical conditioning ($Ni(OH)_2$@Pt-AEC, NiPt-200-AEC, and NiPt-300-AEC).

FIG. 15 depicts cyclic voltammetry of NiPt-300 during electrochemical conditioning, at the $1^{st}$ and $40^{th}$ cycle; electrolyte: 0.1 M $HClO_4$ saturated with Ar; scan rate: 50 mV $s^{-1}$.

FIGS. 20A-G depict (A) Schematic representation of the experimental procedure for the synthesis of 2D NiIr-based nanoframes. Scanning electron microscopy (SEM) of NiO nanosheets (B), NiO:Ir (C), NiIr-200 (D), NiIr-300 (E), NiIr-200-CL (F), and NiIr-300-CL (G).

FIGS. 21A-J depict Mapping (SEM-EDS) of the composition of the elements of NiIr-200-CL and NiIr-200-CL.

FIGS. 23A-D depict HAADF-STEM images and EDS elemental mapping of as-prepared NiIr-200 (before chemical leaching).

Figure 4S:
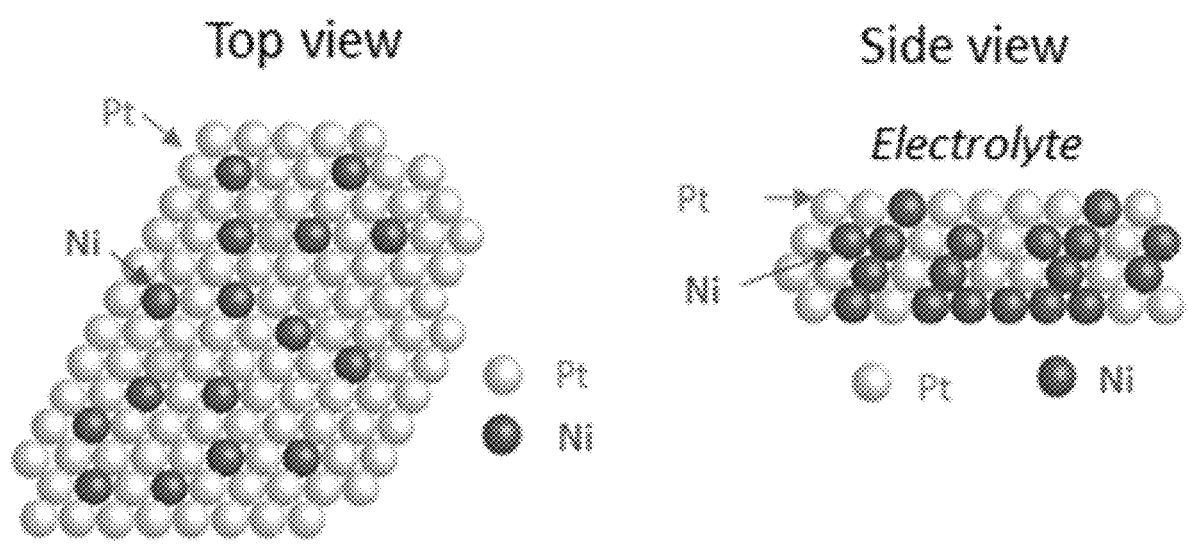

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "connected" as used herein generally refers to pieces which may be joined or linked together.

The term "coupled" as used herein generally refers to pieces which may be used operatively with each other or joined or linked together, with or without one or more intervening members.

The term "directly" as used herein generally refers to one structure in physical contact with another structure, or, when used in reference to a procedure, means that one process affects another process or structure without the involvement of an intermediate step or component.

Embodiments

In some embodiments, a set of catalyst nanoarchitectures or "2D nanoframes" (NFs), based on $Ni_xPt_y$ structure are employed as ORR catalysts. The 2D-NFs ORR catalysts were synthesized by (i) formation of $Ni(OH)_2$ nanosheets; (ii) deposition of Pt on $Ni(OH)_2$, and (iii) heat treatment to form Ni—Pt nanoframes. This approach provides a carbon-free high surface area framework structure with through-connected porosity and electronic conductivity and an active Pt—Ni alloy catalyst with high activity and stability.

In some embodiments, different treatments at relative mild temperature and chemical environments were determined to significantly alter the architecture and atomic-level structure which impacted the electrochemical activity and stability. In some embodiments, a method may include forming a catalytic two-dimensional structure. The nanosheets were treated at different temperature/atmosphere treatments which were determined to significantly alter the atomic-level structure and influenced the electrochemical activity. The temperature-atmosphere treatment condition may result in the formation a catalyst architecture composed of both a network of interconnected solid domains (crystalline and/or amorphous) and a network of interconnected pores. In some embodiments, a method may include heating the combination of a non-catalytic metal compound that is within a first architecture and a catalytic metal within a specified temperature range and atmosphere. The first architecture may include a network composed of interconnected solid domains and porosity. In some embodiments, the first architecture may be formed from non-catalytic metal moieties and nonmetallic moieties of the non-catalytic metal compound. As such the first architecture may be formed from something other than metal (excluding for example minor amounts of nonmetallic moieties which have reacted with the surface).

In some embodiments, a metallic carbon-free high surface area framework structure with through-connected porosity may be formed. In some embodiments, the NiPt nanoframes may be ~8 times higher specific activity compared with commercial Pt/C. The high activity is attributed to the formation Ni—Pt alloys or solid solutions. In some embodiments, the carbon free materials are more resistant to corrosion and have improved stability.

In some embodiments, the method may include heating a non-catalytic metal within a specified temperature range in the presence of a catalytic metal. Non-catalytic metals may include nickel, cobalt, iron, manganese, chromium, vanadium, copper, zinc, zirconium, niobium, molybdenum, indium, tin, tantalum, tungsten, aluminum or gallium, lead or bismuth.

In some embodiments, hierarchical NiPt 2D nanoframes were formed through temperature/atmosphere treatment of Pt-decorated $Ni(OH)_2$ nanosheets. In some embodiments, the first and/or the second architecture comprises a two-dimensional architecture consisting of nanosheets with thicknesses of less than 20 nm. In some embodiments, the first and/or the second architecture comprises a two-dimensional architecture consisting of nanosheets with a thickness to lateral dimensions (width or length) ratios of greater than or equal to 4.

In some embodiments, the method may include transforming a first architecture of the non-catalytic metal to a second architecture. The second architecture may include openings in the second architecture. The method may include incorporating the catalytic metal into the openings in the second architecture such that the catalytic metal is integrated into the second architecture. This approach demonstrates a metallic carbon-free high surface area framework structure with through-connected porosity, electronic conductivity, and active catalytic metal-non-catalytic metal solid domains. In some embodiments, the method may include increasing a catalytic activity of the catalytic metal by integrating the catalytic metal into the second architecture. In some embodiments, the method may include increasing the catalytic stability of the catalytic metal by integrating the catalytic metal into the second architecture. In some embodiments, the network is composed of interconnected solid domains with at least one dimension of at least 100 nm. In some embodiments, the network is composed of pores with dimensions of at least 2 nm.

In some embodiments, a method may include heating the non-catalytic metal compound within a reactive atmosphere (i.e., relative to the non-catalytic metal). The reactive material may include a hydrogen-containing atmosphere.

In some embodiments, the second architecture comprises more openings that the first architecture. In some embodiments, the first and/or the second architecture comprises a two-dimensional architecture. In some embodiments, the second architecture does not comprise carbon.

In some embodiments, mild temperature treatments are needed to maintain the 2D framework and enable direct Pt—Ni interaction and avoid Pt diffusion below surface region. The NiPt 2D NF catalyst heated to 200° C. showed a specific activity around 4.61 mA $cm^{-2}{}_{Pt}$ which is almost one order of magnitude higher than commercial Pt/C (0.57 mA $cm^{-2}{}_{Pt}$). In some embodiments, the specified temperature range ranges up to 700 degrees Celsius. In some embodiments, the specified temperature range ranges from about 150 to about 350 degrees Celsius. The specified temperature range may range from about 150 to about 250 degrees Celsius. In some embodiments, if the non-catalytic metal compound first architecture is heated beyond the prescribed temperature range the first architecture may collapse.

In some embodiments, the non-catalytic metal compound may include nickel, cobalt, iron, manganese, chromium, vanadium, copper, zinc, zirconium, niobium, molybdenum, indium, tin, tantalum, tungsten, aluminum or gallium, lead or bismuth. In some embodiments, the non-catalytic metal compound may include one or more transitional metals. In some embodiments, the non-catalytic metal compound may include a metal hydroxide. In some embodiments, the non-catalytic metal compound may include a nickel hydroxide. In some embodiments, the non-catalytic metal compound may include a cobalt hydroxide. In some embodiments, the non-catalytic metal compound may include a metal oxide (e.g., nickel oxide, cobalt oxide). In some embodiments, the non-catalytic metal compound may include a metal oxyhydroxide. In some embodiments, the catalytic metal may include one or more of platinum, iridium, osmium, gold, silver, palladium, rhodium, or ruthenium. In some embodiments, the catalytic metal may include one or more metals including platinum, iridium, osmium, gold, silver, palladium, rhodium, or ruthenium.

In some embodiments, a catalyst may include a two-dimensional architecture formed of a non-catalytic metal compound and a catalytic metal. The catalyst may include a catalytic metal incorporated into openings in the second architecture such that the catalytic metal is integrated into the second architecture. The catalytic activity of the catalytic metal may be increased relative to an unincorporated catalytic metal. The catalytic stability of the catalytic metal may be increased relative to an unincorporated catalytic metal.

In some embodiments, the method may include chemical leaching (e.g., chemical leaching in nitric acid (e.g., 0.05 M $HNO_3$)). Chemical leaching may remove unstable non-noble metals within the structure.

In some embodiments, the method may include using a second temperature-atmosphere treatment step to modify the second architecture.

In some embodiments, the method may include utilizing an electrochemical treatment step to modify the second architecture.

Further understanding of the composition, synthetic conditions, treatment parameters, atomic arrangement, and the influence of these parameters on the activity and stability provides a pathway to develop carbon-free catalyst nano-architecture electrocatalysts with high activity, extended durability, and low cost.

The development of nanostructured catalysts with high activity, long-term stability and low cost is a key unsolved challenge for electrochemical energy conversion and storage devices including fuel cells, metal air batteries, and electrolyzers. Additional uses of the catalysts described herein may include catalyst for chemical reactions, electrochemical catalysts, oxygen reduction, oxygen evolution, hydrogen evolution, carbon dioxide conversion reactions, and other catalytic reactions, etc. Operation at higher temperatures is also desirable. Methods described herein may invention has the potential to address all of these issues.

EXAMPLES

Having now described the invention, the same will be more readily understood through reference to the following example(s), which are provided by way of illustration, and are not intended to be limiting of the present invention.

Example 1

Potassium hexachloroplatinate ($K_2PtCl_6$, 99.98%) was obtained from Sigma-Aldrich. Nickel nitrate hexahydrate ($Ni(NO_3)_2 \cdot 6H_2O$, 98%) and urea ($N_2COH_4$, 99.3%), were purchased from Alfa Aesar. Ethyleneglycol, isopropanol (HPLC grade), and ACS grade water (18 MΩ-cm) were obtained from VWR Analytical. All electrochemical measurements were carried out in 0.1 M $HClO_4$ prepared with 70% $HClO_4$ (Veritas Doubly Distilled) (0.000001% Cr). All reagents were used without further purification.

The α-$Ni(OH)_2$ nanosheets were synthesized using a hydrothermal process. To prepare the α-$Ni(OH)_2$ nanosheets, 1.06 g (3.64 mmol) of $Ni(NO_3)_2 \cdot 6H_2O$ was combined with 0.6597 g (10.98 mmol) of urea in 20 mL of ultrapure water (18 MΩ-cm) and 25 mL of ethyleneglycol (EG). The solution was then transferred into a 50 mL Telfon-lined autoclave reactor (Pan Instruments). The reaction vessel was placed in a 120° C. pre-heated oven and allowed to react for 4.5 h without active stirring. After the reaction time, the autoclave was removed from the oven and allowed to cool at room temperature. The light green powder was recovered by centrifugation (3000 RPM, 3 min, Thermo, Sorvall ST16) and subsequently rinsed five times with water and two times with isopropanol using the same centrifuge conditions. Following the rinsing steps, the powder was dried under vacuum at 60° C. overnight. Based on analysis discussed in the following paragraphs, the dried powder was notated as α-$Ni(OH)_2$ nanosheets.

The α-$Ni(OH)_2$ nanosheets were decorated with Pt. To deposit Pt on the α-$Ni(OH)_2$ nanosheets, 0.10382 g of the prepared $Ni(OH)_2$ was dispersed in 25 mL of ultrapure water, and subsequently 0.02730 g of $K_2PtCl_6$, corresponding to 20 wt. % of metallic Pt vs α-$Ni(OH)_2$, was added. The slurry was then transferred to the autoclave, stirred 12 h, and then heated at 80° C. for 4 days without stirring. Finally, a grey powder was recovered, rinsed, and dried as described above.

The 2D $Ni(OH)_2$@Pt catalyst was thermally treated at 200 or 300° C. for 20 minutes under 100 mL/min flowing Ar/$H_2$ (95/5 vol. %) using a ramp rate of 10° C./min starting from room temperature. The synthesized samples were notated as α-$Ni(OH)_2$, $Ni(OH)_2$@Pt, NiPt-200, and NiPt-300, for the as-prepared precursor nanosheets, nanosheets after platinum deposition, and samples after thermal treatment at 200 or 300° C. respectively. Samples were also characterized after electrochemical conditioning (AEC) which consisted of cyclic voltammetry (CV), carbon monoxide (CO)-stripping, and linear voltammetry over the ORR potential region. Details of the specific experimental parameters used for each of these steps is described in the following paragraphs. The sample were labeled with the suffix "AEC" to denote the characterization after the electrochemical treatment steps: $Ni(OH)_2$@Pt-AEC, NiPt-200-AEC and NiPt-300-AEC.

Physical and Structural Characterization

The catalyst composition was determined using inductively coupled plasma atomic emission spectroscopy (ICP-AES) carried out by Galbraith Laboratories Inc. (Knoxville, Tenn.). From ICP analysis, the as-prepared NiPt-200 catalyst was determined to be 25.5±5.1 wt % Pt, and the NiPt-300 catalyst was determined to be 29.9±1.3 wt % Pt. Powder X-Ray diffraction (XRD) measurements were conducted using a Bruker AXS D8 Advance powder X-Ray diffractometer with a Cu Kα ($\lambda$=1.5406 Å) radiation source, operating at 40 kV and 25 mA and a high resolution energy dispersive 1D Linxeye XE detector. The scan range of 2θ was 5°<2θ<85° with a 0.01° increment. Brunauer-Emmett-Teller (BET) surface areas were obtained from nitrogen adsorption/desorption isotherms measured using a Micromeritics ASAP 2020 surface area and porosimetry analyzer. Samples were degassed at 120° C. for 16 h prior to characterization.

The structure, morphology, crystallinity, and elemental distribution of the catalysts were determined by high-resolution electron microscopy (HR-TEM) and selected area electron diffraction (SAED) using a 2010-F (200 kV, JEOL). SAED measurements were calibrated using the lattice distance from 2D-Ni-nanoframes obtained by heating α-Ni($OH)_2$ nanosheets at 300° C. under $H_2$/Ar.

Cs-corrected scanning transmission electron microscopy (STEM) was carried out by using a JEM-ARM200F (200 kV, JEOL) equipped with an energy dispersed spectrometer (EDAX Silicon Drift detector). High angle annular dark field STEM (HAADF-STEM) was obtained with a convergence angle of 26 mrad and a collection semi-angles from 50 to 180 mrad. The probe size used was about 0.09 nm with the probe current of 22 pA.

Rotating Disk Electrochemical Characterization.

The electrochemical measurements were conducted at constant temperature (298 K) in a three electrode cell using a rotating disk electrode (RDE) or rotating ring disk electrode (RRDE) configuration with an Autolab PGSTAT128N bipotentiostat and rotation control (Pine Instruments). A Pt mesh and a freshly prepared reversible hydrogen electrode (RHE) were used as counter and reference electrodes respectively. The potential of the RHE electrode was confirmed by measuring the potential versus a commercial silver/silver chloride reference electrode (0.199 $V_{NHE}$). The catalyst was suspended within an ink that was prepared by combining the catalyst, Nafion suspension (Aldrich, 5 wt %, 1100 g equivalent weight), isopropanol, and ultrapure water. The catalyst ink was prepared by mixing 3 mg of the catalyst with 3 mL of a stock solution consisting of 7.96 mL ultra-pure water (18.2 MΩ), 2 mL of isopropanol, and 40 μL of 5 wt % Nafion solution (Sigma-Aldrich). The same ink formulation was used for all catalysts. The catalyst inks were sonicated in an ultrasonic bath (Fisher, 40 kHz) for 5 minutes while maintaining the temperature around 25° C. The catalyst ink was deposited onto a minor polished glassy carbon electrode (0.196 cm$^2$) which was used as the working electrode. To control the catalyst loading for the activity tests, ink volumes of 20 uL (Pt/C), 18 uL (Ni(OH)$_2$:Pt), and 18 uL (NiPt-200 and NiPt-300) were deposited onto the glassy carbon electrode. After depositing the ink, the working electrode was dried at room temperature within a fume hood. The uniformity of the thickness and distribution of the catalyst layer on the glassy carbon working electrodes used for RDE and RRDE tests are critical factors that affect the accurate measurement of electrochemical catalytic activity since non-uniform film thicknesses and distributions can influence mass transport processes within the catalyst layer. For films used for activity measurements, the current within the potential region of 0.2 $V_{RHE}$<E<0.7 $V_{RHE}$ obtained from linear voltammetry ORR measurements was within ~10% of the theoretical diffusion limited current of −5.7 mA cm$^{-2}_{geo}$, which is a reasonable metric used as part of assessing film quality. Variations in measured activities for the same catalyst are attributed to differences in film thickness and distribution of the catalyst film on the glassy carbon working electrode, and specific and mass activities are reported as averages with associated standard deviations of multiple measurements. The Pt loading was optimized based on the maximum specific and mass activity for each catalyst in order to mitigate sources of error during the determination of specific activities. The resulting Pt loading for Pt/C was $L_{Pt}$=16 μg$_{Pt}$ cm$^{-2}_{geo}$. For the unsupported catalysts, the resulting Pt loadings were 31 μg cm$^{-2}_{geo}$ (Ni(OH)$_2$:Pt) and 35 μg cm$^{-2}_{geo}$ (NiPt-200 and NiPt-300). The unsupported NiPt-200 and NiPt-300 catalysts have lower ECSA$_{Pt}$ values (5.3-7.4 m$^2$ g$^{-1}_{Pt}$) compared with Pt/C (72.8 m$^2$ g$^{-1}_{Pt}$) and required higher loadings on the electrode compared with Pt/C.

The electrolyte used for RDE and RRDE tests was 0.1 M HClO$_4$ (70 wt %, Fisher, ultrapure) in ultrapure water. After preparation, the electrodes were immersed in deaerated 0.1 M HClO$_4$ under potential control at 0.1 V. IR-compensation and background subtraction were utilized to obtain electrochemical parameters. The catalysts were conditioned by cycling 40 times between 0.05 and 1.2 $V_{RHE}$ at a scan rate 50 mV s$^{-1}$ within Argon-purged 0.1 M HClO$_4$ in order to produce a stable electrode surface. The hydrogen underpotential deposition (H$_{upd}$) charge over the H desorption region of the 40$^{th}$ cycle was integrated to obtained the Pt electrochemical surface area (ECSA$_{Pt-Hupd}$) using a specific charge of 210 μC cm$^{-2}$. For the H$_{upd}$ charge for NiPt-300, the potential window used for analysis was restricted between 0.08 and 0.4 V in order to avoid the hydrogen evolution reaction (HER) feature, as described in the following paragraphs. CO stripping voltammetry was also carried out to complement the ECSA$_{Pt-Hupd}$ obtained by H$_{upd}$. The electrochemical surface area obtained from CO stripping, ECSA$_{Pt,CO}$, was calculated using a scan rate of 20 mV s$^{-1}$ and using 420 μC cm$^{-2}$ as the charge corresponding to a monolayer of adsorbed CO.

For evaluation of the oxygen reduction activity, CVs were obtained from 0.05 to 1.05 $V_{RHE}$ using a scan rate 20 mV s$^{-1}$ and a rotation rate of 1600 rpm in oxygen-saturated 0.1 M HClO$_4$. The ECSA$_{Pt}$ used for the calculation of the ORR specific activity was determined from the ECSA$_{Pt,Hupd}$ obtained from the third cycle of the CV measured after the ORR activity testing. The voltammetric curves in the ORR region were corrected by background subtraction of the CVs obtained under Ar to account for the capacitive contribution. Tafel plots were obtained at 25° C. from the positive scan direction at 1600 rpm, and Tafel slopes were determined using a voltage range of 0.9 to 1.0 $V_{RHE}$. Carbon-supported Pt nanoparticles (Pt/C, Etek, 20 wt % Pt) were used as a reference for the CVs, CO stripping, and ORR activity tests.

The H$_2$O$_2$ production was evaluated using a rotating ring disk electrode (RRDE) configuration (disk area of 0.237 cm$^2$). The disk potential was scanned between 0.05 and 1.05 $V_{RHE}$ at 20 mV s$^{-1}$ using a rotation rate of 1600 rpm while the ring was potentiostated at 1.4 $V_{RHE}$. The collection efficiency was calculated using a deaerated electrolyte KOH 0.1 M (Alfa Aesar) with 10 mmol L$^{-1}$ K$_3$Fe(CN)$_6$ (Alfa Aesar). A Pt wire and mercury-mercury oxide electrode (E°$_{Hg/HgO}$=0.131 V vs SCE; ΔE=0.009 V), were used as counter and reference electrode respectively, however all the potentials are reported with respect to RHE (E$_{RHE}$= E$_{Hg/HgO-measured}$+0.059 pH+E°$_{Hg/HgO}$; E$_{RHE-corrected}$=0.898 V) For the collection efficiency experiment, the disk potential was scanned at 20 mV s$^{-1}$ while the ring was potentiostated at 1.5 $V_{RHE}$. The collection efficiency was determined according to the equation N=−I$_R$/I$_D$, where I$_R$ and I$_D$ correspond to the ring and disk currents respectively. The average collection efficiency obtained at 1600 rpm was 0.43±0.05.

The accelerated stability test was carried out using the RDE configuration described above within an O$_2$-saturated 0.1 M HClO$_4$ electrolyte, without stirring by cycling the electrode over 1000 cycles from 0.6 to 1.3 $V_{RHE}$ at scan rate of 100 mV s$^{-1}$ at 25° C. In order to increase the detection of small amounts of Pt within the electrolyte using ex-situ ICP-MS, for the accelerated stability tests the Pt loading was increased to 22 μg cm$^{-2}_{geo}$ (Pt/C), 43 μg cm$^{-2}_{geo}$ (NiPt-200) and 58 μg cm$^{-2}_{geo}$ (NiPt-300). Prior to the evaluation, the surface of the commercial catalysts Pt/C was cleaned and the Ni—Pt catalysts were electrochemical dealloyed (activation step) by cycling from 0.05 V to 1.2 V at a scan rate of 100 mV s$^{-1}$ (60 scans) and 20 mV s$^{-1}$ (20 scans) within an Ar-saturated 0.1 M HClO$_4$ electrolyte. In addition, after the activation step, the electrolyte was replaced with a fresh electrolyte solution, which was used for the stability tests. During the stability testing, every 200 scans the potential was swept between 0.05 and 1.2 $V_{RHE}$ in Ar-saturated electrolyte to determine the electrochemical surface area (ECSA$_{Pt,H-upd}$). The ECSA$_{Pt,H-upd}$ was determined from the electrochemical double layer-corrected charge obtained from the H desorption peak, using the details described above. The normalized remaining ECSA$_{Pt}$ was determined according to the equation (Q$_x$/Q$_1$*100) where Q$_1$ is the charge at the beginning of the test (after the activation step) and Q$_x$ the charge determined at the corresponding number of scans during the stability test (i.e. 200, 400, etc.). The Pt content of the electrode and electrolyte after accelerated stability testing were determined using ICP-MS measurements (Galbraith Laboratories).

Synthesis Approach

The Ni—Pt 2D nanoframes were synthesized by (i) formation of $Ni(OH)_2$ nanosheets; (ii) deposition of Pt onto the $Ni(OH)_2$ nanosheets, and (iii) controlled temperature/atmosphere treatments (either 200° C. or 300° C. under $H_2$/Ar, 5/95 vol %) as summarized in FIG. 1A. The scalable synthesis procedure involves a hydrothermal process followed by thermal treatment under reducing conditions. The thermal treatment step translates the Pt nanoparticles supported on $Ni(OH)_2$ nanosheets into integrated metallic Pt—Ni 2D nanoframes that have direct Pt—Ni interaction. The structure is referred to as a "2D nanoframe" due to the presence of a hierarchical 2D framework consisting of interconnected solid domains and porosity. The effect of the transformation temperature (either 200° C. or 300° C.) on the structure and resulting electrochemical properties.

Figure 10A:
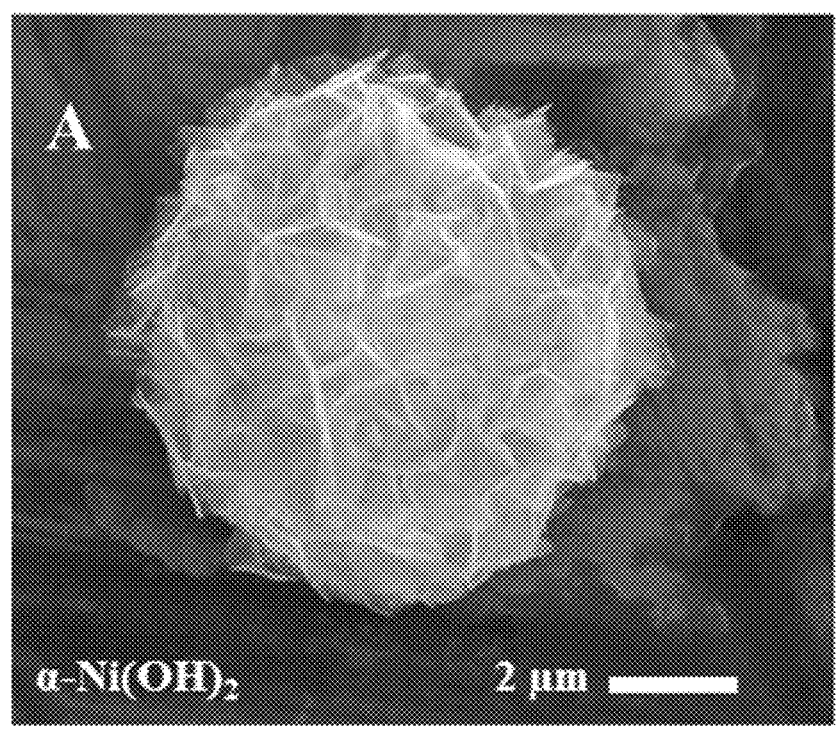
FIGS. 10A-B depict (A) Scanning electron microscopy images (SEM) and (B) transmission electron microscopy (TEM) of $Ni(OH)_2$ nanosheet precursor.
Figure 10B:
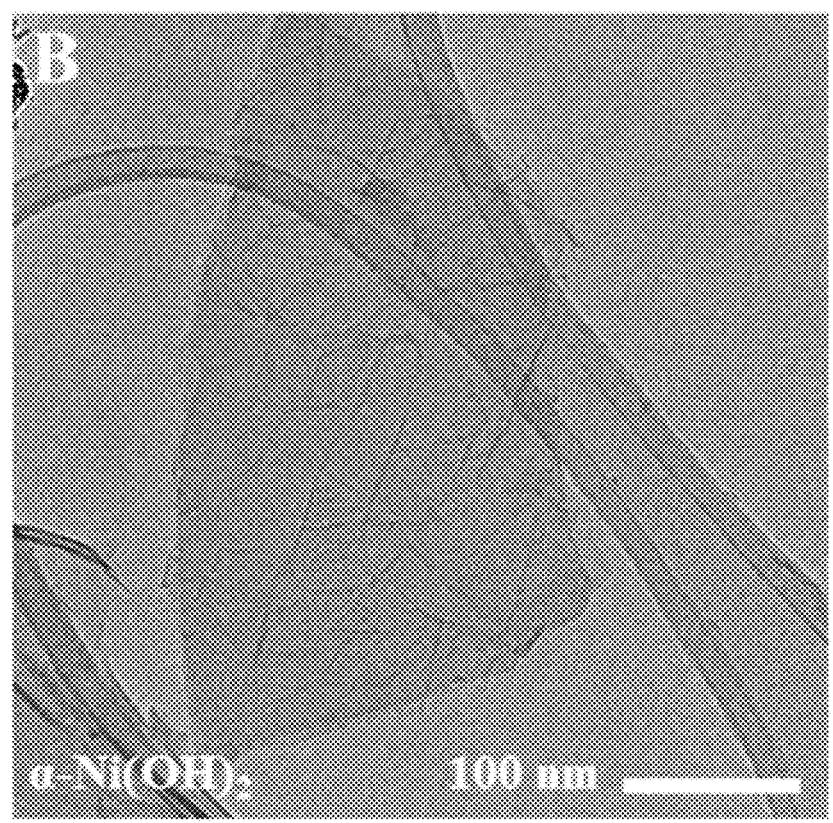

Scanning Electron Microscopy and Transmission Electron Microscopy Characterization Scanning electron microscopy (SEM) and transmission electron microscopy (TEM) images of the as-prepared Pt-decorated $Ni(OH)_2$ (notated as $Ni(OH)_2$@Pt), 200° C.-treated (NiPt-200) and 300° C.-treated (NiPt-300) are shown in FIGS. 1B-G. The $Ni(OH)_2$ material exhibits a structure composed of interconnect nanosheets with micron-sized lateral (planar) dimensions for the nanosheets (FIGS. 10A-B). After deposition of Pt onto $Ni(OH)_2$, the $Ni(OH)_2$@Pt material shows the presence of nanosheets with micron-sized lateral (planar) dimensions and thicknesses of approximately 10 nm. The $Ni(OH)_2$@Pt material maintains the nanosheet morphology of the $Ni(OH)_2$ nanosheet precursor and is predominately covered with a high density of Pt nanoparticles (~2 nm diameter); however, some Pt particles aggregates (~20 nm diameter) as well as atomically distributed Pt atoms at the $Ni(OH)_2$ surface are also observed (FIGS. 11A-F).

Figure 9A:
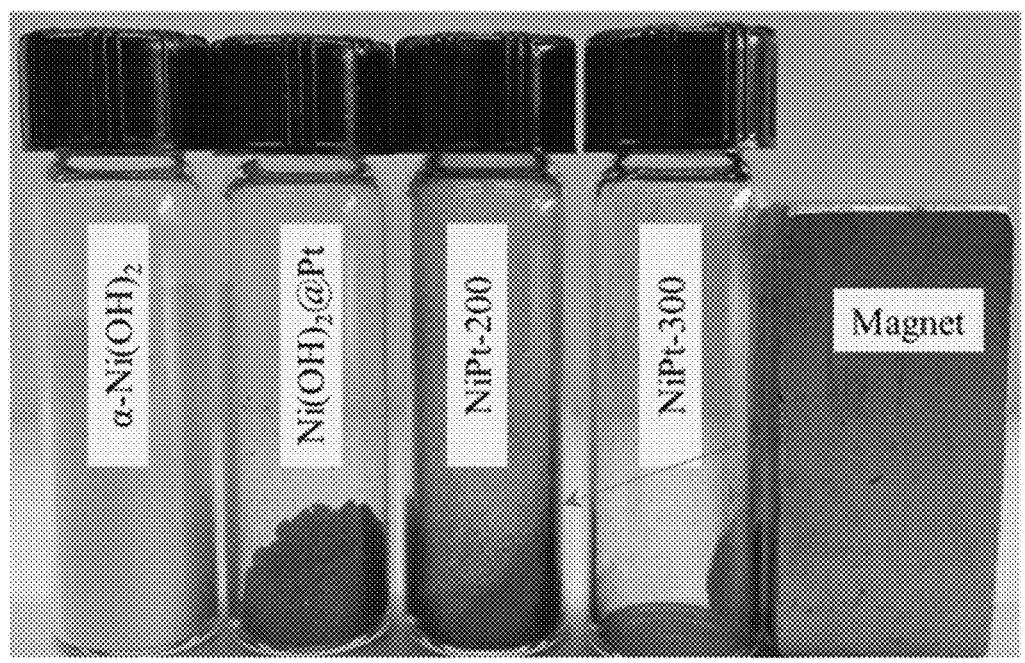
FIGS. 9A-B depict samples of 2D-$Ni(OH)_2$ nanosheets precursor and as-prepared Ni—Pt electrocatalysts. The samples NiPt-200 and NiPt-300 showed magnetic features (A); Effect of the thermal treatment over $Ni(OH)_2$ nanosheets with and without Pt nanoparticles (B).
Figure 9B:
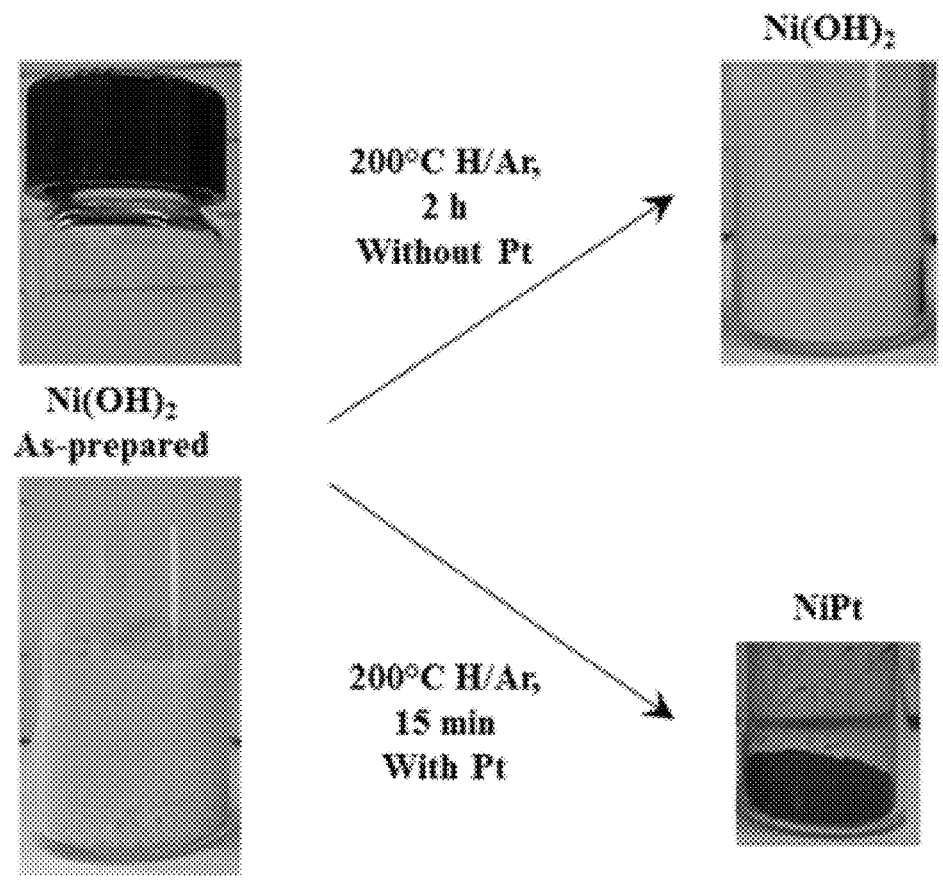

The sample was heated under reducing conditions ($H_2$/Ar) to promote direct Pt—Ni interaction and transform the $Ni(OH)_2$ into metallic Ni ($Ni(OH)_2 + H_2 \rightarrow Ni + 2H_2O$). As shown in FIGS. 1B-G, heating the as-prepared $Ni(OH)_2$@Pt sample under $H_2$/Ar at 200° C. or 300° C. results in the creation of a 2D nanoframe architecture or catalyst nano-architecture with an interconnected network of solid and pores within the 2D framework. The thermally treated samples exhibited Brunauer-Emmett-Teller (BET) surface areas of 38 and 16.5 $m^2 g^{-1}$ for the NiPt-200 and 300 NiPt-300 catalysts respectively. As a control, $Ni(OH)_2$ was heated by itself (without Pt) under similar conditions ($H_2$/Ar for 2 h at 200° C.), however no apparent changes in the material were detected (FIG. 9). Based on this observation, at the conversion of $Ni(OH)_2$ to metallic Ni in such a short time was likely facilitated by the spillover of active H-species formed on Pt nanoparticles.

High Resolution Scanning Transmission Electron Microscopy Characterization

To further understand the morphology and structural changes upon thermal treatments, scanning transmission electron microscopy (STEM) was used to characterize the as-prepared $Ni(OH)_2$@Pt, NiPt-200, and NiPt-300 samples (FIGS. 2A-F). High angle annular dark field (HAADF)-STEM images of $Ni(OH)_2$@Pt showed the (001) lattice fringes of $Ni(OH)_2$ as well as Pt nanoparticles (~2 nm diameter). Higher concentrations of Pt on the $Ni(OH)_2$ basal-plane compared with the edges were observed which suggests that different surfaces of the edges and planes of $Ni(OH)_2$ nanosheets influenced the Pt deposition process (FIG. 11C). The STEM images of the thermally-treated samples (FIGS. 2B,C) show that the 2D framework is composed of a network of interconnected crystallites and pores. In particular, the heated samples no longer show the presence of isolated Pt nanoparticles as within $Ni(OH)_2$@Pt, but rather that Pt is dispersed on the surface forming a Pt-enriched layer and Pt within the solid network (FIGS. 2D-F).

Energy dispersive X-ray spectroscopy (EDS) elemental mapping further supports that Pt nanoparticles are no longer observed within the heated samples, and Pt and Ni are well distributed within the solid network (FIGS. 12A-L). The dynamics of Pt segregation and surface evolution were dramatically affected by the temperature. Based on analysis of the high resolution TEM images, we consider that the temperature-induced structural transformation initiates at the Pt-rich sites where the small particle size and strong interaction with the $Ni(OH)_2$-support promote a dynamic "melting" process that results in interconnection of nanoparticles, as well as alloying and reduction of $Ni(OH)_2$. As-prepared, the NiPt samples showed the presence of a NiOx-rich layer ontop of a Pt-rich layer. A more homogeneous Pt distribution was observed for NiPt-300, while more local Pt-rich regions (lighter colored regions) were observed for NiPt-200 (FIGS. 2B-C and FIGS. 12E-F) which is attributed to increased Pt migration at higher temperatures. Based on the Z contrast imaging, the distribution of Pt and Ni within the crystallites can be observed within the HAADF images (FIGS. 2E-F) where brightest atoms correspond to Pt and the lighter atoms correspond to Ni.

X-Ray Diffraction Characterization

X-ray diffraction (XRD) (FIG. 3) was used to characterize the as-prepared $Ni(OH)_2$ and Ni—Pt 2D nanoframes which were compared with commercial Pt/C-Etek. The XRD pattern of the $Ni(OH)_2$ nanosheet precursor is consistent with an α-$Ni(OH)_2$ crystalline phase that consists of a hexagonal close packed (hcp) structure (JCPDS 22-0444). The high relative intensity diffraction peak at 2θ=12.3° corresponds to the (001) basal plane with an interplanar distance of 7.18 Å. The interlayer distance measured from XRD (7.18 Å) differs from the value measured by STEM (6.3 Å) (FIG. 2A). This difference is considered to primarily arise from loss of structural water due to the high vacuum conditions used for STEM analysis since the as-prepared $Ni(OH)_2$ is a hydrated phase with interlayer $H_2O$ that can be removed under vacuum thereby reducing the interlayer distance. After Pt deposition, the powder XRD of $Ni(OH)_2$@Pt shows phases that correspond to both the α-$Ni(OH)_2$-hcp phase and a face-centered cubic (fcc) Pt (JCPDS 04-0802) phase which has diffraction peaks at 2θ=39.8, 46.3 and 67.7° corresponding to the Pt (111), (002), and (022) planes respectively. For the $Ni(OH)_2$@Pt sample, the 2θ angle of the (001) plane of α-$Ni(OH)_2$ at 12.3° remains unchanged compared with that of as-prepared α-$Ni(OH)_2$, suggesting that the interlaying spacing remains unaffected by the inclusion of Pt on the surface.

After thermal treatment, significant structural modifications were observed in the XRD patterns. The thermally treated samples showed the three main XRD peaks corresponding to Pt-fcc, and diffraction peaks consistent with a metallic Ni-fcc phase. The presence of a metallic Ni-phase was consistent with the sample developing magnetic properties (FIG. 9). The Pt (111) diffraction peaks of 2θ=39.9° for $Ni(OH)_2$@Pt and 2θ=40.1° for NiPt-200 and NiPt-300 were slightly shifted to higher 2θ values when compared with commercial Pt/C-Etek (39.2°) which supports that the Pt lattice distance was altered by incorporation of Ni. Smaller Pt—Pt interatomic distances is attributed to the formation of a Pt alloy due to the interaction of the alloying element. In addition, the presence of a shoulder at lower angles than observed for metallic Ni diffraction peaks supports the formation of a Ni—Pt alloy. Based on analysis of the XRD and selected area electron diffraction (SAED) (FIG. 13), for both the NiPt-200 and NiPt-300 samples, the Ni-rich phase was consistent with $Ni_{0.92}Pt_{0.08}$ while the Pt-rich phase was consistent with $Ni_{0.052}Pt_{0.948}$. Unlike NiPt-200, the NiPt-300 sample did not present diffraction peaks associated with $\alpha$-Ni(OH)$_2$ due to a higher reduction temperature used.

Characterization after Electrochemical Conditioning

Electrochemical or acid treatments are commonly used as a dealloying step in the synthesis of Pt alloys to remove the unstable non-noble metals. Ni is known to dissolve or passivate under acidic conditions. Based on the expected transformations within the electrochemical steps and to better correlate the structure with the oxygen reduction activity results, the catalyst structure was also characterized after electrochemical conditioning (notated as "AEC"), Ni(OH)$_2$@Pt-AEC, NiPt-200-AEC and NiPt-300-AEC, which comprised cyclic voltammetry (CV), carbon monoxide (CO)-stripping and linear voltammetry over the ORR potential region.

Shown in FIGS. 4A-R are STEM images and EDS (spot and/or linear) mapping of the catalysts after electrochemical conditioning. The nanosheet morphology of Ni(OH)$_2$@Pt was maintained after electrochemical conditioning (Ni(OH)$_2$@Pt-AEC) as shown in FIG. 4A. After electrochemical conditioning, the Ni(OH)$_2$@Pt material showed an increased average Pt particle size and number of agglomerates consistent with coalescence and migration of the small nanoparticles during the potential cycling; however, the Ni/Pt elemental ratio remains constant compared with the as-prepared material. The EDS-spot analysis (FIGS. 4E-F) demonstrated that the presence of Pt is now concentrated within the nanoparticles and resulted in an increase of Pt lattice spacing of 2.25 Å compared with 2.17 Å for the as-prepared material (FIG. 4D).

For NiPt200-AEC and NiPt300-AEC, the 2D framework and the interconnected network of crystallites and pores remained after electrochemical conditioning, as shown by HAADF-STEM images (FIGS. 4G-K and 4M-Q) (Further support presented in FIG. 14). The elemental mapping of the NiPt200-AEC and NiPt300-AEC catalysts (FIGS. 4 G-I and 4M-O) demonstrate that even after electrochemical conditioning, Ni is still present, although the relative atomic percent decreased from 50 atomic % in NiPt200-AEC to 20 atomic % in NiPt300-AEC. The large decrease of Ni content in the sample NiPt300-AEC is attributed to a more severe dealloying process which also promoted the formation of micropores (FIG. 4M). The electrochemical treatment resulted in the removal of unstable Ni phase and surface reconstruction resulting in a higher concentration of Ni within the interior of the crystallite protected by a Pt-rich shell as observed in the EDS line profiles (FIGS. 4L,R). After electrochemical treatment, the high resolution microscopy images (FIGS. 4J,P) showed Pt (111) lattice spacings of 2.13 Å and 2.08 Å for the NiPt-200-AEC and NiPt-300-AEC samples, respectively, which are still significantly smaller than that of $Pt_{fcc}$ (111) (2.24 Å). The SAED images after electrochemistry (FIG. 13) further showed that the metallic Ni signal was no longer observed, however the ring attributed to Pt (111) was observed at 2.24 Å for NiPt-200-AEC and at 2.25 Å for NiPt-300-AEC. The differences between the Pt(111) lattice spacings from high resolution TEM images and SEAD for samples after electrochemical conditioning may be due to local structural variations or compositional relaxation of the Pt structure due to Ni leaching. Structural changes of Pt alloy nanoparticles evolve under reactive conditions and can lead to compositional segregation along specific facets.

In addition to Ni interaction, Pt lattice strain due to surface tension could affect the Pt lattice spacing since prior work has shown that unit cell parameter shifts of 0.03 Å were observed upon decreasing the size of nanoparticles from 28 nm to 2 nm. Based on the microscopy which shows Pt—Ni interaction (FIGS. 2 and 4) and the ~2-5 nm crystalline size range within the 2D nanoframes, the incorporation of Ni within structure is considered as the primary factor influencing the Pt lattice spacings, however surface tension effects may also contribute to the Pt lattice spacing shifts.

Based on the characterization of Ni and Pt within the structure using high resolution microscopy images, mapping, and line scans, an approximate representation of the atomic structure of the catalysts after electrochemical treatment is presented in FIG. 4S. The graphical representation is based on experimental line scans that show Pt and Ni are well distributed at the atomic level and that show predominately subsurface Ni (FIGS. 4 L,R). The representation of atomic-level structure (FIG. 4S) is similar to previous models of the atomic arrangements within Pt—Ni extended surfaces. Within the Ni—Pt 2D nanoframes, a "Pt skeleton" rather than "Pt skin" structure is supported by the relative ratios of electrochemical surface area from H desorption and carbon monoxide stripping analysis, as discussed further below.

Electrochemical Characterization Using Cyclic Voltammetry and Carbon Monoxide Oxidation Cyclic Voltammetry.

Figure 5A:
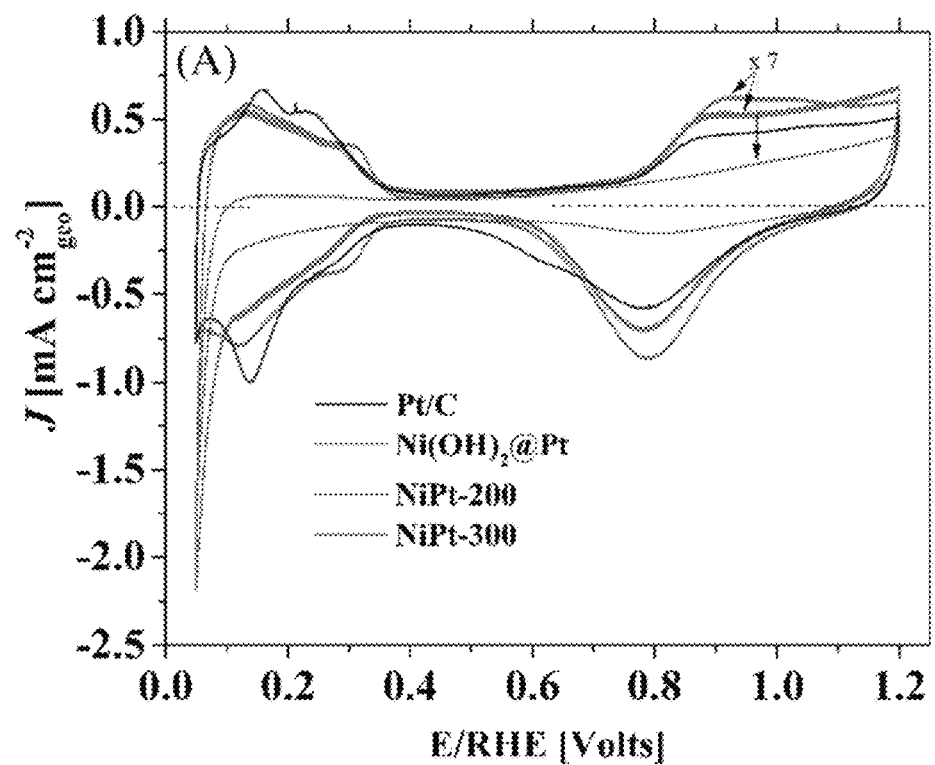
FIGS. 5A-B depicts electrochemistry of unsupported NiPt-200 and NiPt-300 2D nanoframes, $Ni(OH)_2$@Pt, and commercial Pt/C; (A) cyclic voltammetry; (B) carbon monoxide (CO) stripping voltammetry. For the CV (A), the currents for unsupported NiPt-200 and NiPt-300 2D nanoframes, $Ni(OH)_2$@Pt were multiplied by a factor of 7 to facilitate comparison with carbon-supported Pt/C catalysts. For the CO stripping voltammetry (B), the current of the $Ni(OH)_2$@Pt was multiplied by a factor of 10 to facilitate comparison. Platinum loadings were $L_{Pt}$=16 µg $cm^{-2}_{geo}$ (Pt/C), 31 µg $cm^{-2}_{geo}$ ($Ni(OH)_2$:Pt), and 35 µg $cm^{-2}_{geo}$ (NiPt-200 and NiPt-300).

Electrochemical characterization of the catalysts first consisted of cyclic voltammetry and electrochemical CO oxidation (FIGS. 5A,B). The catalyst layer was prepared without the addition of any carbon within the electrode matrix. After immersing the working electrode at controlled potential (0.1 $V_{RHE}$), the NiPt-200 and NiPt-300 catalysts showed a wide oxidation peak around 0.38 $V_{RHE}$ during the first cycles due to leaching of unstable Ni exposed to the electrolyte (FIG. 15). The use of electrochemical dealloying is a generally used approach to remove unstable metals, however this method is not amenable to the use of the catalyst within fuel cell membrane electrode assemblies (ME As) since leaching of metals during the electrochemical dealloying (also called conditioning or activation) step results in metals within the membrane that lowers fuel cell performance. As an alternative to electrochemical dealloying, chemical dealloying treatments also can be used to remove unstable Ni within Pt—Ni alloys.

After the electrochemical activation (40 scans), the voltammograms (FIG. 5A) showed polycrystalline platinum profiles similar to that of the Pt/C, with no distinct voltammetric features due to Ni dissolution. However, some differences were observed. Compared to Pt/C, for NiPt-200 the negative shift of the H desorption peak at 0.118 $V_{RHE}$ assigned to the Pt (110) plane supports that the adsorption energy is modified by the Pt—Ni interaction. In addition, the shoulder at 0.305 $V_{RHE}$ is consistent with the presence of different crystal facets. A positive shift of the potential attributed to the hydrogen evolution reaction (HER) (~0.05 V) was also observed for Ni(OH)$_2$@Pt and NiPt-300. The HER is a structure-sensitive reaction and the morphology, composition, and surface structure can modify the energy of absorbed hydrogen ($\Delta GH°_{ad}$) and therefore the reaction kinetics. Compared with NiPt-200, the NiPt-300 and Ni(OH)$_2$@Pt samples show different Ni, Pt, and O ratios and surface compositions (FIG. 4), and NiPt-300 also shows the presence of micropores (FIG. 4P). The different surface structure and presence of micropores may contribute to the positive shifting of the HER potential, however additional studies are needed to further explain the shifts in the HER potential.

For the NiPt-200 and NiPt-300 samples, the potentials for oxide formation and reduction were not significantly shifted compared with Pt/C. Shifting of oxide formation/reduction potential to more positive potentials has been generally correlated with improved ORR activity, however this is not always the case. In this case, the oxide reduction potential remains similar to that of Pt/C, however XRD (FIG. 3), STEM images, (FIG. 4), EDS line scans (FIG. 4), and SAED (FIG. 13) characterization strongly support Ni—Pt interaction and contraction of the Pt—Pt bond distance. In addition, as discussed below clear shifts in the CO stripping potentials (FIG. 5B) for both NiPt-200 and Nt-Pt-300 and positive potential shifts for the ORR half wave potentials (FIG. 6A) were observed.

Electrochemical Carbon Monoxide Oxidation.

Figure 5B:
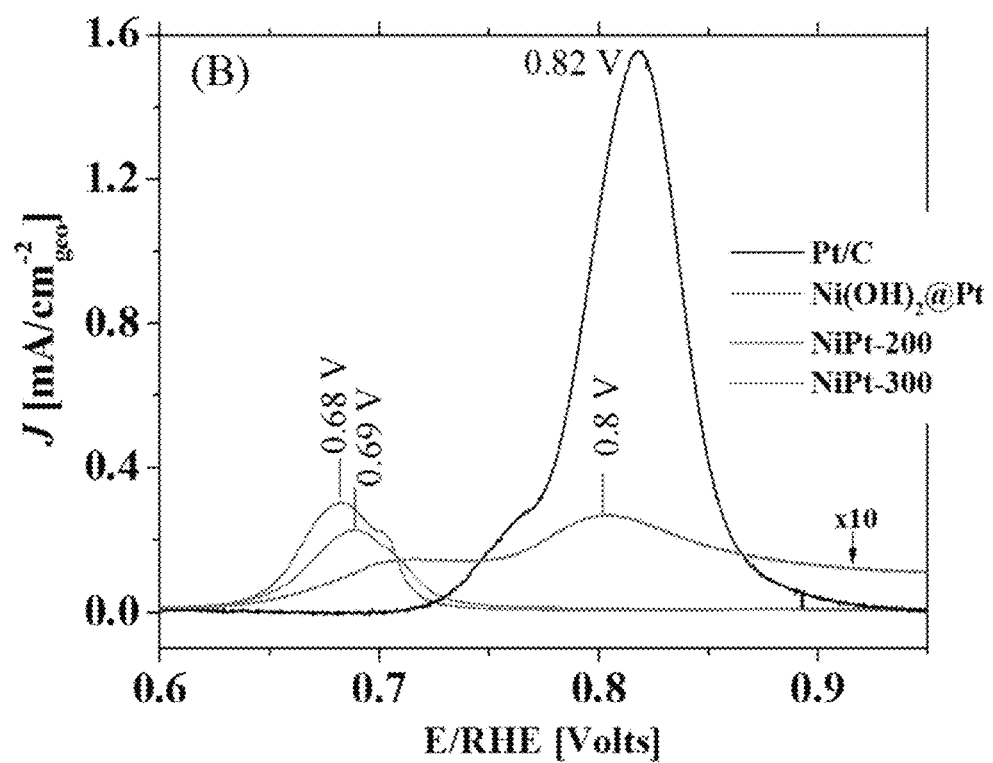

Electrochemical CO oxidation (CO stripping) was also used to characterize the catalyst surface since CO stripping is a surface sensitive reaction that depends on surface conformation, composition, particle size and shape. Shown in FIG. 5B are CO stripping voltammograms between 0.6 and 1.0 $V_{RHE}$ after subtraction of the second scan. The Ni(OH)$_2$@Pt sample exhibited two CO oxidation peaks at 0.73 V and 0.81 V which are attributed to CO oxidation at Pt agglomerates and small Pt particles (~1-2 nm) respectively. The Ni—Pt 2D nanoframes display predominantly single CO stripping peaks at considerably lower potentials (0.68-0.69 V) compared with commercial Pt/C (0.82 V). The lower onset voltage for CO oxidation on Pt within the 2D nanoframes is consistent with weaker CO binding to Pt interacting with Ni. The low onset voltage for CO oxidation also makes the metallic 2D nanoframes good candidates for methanol and formic acid oxidation which have important energy applications.

The Pt electrochemical surface area (ECSA$_{Pt}$) estimated by the CO-stripping peak integration was 1.7 f 0.2 m$^2$ g$^{-1}$ for Ni(OH)$_2$@Pt and then increased after heating to 7.4 f 1.8 and 5.3±0.6 m$^2$ g$^{-1}$ for NiPt-200 and NiPt-300, respectively. The experimental $Q_{CO}/2Q_H$ ratios were 0.97 and 1.04 for NiPt-200 and NiPt-300 respectively. The $Q_{CO}/2Q_H$ ratios are near unity and are consistent with a Pt-skeleton arrangement (~1) rather that a Pt-skin configuration which showed a $Q_{CO}/2Q_H$ ratio of ~1.5. The microscopy analysis (FIG. 4) supports that the increase in Pt surface area for the NiPt-200 and NiPt-300 compared to Ni(OH)$_2$@Pt is due to the formation of pores and Pt distribution within the nanoframe rather than within nanoparticles as observed for Ni(OH)$_2$@Pt. The lower electrochemical Pt surface areas (ECSA$_{Pt}$) of the NiPt-200 and NiPt-300 catalysts compared with the BET surface areas (38 and 16.5 m$^2$ g$^{-1}$, respectively) obtained from nitrogen physisorption measurements most likely result from Pt diffusion below the surface during heating and incomplete access to the electroactive sites caused by layer stacking and/or hindered mass-transport caused by lack of wettability of meso- and micropores within the nanostructure. Therefore, modification of the process can be used to promote higher concentration of Pt atoms on the surface and access to the surface sites.

Electrochemical Oxygen Reduction Reaction Activity

Figure 6A:
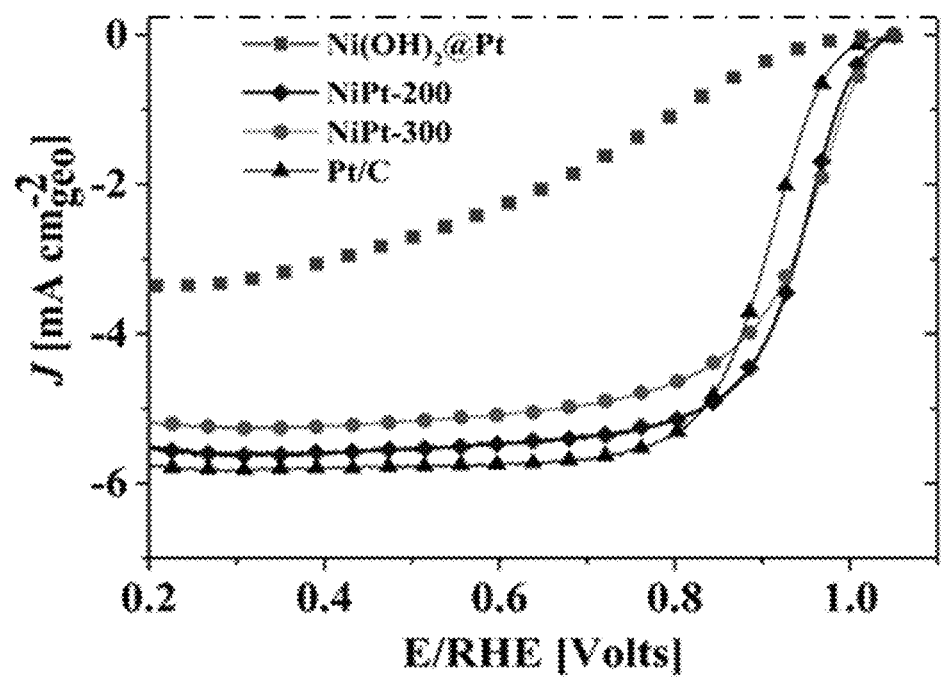
FIGS. 6A-B depicts electrochemistry of unsupported NiPt-200 and NiPt-300 2D nanoframes, $Ni(OH)_2$@Pt, and commercial Pt/C; (A) Potentiodynamic scans in oxygen reduction reaction (ORR) region (electrolyte 0.1 M $HClO_4$ $O_2$-saturated, scan rate: 20 mV $s^{-1}$, 1600 rpm); (B) comparison of ORR specific activities (left) and mass-normalized activities (right) at 0.9 $V_{RHE}$. Platinum loadings were $L_{Pt}$=16 µg $cm^{-2}_{geo}$ (Pt/C), 31 µg $cm^{-2}_{geo}$ ($Ni(OH)_2$:Pt), and 35 µg $cm^{-2}_{geo}$ (NiPt-200 and NiPt-300). Error bars represent the standard deviation of repeated measurements.
Figure 6B:
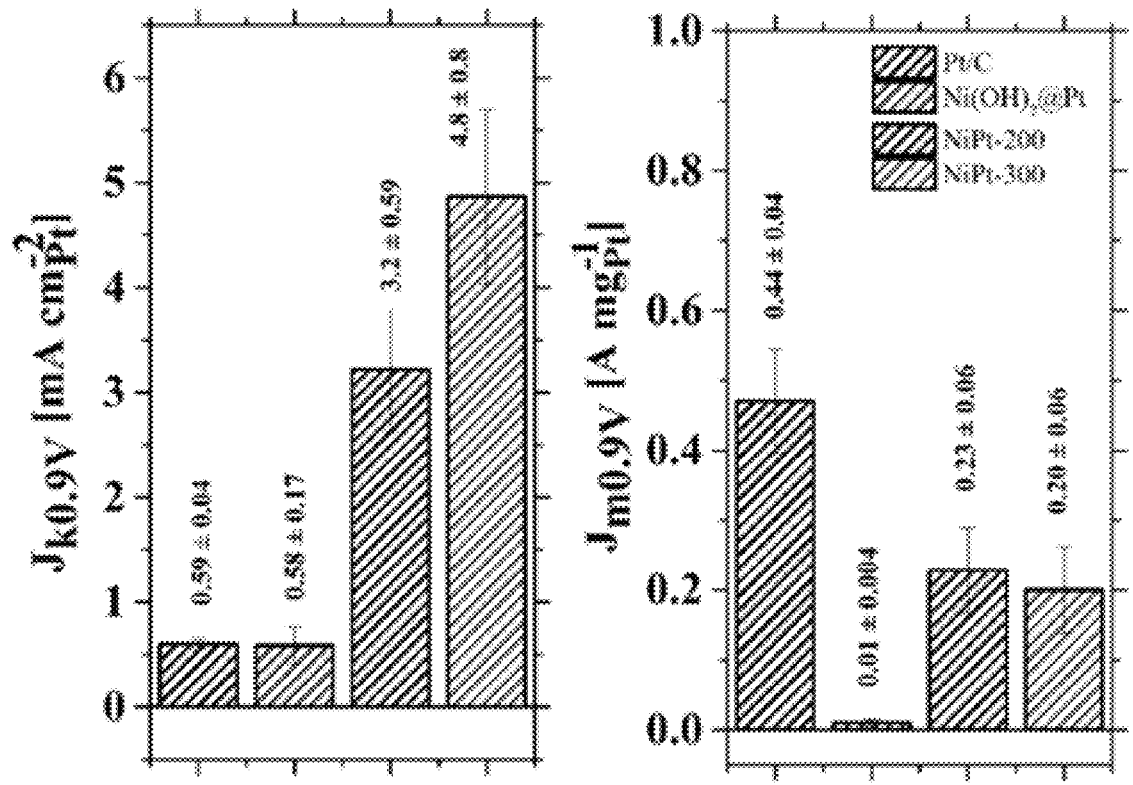

Following analysis of the structure and surface of the 2D nanoframes, the electrochemical ORR activity was determined using a rotating disc electrode (RDE) configuration in O$_2$-saturated 0.1 M HClO$_4$ (FIG. 6A). Without carbon within the electrode matrix, the Ni(OH)$_2$@Pt sample showed low electrochemical performance due to the poor electronic conductivity of the material (1.9×10$^{-3}$ S cm$^{-1}$) which electronically limits access to Pt. For the NiPt-200 and NiPt-300 nanoframes, the half wave potential was ~0.94 V which was ~70 mV more positive than Pt/C. The ORR specific and mass activity (FIG. 6B) were calculated by normalizing the kinetic current to the ECSA and the Pt loading on the electrode. As expected, the specific activity and mass activities of Ni(OH)$_2$@Pt were lower than Pt/C. However, the NiPt-200 and NiPt-300 2D nanoframes showed specific activities at 0.9 $V_{RHE}$ of 3.2±0.6 and 5.8±2.4 mA cm$_{Pt}^{-2}$ respectively. The specific activity of NiPt-300 was 10.2 times higher than the measured specific of commercial Pt/C (0.57±0.03 mA cm$_{Pt}^{-2}$). The high specific activities of the Ni—Pt nanoframes are primarily attributed to the interaction of Pt with Ni (FIG. 4), however a number of additional factors may also contribute to the high activity, as described below. Smaller Pt lattice distances due to Ni interaction can modify the electronic structure and result in weakened OH$_{ads}$ binding and lower coverage of site-blocking OH$_{ads}$ which can lead to higher activity.

The enhancement of the specific activity of NiPt-300 compared with NiPt-200 may be due to a combination of several contributions including (i) complete transformation of Ni(OH)$_2$ within the NiPt-300 structure (FIG. 3), (ii) the presence of micropores within the structure of NiPt-300 (FIG. 4M), and/or (iii) differences in surface and subsurface structure between the samples as evidenced from the line scans and elemental mapping (FIG. 4). The different thermal treatments used for NiPt-200 and NiPt-300 resulted in different Ni—Pt surface compositions, and surface composition affects the electronic structure (i.e. Pt d-band center) which can lead to higher activity. Further, differences in surface compositions can alter the mechanism of Ni dealloying and pore formation, which in turn can contribute to improving the stability and activity. The presence of nanopores within NiPt-300 (FIG. 4M) may improve the reaction kinetics due to confinement and/or proximity effects. In addition, a high degree of highly coordinated Pt atoms within the Ni—Pt nanoframes may contribute to high activity and stability due to a higher fraction of highly coordinated Pt atoms.

Regarding the Pt mass activities of the catalysts (FIG. 6B), the Ni—Pt nanoframes showed mass activities of 0.33±0.1 and 0.29±0.1 Å mg$_{Pt}^{-1}$ for the NiPt-200 and NiPt-300 samples respectively, which were lower in comparison with Pt/C (0.40±0.02 Å mg$_{Pt}^{-1}$). Within the 2D nanoframes, the Pt at the surface is highly active as supported by the high specific activity. The lower mass activity of NiPt-200 and NiPt-300 compared to Pt/C is due to the low platinum ECSA$_{Pt}$ within the NiPt nanoframes caused by diffusion of Pt below the surface during the thermal treatment process which makes it electrochemically inaccessible.

Figure 16:
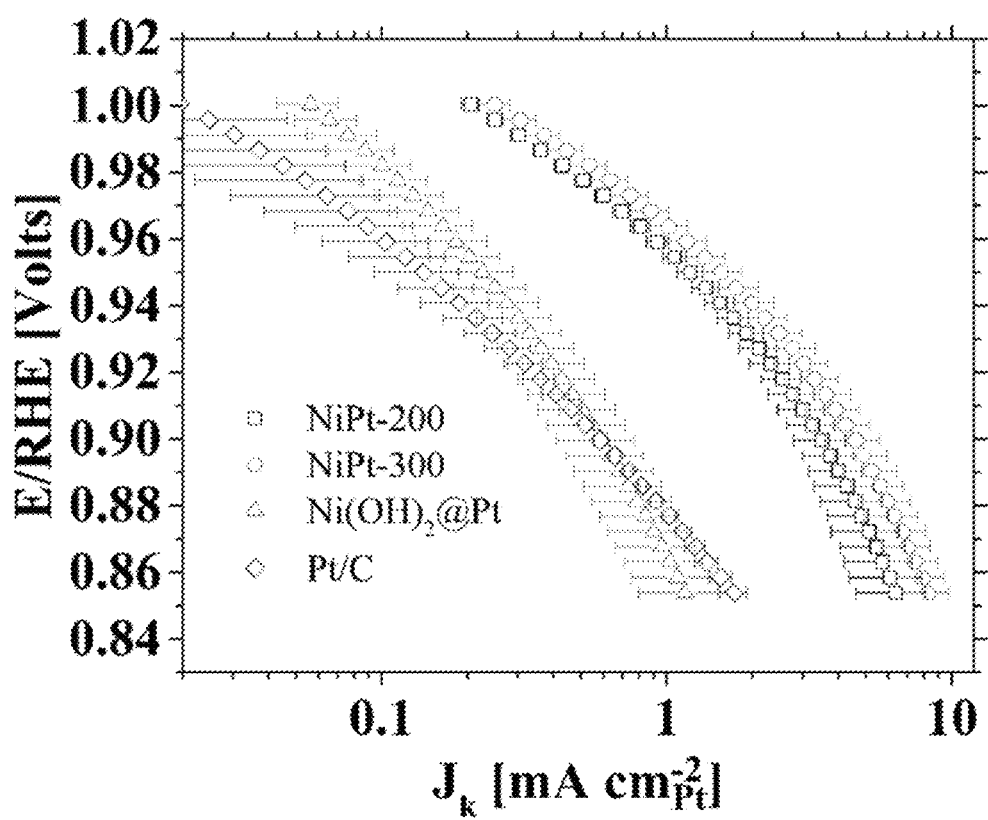
FIG. 16 depicts Tafel plots of unsupported $Ni(OH)_2$@Pt, NiPt-200, and NiPt-300 compared with Pt/C; activated catalysts (before accelerated stability testing).

Tafel slopes at 25° C. of 65±3.7 and 63±3.6 mV dec$^{-1}$ determined for the NiPt-200 and NiPt-300 nanoframes respectively (FIG. 16) are slightly lower but in the range of the Tafel slope for Pt/C from this study (69±0.7 mV dec$^{-1}$) which suggests that similar to as observed for polycrystalline Pt, the first electron transfer is the rate determining step for the Ni—Pt nanoframes.

Figure 17A:
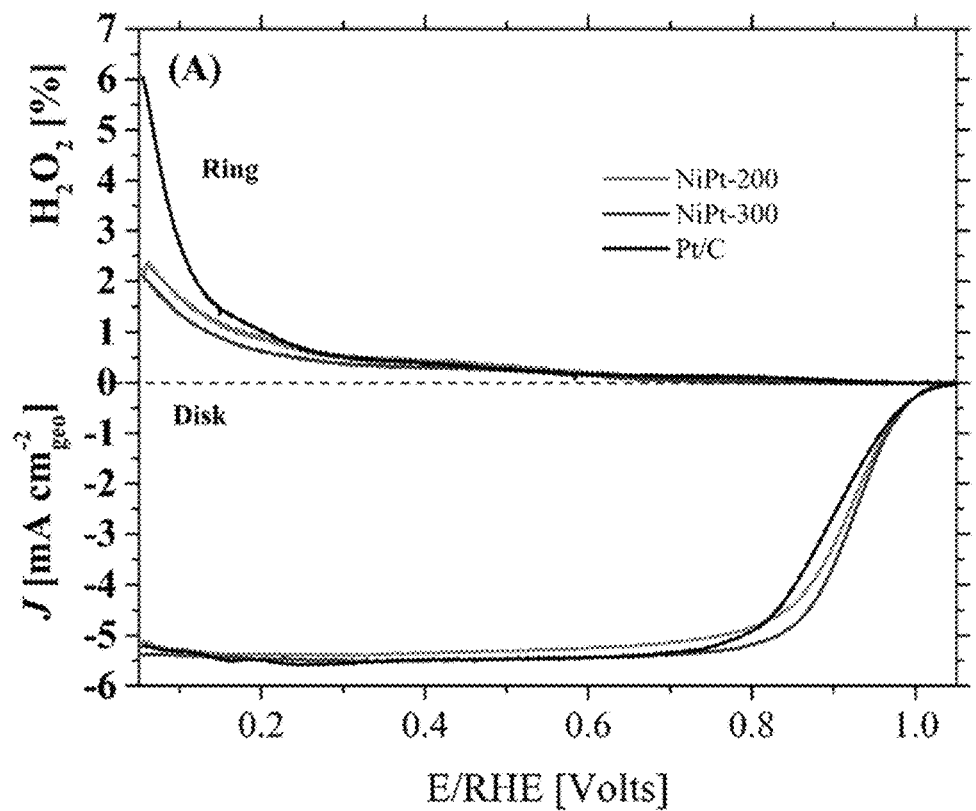
FIGS. 17A-B depict (A) Evaluation of NiPt-200, NiPt-300, and Pt/C within the oxygen reduction reaction (ORR) region using rotating ring disk electrode (RRDE) configuration; (bottom): disk current normalized by geometrical area (0.237 $cm^2$); (top) hydrogen peroxide yield (% $H_2O_2$); electrolyte 0.1 M $HClO_4$ $O_2$-saturated, 1600 rpm; disk scan rate: 20 mV $s^{-1}$; ring potential: 1.4 $V_{RHE}$. (B) Number of electrons (n) transferred per molecule of $O_2$ vs. potential; the total electron-transfer number (n) and the hydrogen peroxide yield (% $H_2O_2$) in the catalyzed ORR were calculated as: [n=4$I_d$/($I_d$-$I_r$/N)] and [% $H_2O_2$=2$I_r$/N/($I_d$+$I_r$/N)] where $I_d$ and $I_r$ correspond to the disk current and ring current respectively, and N is the RRDE collection efficiency, which was determined to be 0.43.
Figure 17B:
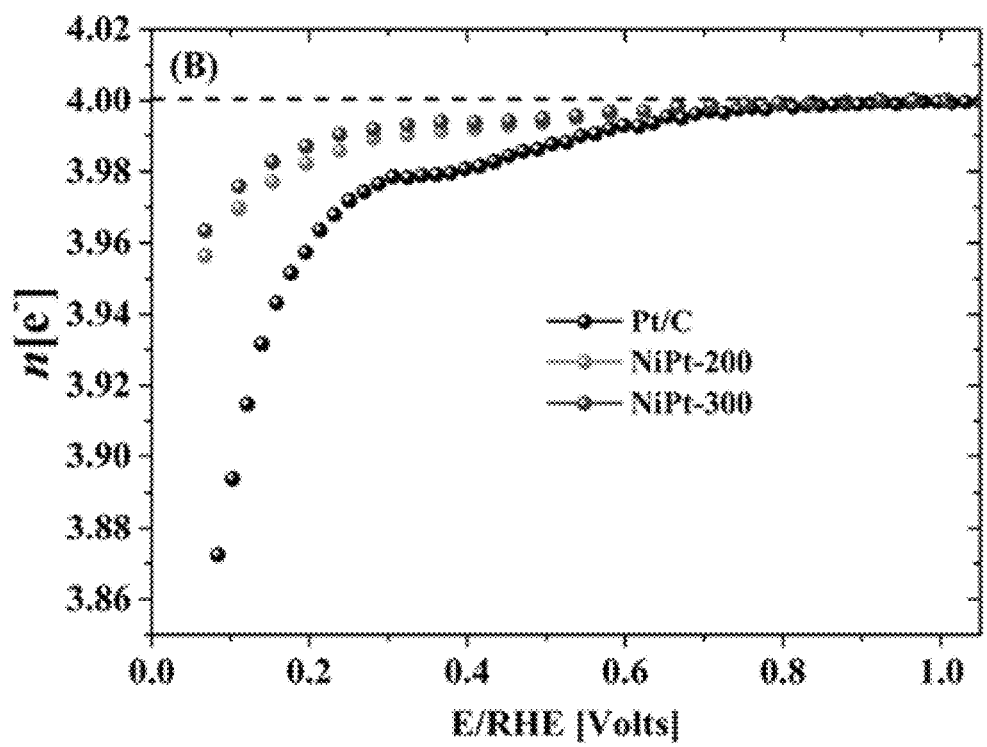

The ORR is a complex reaction which proceeds in either in a four-electron process to H$_2$O or a two-electron process to H$_2$O$_2$. To evaluate the generation of H$_2$O$_2$, rotating ring disc electrode (RRDE) experiments of the NiPt-200, NiPt-300, and Pt/C catalysts were obtained (FIG. 17A). Based on analysis of the ring currents due to H2O2 generation, in the voltage region of 0.6 to 1.05 $V_{RHE}$ the ORR on the Ni—Pt nanoframes proceeds through a four electron reaction mechanism without appreciable $H_2O_2$ production. This is represented graphically in FIG. 17B by the number of electron transferred per molecule of $O_2$ versus the potential. Below 0.6 $V_{RHE}$, the fraction of $H_2O_2$ becomes more significant and increases considerably in the $H_{upd}$ region (E<0.4 $V_{RHE}$), although $H_2O_2$ generation remains lower for both NiPt-200 and NiPt-300 (~2%) compared with Pt/C (~6%) (FIG. 17A). Non-uniform coverage and thickness of the catalyst layer on the electrode could affect $H_2O_2$ production rates similar to the effects of film quality that affect mass transport processes within the film and result in variations in ORR activity. The different surface structure of the NiPt 2D nanoframes compared with Pt/C may contribute to lower H2O2 production rates.

Electrocatalyst Stability Testing.

In general, the stability of Pt-based PEMFC ORR catalysts has been shown to be related to (i) active catalyst material degradation due to Pt dissolution, agglomeration, Oswald ripening, and particle detachment, and (ii) corrosion of the support material. Although carbon is one of the most widely used catalyst support materials for Pt for PEMFC applications, carbon corrosion occurs under operating conditions which compromises the catalyst lifetime. Carbon is thermodynamically unstable above ~0.2 $V_{RHE}$ in aqueous electrochemical environments, and the corrosion of carbon can also be accelerated by the presence of Pt.

During fuel cell start-up and shut-down protocols, hydrogen starvation at the anode can occur and lead to elevated voltages of ~1.3 $V_{RHE}$ to as high as 1.8 $V_{RHE}$ at the cathode. Voltages above 1.0 $V_{RHE}$ can lead to significant catalyst due to enhanced corrosion of the carbon support as well as increased rates of Pt dissolution. Determining the stability of Pt—Ni catalysts over cycles which involve potentials well above 1.0 $V_{RHE}$ is of significant interest to enable catalysts with long-term durability over not only load cycles but also start-up/shut down cycles.

To evaluate the stability of the 2D nanoframe catalysts within the elevated potential region encountered during start-up/shut down where typical carbon-based materials significantly degrade, an accelerated stability test consisting of 1000 cycles between 0.6 and 1.3 $V_{RHE}$ was used. The use of the upper potential limit of 1.3 $V_{RHE}$ represents a significantly more severe durability test than using an upper potential limit of 1.0 $V_{RHE}$ since increased catalyst degradation occurs a potentials greater than 1.0 $V_{RHE}$ due to enhanced carbon corrosion, higher rates of Pt dissolution, and increased Oswald ripening.

Figure 7:
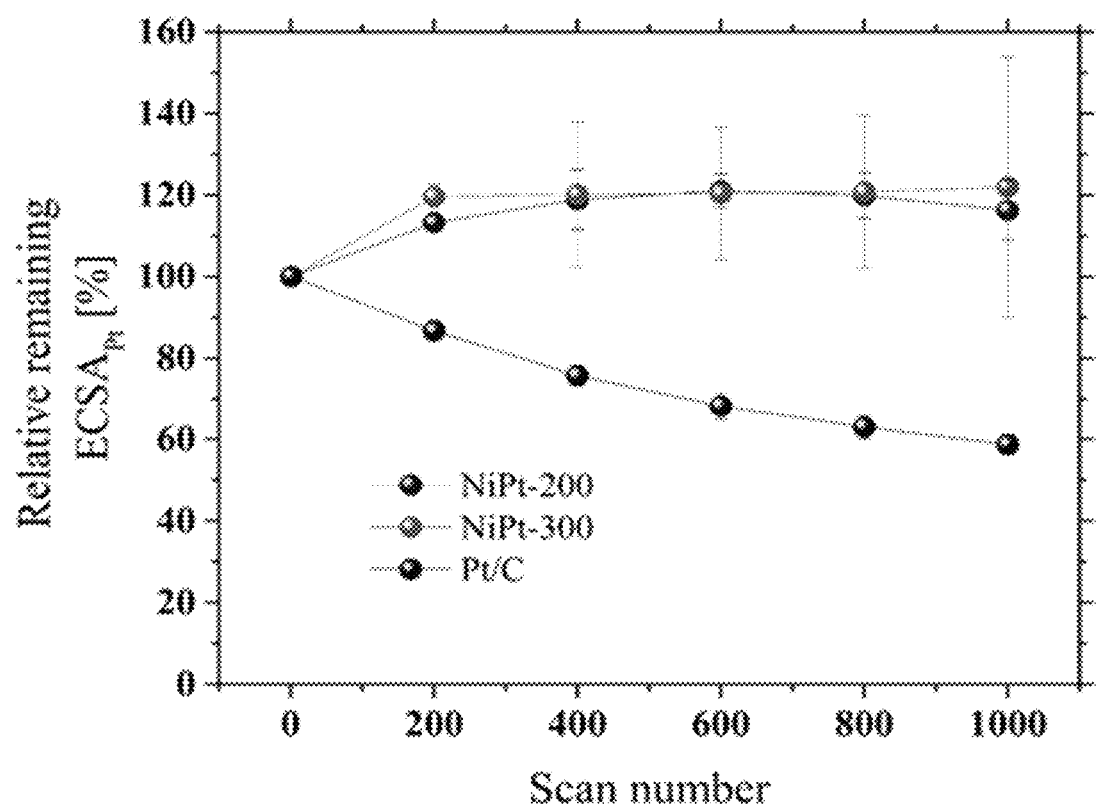
FIG. 7 depicts the comparison of accelerated stability testing of unsupported NiPt-200 and NiPt-300 catalysts and commercial supported Pt/C (Etek): normalized electrochemical surface area ($ECSA_{Pt}$) vs. cycle number; $ESCA_{Pt}$ represented as percent of initial value; stability tests consisted of 1000 cycles over the potential range of 0.6 to 1.3 $V_{RHE}$ in $O_2$-saturated 0.1 M $HClO_4$. Error bars represent the standard deviation of repeated measurements.
Figure 8A:
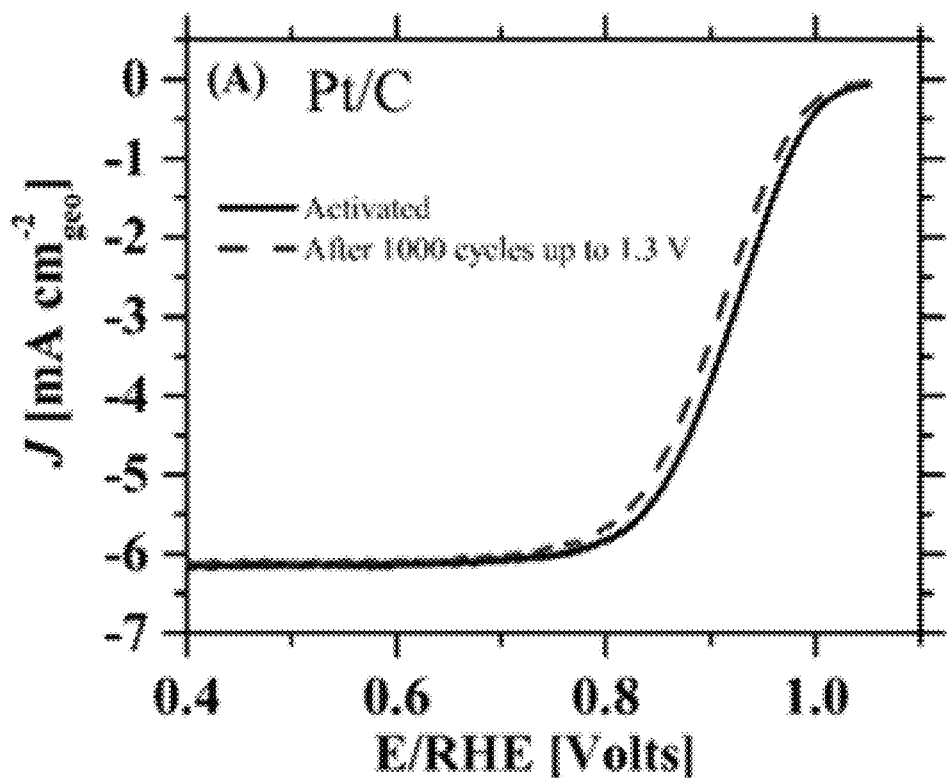
FIGS. 8A-D depict potentiodynamic scans in oxygen reduction reaction (ORR) region for activated catalysts (before stability testing) and catalysts after 1000 cycles between 0.6 and 1.3 $V_{RHE}$ using a scan rate of 100 mV $s^{-1}$ for (A) Pt/C, (B) NiPt-200, and (C) NiPt-300; voltammetry in the ORR region utilized the following parameters: electrolyte 0.1 M $HClO_4$ $O_2$-saturated, scan rate: 20 mV $s^{-1}$, 1600 rpm; (D) comparison of ORR specific activities at 0.9 $V_{RHE}$ for Pt/C, NiPt-200, and NiPt-300 for activated catalysts (before stability tests) and catalysts after 1000 cycles.
Figure 8B:
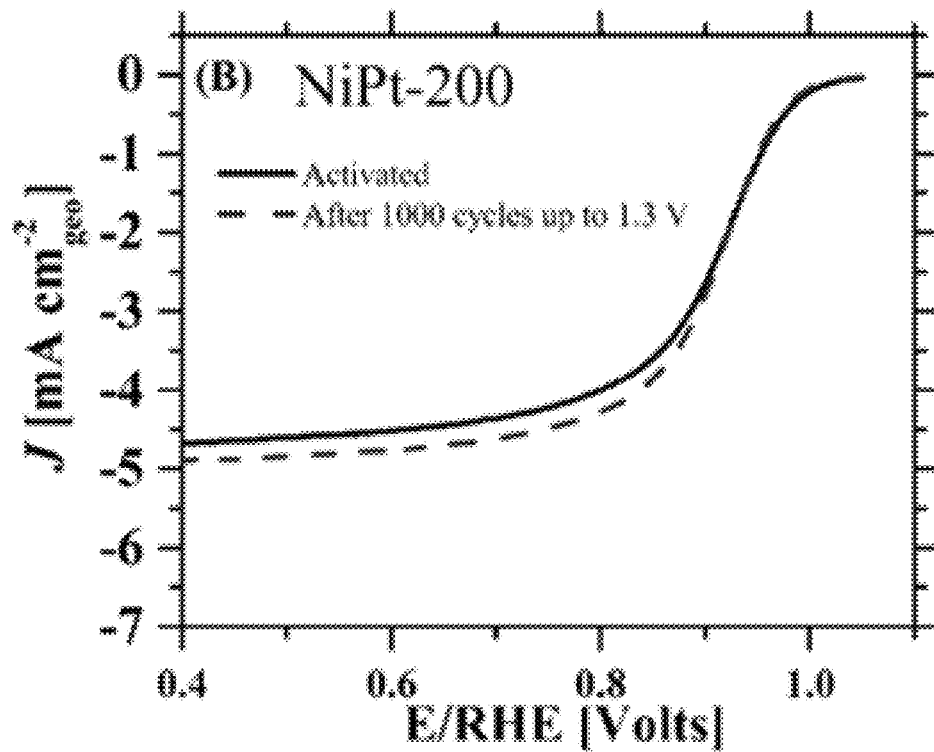
Figure 8C:
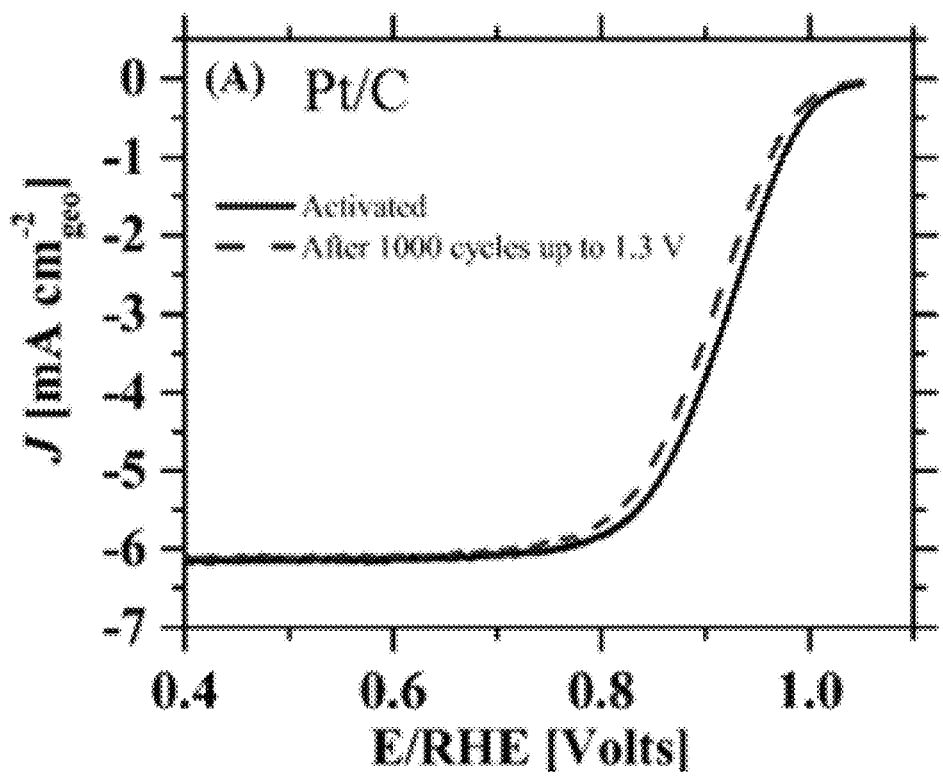
Figure 8D:
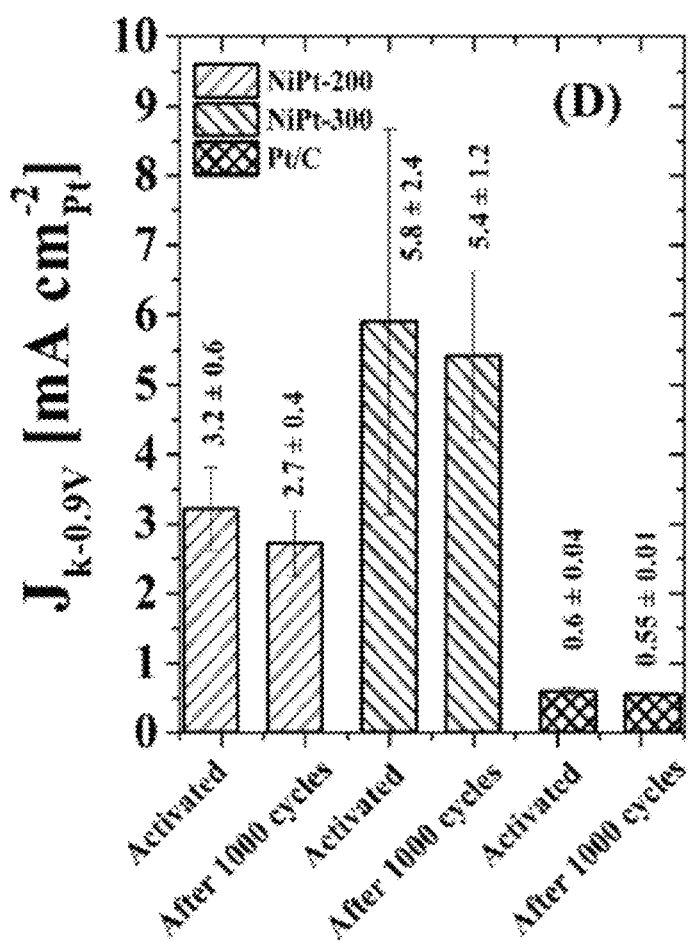
Figure 18A:
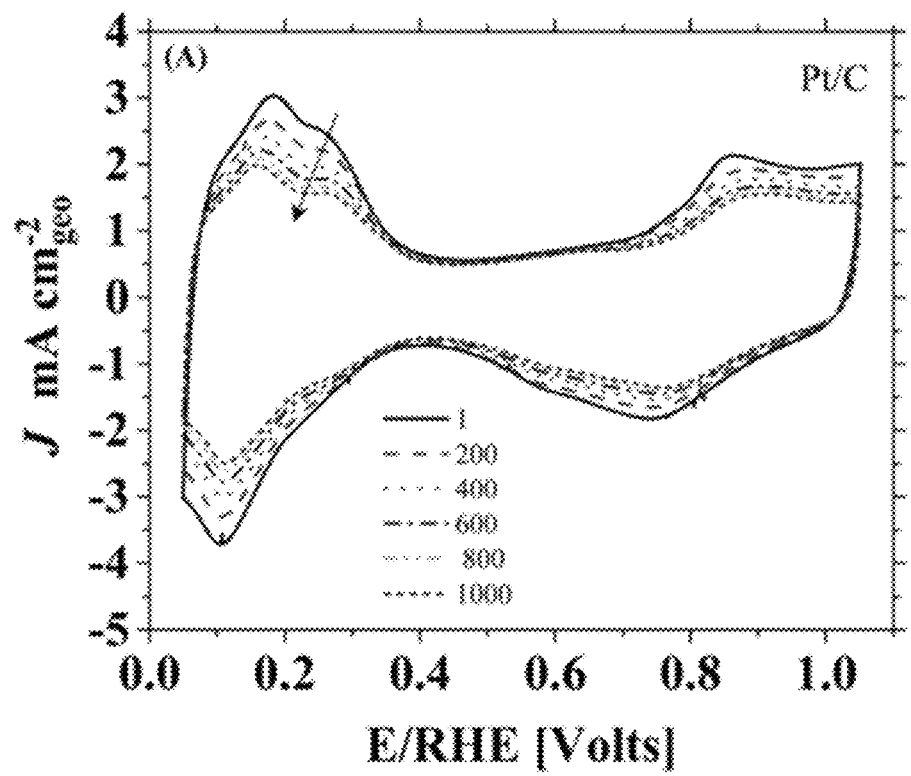
FIGS. 18A-C depict Comparison of cyclic voltammograms (CVs) evaluated at different cycles over the accelerated stability testing for Pt/C (A) and unsupported NiPt-200 (B) and NiPt-300 (C) catalysts; shown are cycles 1, 200, 400, 600, 800, and 1000; electrolyte: Ar-saturated; 0.1 M $HClO_4$; scan rate 100 mV s$^{-1}$.
Figure 18B:
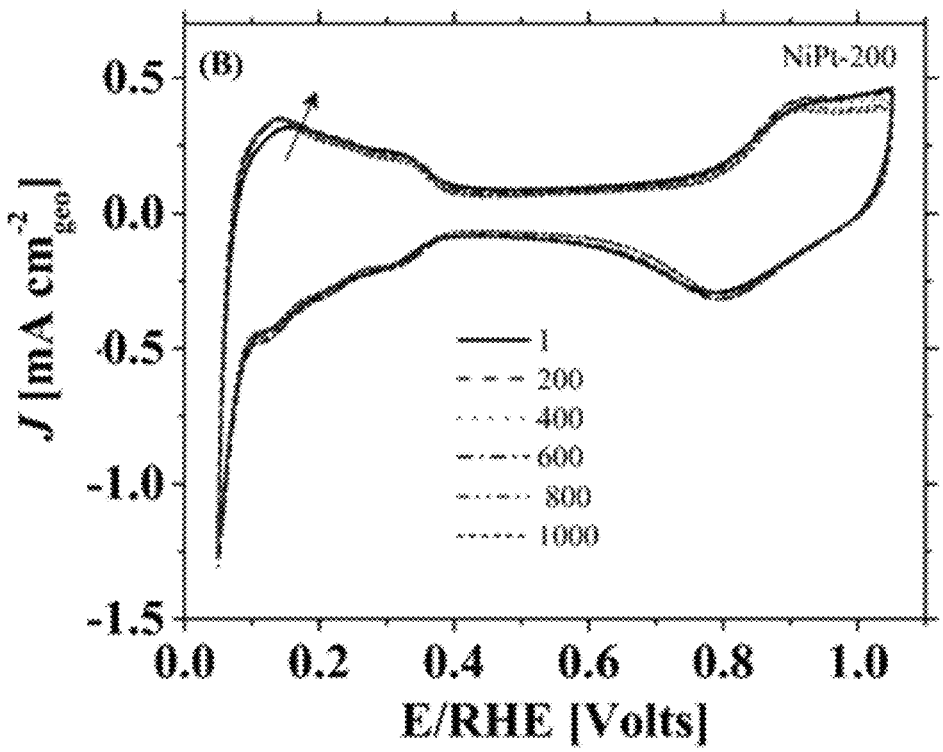
Figure 18C:
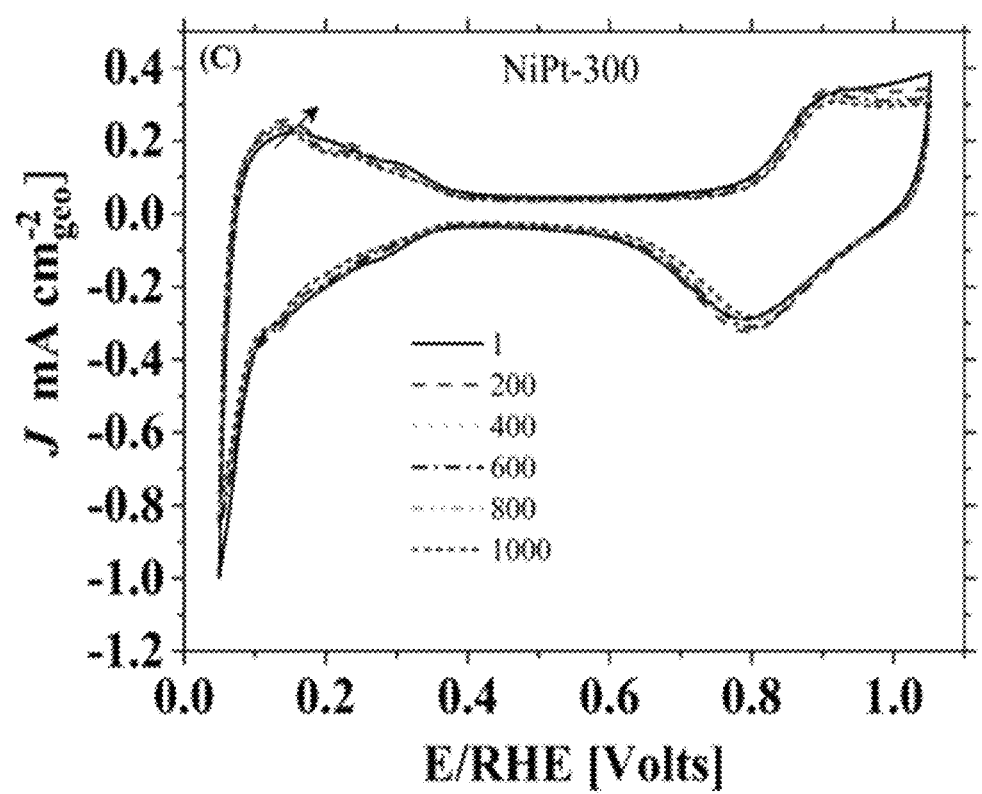

Shown in FIG. 7 are the remaining normalized platinum electrochemical surface areas ($ECSA_{Pt}$) over 1000 potential cycling scans from 0.6 to 1.3 $V_{RHE}$ for unsupported Ni-Pi 2D nanoframe catalysts compared with commercial supported Pt/C (CVs used for stability tests are shown in FIG. 18). For commercial Pt/C, the $ESCA_{Pt}$ showed a continuous decline to 58.7±2.4% of the initial value after 1000 cycles. The observed degradation of Pt/C is consistent with catalyst degradation due to corrosion of the carbon support by electrochemical oxidation, Pt dissolution, and particle growth due to Oswald ripening.

For the accelerated stability tests, the NiPt 2D nanoframe catalysts showed significantly better stabilities than Pt/C catalysts, with 116.3±7.3 and 121.9±31.8% of initial the $ECSA_{Pt}$ after 1000 cycles for the NiPt-200 and NiPt-300 catalysts respectively. The NiPt-200 and NiPt-300 2D nanoframes show comparable $ECSA_{Pt}$ after the 1000 cycles, within the margin of experimental error. The NiPt 2D nanoframe catalysts exhibited an initial increase in $ECSA_{Pt}$ after the first 200 cycles and then showed relatively stable values over the remaining 800 cycles. The increase in the $ECSA_{Pt}$ for the initial 200 cycles between 0.6 and 1.3 $V_{RHE}$ is attributed to exposure of more Pt active sites during electrochemical cycling due to Ni-leaching, pore formation, and increase of surface roughness.

The high stabilities of the NiPt-200 and NiPt-300 catalysts that showed 116-122% of initial $ECSA_{Pt}$ after 1000 cycles supports that the unsupported metallic 2D nanoframes show excellent durability when cycled to elevated voltages.

Figure 19A:
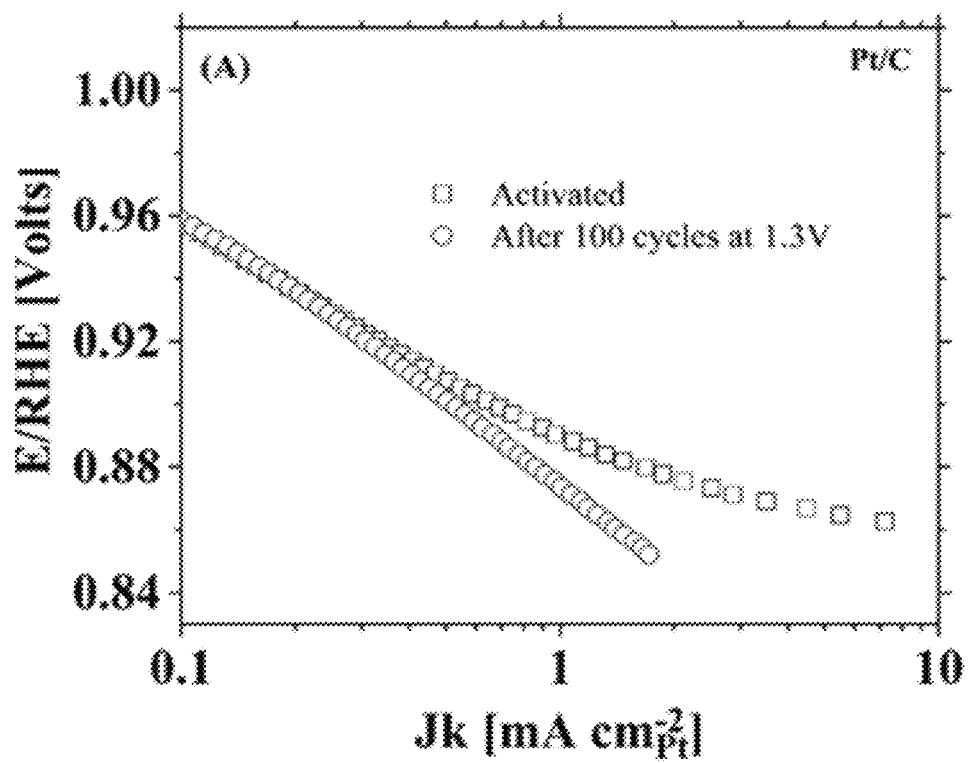
FIGS. 19A-C depict Tafel plots of specific activity vs. voltage for Pt/C (A), NiPt-200 (B) and NiPt-300 (C) for initial (activated) catalyst and after 1000 accelerated stability cycles; additional details of stability testing parameters are provided in the text.
Figure 19B:
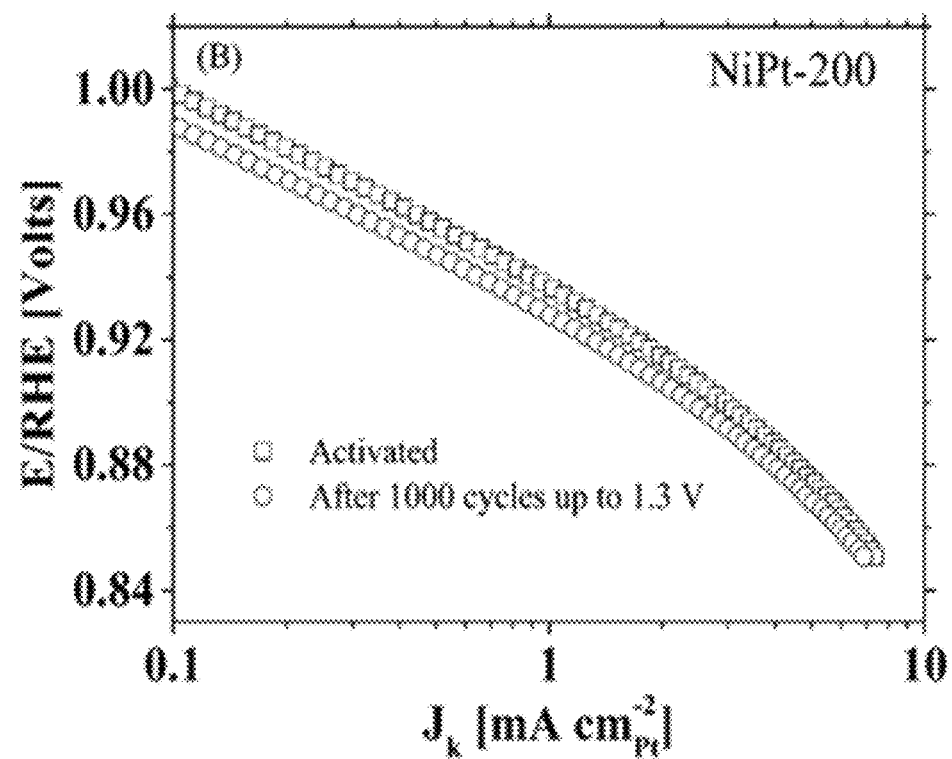
Figure 19C:
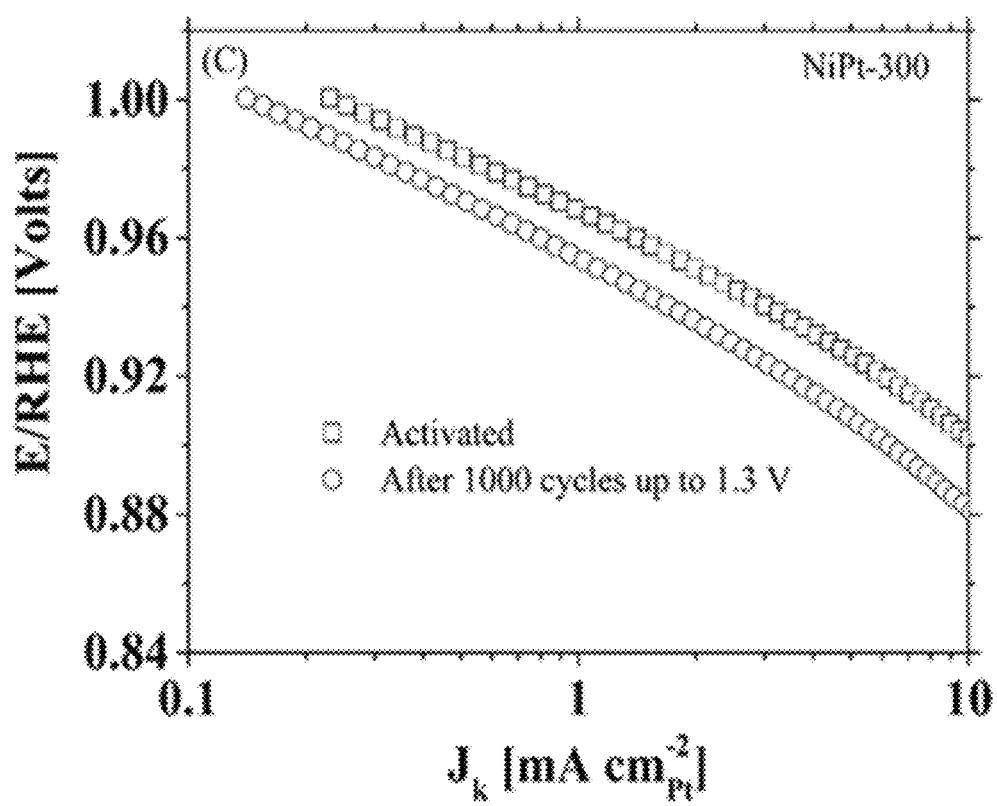

The specific activities of the catalysts after the accelerated stability testing were also evaluated (FIG. 8). As shown in FIG. 8D, the specific activities of the NiPt 2D nanoframes decreased slightly after the stability tests to 2.7±0.4 and 5.4±1.2 mA $cm_{Pt}^{-2}$ for NiPt-200 and NiPt-300 catalysts respectively, However the specific activities of NiPt 2D nanoframes after stability tests remained significantly higher than the specific activities of Pt/C. Tafel plots comparing the specific activities at the beginning of the stability tests (activated) and after the stability tests are presented in FIGS. 19A-C.

Platinum dissolution occurs over the potential region of oxygen reduction, and Pt dissolution rates depend on a number of factors including particle size, support interactions, upper potential limit, lower potential limit, electrolyte, scan rate, number of cycles, temperature, and catalyst loading.

To evaluate the contribution of Pt dissolution to the catalyst degradation over the accelerated stability tests, ICP-MS measurements of Pt remaining within the electrode and dissolved within the electrolyte after cycling were performed (Table 1). For Pt/C after the accelerated stability tests, only 49.6±11.0 wt % of Pt remained within the electrode, while a significant percentage of Pt (50.4±11.0%) was dissolved within the electrolyte. In contrast, for the Ni—Pt nanoframes Pt remained predominantly within the electrodes and a small amount of Pt was dissolved within the electrolyte. The NiPt 2D nanoframes showed 89.8±3.5 wt % and 96.0±1.6 wt % of Pt remained within the electrode after the stability tests for NiPt-200 and NiPt-300 catalysts respectively. Pt dissolution within the electrolyte over the same conditions was determined to be 10.2±3.5% and 4.0±1.6% wt Pt for the NiPt-200 and NiPt-300 catalysts respectively. In particular, the NiPt-300 catalysts showed a very low amount of dissolved Pt compared with Pt/C. The specific amount of Pt dissolved within the electrolyte was normalized over the total number of cycles and for the geometric area to allow for comparison. For Pt/C, Pt dissolution was determined from the accelerated stability tests to be 19.5±3.8 ng $cm^{-2}$ $cycle^{-1}$. Over the stability tests, NiPt-200 and NiPt-300 catalysts showed Pt dissolution rates of 3.6±1.0 and 2.1±1.0 ng $cm^{-2}$ $cycle^{-1}$ which were significantly lower (up to 9× lower for NiPt-300) compared to Pt/C tested under the same parameters. For the NiPt nanoframes it is possible that the initial increase in $ECSA_{Pt}$ over the initial 200 cycles of the stability test may involve a small amount of Pt dissolution which occurs along with partial removal of Ni. It is possible that either (i) dissolution is relatively steady over the stability cycles or (ii) there is a higher dissolution rate over the initial 200 cycles of the stability tests followed by a lower dissolution rate for subsequent cycles.

TABLE 1

Comparison of Pt content within the electrode and electrolyte after stability testing for Pt/C, NiPt-200, and NiPt-300 catalysts; Pt content was determined by ICP-MS analysis as discussed in the text.

| Catalyst Material | Mass Pt (µg), remaining in electrode | Mass Pt (µg), dissolved in electrolyte | % Pt (wt %), remaining in electrode | % Pt (wt %), dissolved in electrolyte | Pt dissolution rate ($ng_{Pt}$ $cm^{-2}$ $cycle^{-1}$) |
|---|---|---|---|---|---|
| Pt—C | 3.78 ± 0.93 | 3.82 ± 0.74 | 49.6 ± 11.0 | 50.4 ± 11.0 | 19.5 ± 3.8 |
| NiPt-200 | 6.34 ± 0.68 | 0.71 ± 0.20 | 89.8 ± 3.5 | 10.2 ± 3.5 | 3.6 ± 1.0 |
| NiPt-300 | 9.85 ± 0.64 | 0.42 ± 0.20 | 96.0 ± 1.6 | 4.0 ± 1.6 | 2.1 ± 1.0 |

The higher stability of the NiPt 2D nanoframe architecture compared with carbon-supported Pt and Pt—Ni alloys is attributed to (i) the carbon-free, unsupported 3D structural morphology that eliminates carbon corrosion, and (ii) the specific Pt environment within the integrated Ni—Pt structure that lowers Pt dissolution and influences Pt migration and agglomeration which are issues common for carbon-supported materials. In addition to the absence of carbon corrosion, the surface structure of the Ni—Pt nanoframes may contribute to enhanced stability.

In addition to high stabilities at elevated potentials, the NiPt-200 and NiPt-300 2D nanoframe catalysts show high specific activities The Pt—Ni 2D nanoframes provide high combined activity and stability, particularly for significant and important elevated voltage region where carbon-supported catalysts, even with very high activities can suffer significant degradation in performance.

This example demonstrates the synthesis, structure, and electrochemical properties of metallic 2D nanoframes which consist of a hierarchical 2D framework composed of a highly catalytically active Pt—Ni alloy phase and an interconnected pore network. A key aspect of the 2D nanoframe architecture is that the Pt—Ni alloy catalyst is integrated within a 3D porous network rather than having isolated particles within a carbon support matrix. The combination of the highly active Pt—Ni alloy and 3D network results in metallic 2D nanoframes that exhibit high ORR specific activities and high stabilities compared with Pt/C and function as ORR electrocatalysts without the addition of carbon within the electrode matrix.

Example 2

Material Synthesis

Chemicals.

Iridium chloride hydrate ($IrCl_3$, 99.8%), nickel nitrate hexahydrate ($Ni(NO_3)_2 \cdot 6H_2O$, 98%) and urea ($N_2COH_4$, 99.3%), were obtained from Alfa Aesar. Ethylene glycol, isopropanol (HPLC grade), and ACS grade water (≥18 MΩ-cm) were obtained from VWR Analytical. All reagents were used without further purification.

Synthesis of α-Ni(OH)$_2$ Nanosheets.

The α-Ni(OH)$_2$ nanosheets were synthesized using a microwave-assisted hydrothermal process. To prepare the α-Ni(OH)$_2$ nanosheets, 6.0 g (20.6 mmol) of $Ni(NO_3)_2 \cdot 6H_2O$ was combined with 4.92 g (82 mmol) of urea in 18 mL of ultrapure water (≥18 MΩ-cm) and 126 mL of ethylene glycol (EG). The solution was then divided into six aliquots (24 mL each) which were placed in a Discover SP Microware Reactor and then treated under variable microwave radiation power using a controlled temperature of 120° C. which was maintained for 13 minutes under active stirring. The obtained light green powder was recovered by centrifugation (1690 RCF, 3 min, Thermo, Sorvall ST16) and subsequently rinsed five times with water and two times with isopropanol using the same centrifuge conditions. Following the rinsing steps, the powder was dried under vacuum at 60° C. overnight.

Synthesis of NiO Nanosheets.

To prepare NiO nanosheets, 0.18 g of Ni(OH)$_2$ nanosheets were heated within a muffle furnace from room temperature to 300° C. for 90 minutes in ambient air using a ramp rate of 20° C./min. After the 90 minute dwell time, the sample was allowed to cool to room temperature, and then taken out from furnace.

Iridium-Decorated NiO Nanosheets (NiO:Ir).

The NiO nanosheets were decorated with Ir. To deposit Ir on the NiO nanosheets, 0.5 g of the prepared NiO was dispersed in 50 mL of ultrapure water using an ultrasonic bath. In a second beaker, 0.197 g of $IrCl_3 \cdot xH_2O$ (53.29 wt. % Ir), corresponding to 20.8 wt % of metallic Ir vs NiO, was dissolved in 50 mL of ultrapure water and then added to the NiO slurry. Additional water was then added to obtain a total volume of 125 mL. The suspension was separated into 25 mL aliquots which were transferred to the microwave reactor and then treated under variable microwave radiation power using a controlled temperature of 120° C. which was maintained for 13 minutes under active stirring. This process was repeated for each aliquot. Finally, a gray powder was recovered, rinsed, and dried as described above. The Ir-decorated NiO nanosheets were notated as NiO:Ir.

2D Ni—Ir Nanoframes.

The NiO:Ir catalyst was thermally treated at either 200° C. or 300° C. for 23 min under 120 mL $min^{-1}$ flowing $Ar/H_2$ (95/5 vol %) using a ramp rate of 20° C./min starting from room temperature. After 23 minutes dwell time, the reactor was removed from the oven and allowed to cool under $Ar/H_2$ flow until room temperature. The synthesized samples were notated as NiIr-200, and NiIr-300 for the samples heated to either 200° C. or 300° C. respectively.

Chemical Leaching.

In order to chemically leach out unstable nickel from the material, 0.2 g of the as-prepared NiIr nanoframes was dispersed in 100 mL of 0.05 M $HNO_3$. The solution was bubbled with Ar for 20 min then heated to 80° C. for 2 hours under stirring and under continuous Ar flow. After the reaction, the suspension was allowed to cool to room temperature. The chemically leached material was the recovered, rinsed, and dried as described above. The synthesized samples were notated as NiIr-200-CL, and NiIr-300-CL respectively. The wt % Ir and wt % Ni of NiIr-200-CL was determined by inductively coupled plasma atomic emission spectroscopy (ICP-AES) carried out by Galbraith Laboratories, Inc. (Knoxville, Tenn.). From ICP analysis, the NiIr- 200-CL catalyst was determined to be 65.5±1.1 wt % Ir and 18.0±0.6% Ni. For the NiIr-300-CL catalyst, the Ir and Ni content was determined from EDS analysis to be 51.0±14 wt % Ir and 23.0±7.4 wt % Ni.

Physical and Structural Characterization.

Powder X-ray diffraction (XRD) measurements were conducted using a Bruker AXS D8 Advance powder X-ray diffractometer with a Cu Kα ($\lambda$=1.5406 Å) radiation source, operating at 40 kV and 25 mA and a high resolution energy dispersive 1D Linxeye XE detector. The scan range of $2\theta$ was 5°<$2\theta$<85° with a 0.01° increment. Brunauer-Emmett-Teller (BET) surface areas were obtained from nitrogen adsorption/desorption isotherms measured using a Micromeritics ASAP 2020 surface area and porosimetry analyzer. Samples were degassed under vacuum at 120° C. for 16 h prior to characterization. Cumulative pore volumes and mean pore diameters were calculated from the adsorption isotherm representing the volume in pores between 1.7 and 300 nm using the Barrett-Joyner-Halenda (BJH) method (Micromeritics Microactive software, version 4.02).

The morphology and elemental distribution of the catalysts were determined by scanning electron microscopy (SEM) using a SEM FEI-Helios Nanolab 400. Cs-corrected scanning transmission electron microscopy (STEM) was carried out by using a JEM-ARM200F (200 kV, JEOL) equipped with an energy dispersive spectrometer (EDAX Silicon Drift detector). High angle annular dark field STEM (HAADF-STEM) was obtained with a convergence angle of 26 mrad and collection semiangles from 50 to 180 mrad. The probe size used was about 0.09 nm with the probe current of 22 pA.

Rotating Disk Electrochemical Characterization.

The electrochemical measurements were conducted at constant temperature (298 K) in a three-electrode cell using a thin-film rotating disk electrode (TF-RDE) configuration with an Autolab PGSTAT128N bipotentiostat and rotation control (Pine Instruments). Catalyst inks were prepared by combining a specific mass of the acid-leached catalysts (NiIr-200-CL or NiIr-300-CL) with a specific volume of a stock solution to yield a catalyst concentration of 0.35 $mg_{cat}$/mL. The stock solution was prepared by mixing 0.4 mL of Nafion suspension (Aldrich, 5 wt %, 1100 g equivalent weight), 20 mL of isopropanol, and 79.6 mL ultra-pure water (≥18 MΩ-cm). The inks were sonicated (Fisher, 40 kHz) in an ice-bath for 20 minutes, and then treated with a probe sonicator for 20 seconds. The ink was immersed in a controlled temperature bath (25° C.) for 1 minute while maintaining the agitation and then used immediately. For comparison with the synthesized catalysts, inks were also prepared with $IrO_2$ (Product number 43396) obtained from Alfa Aesar. For the $IrO_2$ the catalyst ink consisted of 0.4 $mg_{cat}$/mL (84 wt % Ir). The inks were applied to a polished Au working electrode (0.196 $cm^2$ geometric area) while under rotation (700 rpm). The electrode loading was controlled by depositing a specific volume of the ink onto the Au working electrode. For the NiIr-200-CL or NiIr-300-CL catalysts, 15 uL was deposited onto the Au electrode corresponding to a loading of 17.5 μg Ir $cm_{geo}^{-2}$ for NiIr-200-CL and 15.3 μg Ir $cm_{geo}^{-2}$ for NiIr-300-CL. After depositing the inks on the rotating Au electrode, the inks were maintained under rotation and allowed to dry under ambient conditions.

All electrochemical measurements were carried out in 0.1 M $HClO_4$ electrolyte prepared with 70% $HClO_4$ (Veritas Doubly Distilled, GFS Chemicals) (0.000001% Cl⁻) and ACS grade water (≥18 MΩ-cm). For the electrochemical tests, the Au working electrode was placed in a three-electrode cell with the 0.1 M $HClO_4$ electrolyte. A Pt mesh and a freshly prepared reversible hydrogen electrode (RHE) were used as counter and reference electrodes, respectively. The electrodes were immersed in Argon saturated 0.1 M $HClO_4$ under potential control (0.1 V/RHE). The electrochemical surface area (ECSA) of metallic Ir was calculated by CO-stripping using a specific charge of 358 μC $cm^{-2}$. The catalysts were electrochemically conditioned by cycling 60 times from 0.05-1.5 V/RHE at 100 mV/s.

For evaluating the oxygen evolution reaction activity, the electrode was then conditioned by cycling 10 times in the potential range 1.2-1.8 $V_{RHE}$ at 100 mV/s and 1600 rpm. Following this, the electrochemical activity was determined by linear sweep voltammetry (LSV) in the potential range of 1.2-1.8 $V_{RHE}$ using a scan rate of 20 mV $s^{-1}$ and a rotation rate of 1600 rpm. The mass-normalized OER activity was determined by the current at a specific voltage divided by the Ir mass on the electrode. Inspection of the Tafel plots for linear behavior within specific voltage ranges was used to evaluate that the electrode was not within a mass-transport limited regime within the specific voltage range. Following the measurements of the OER activity, an accelerated durability test was carried out by maintaining the electrode at a constant potential of 1.6 $V_{RHE}$ for 13.5 hours under a rotation rate of 1600 rpm. After the constant potential step was completed, the electrolyte was replaced, and LSV and cyclic voltammetry (CV) measurements were obtained as described above. During LSV and potentiostatic tests, to account for solution resistance the internal resistance was corrected by the potentiostat using a resistance of 25Ω.

Synthesis Description

Ni—Ir 2D nanoframes (or catalyst nanoarchitectures) were synthesized by (i) formation of $Ni(OH)_2$ nanosheets; (ii) thermal treatment in air to form NiO nanosheets, (iii) deposition of Ir onto the NiO nanosheets, and (iv) controlled temperature/atmosphere treatments (either 200° C. or 300° C.) under reducing conditions ($H_2$/Ar, 5/95 vol %), and a chemical leaching step in nitric acid (0.05 M $HNO_3$ at 80° C. during 2 h under Ar atmosphere) (FIG. 20A). After depositing Ir onto the NiO nanosheets, thermal treatment under reducing conditions was performed to facilitate direct interaction of the Ir supported on NiO nanosheets into an integrated metallic Ni—Ir phase with direct Ir—Ni interaction. The effect of the transformation temperature (either 200° C. or 300° C.) on the structure and resulting electrochemical properties was investigated. The chemical leaching step was performed to remove unstable non-noble metals within the structure. The samples are noted as NiO (NiO nanosheets), NiO:Ir (Ir-decorated NiO nanosheets), NiIr-200 (NiO:Ir treated at 200° C. under $H_2$/Ar), NiIr-300 (NiO:Ir treated at 300° C. under $H_2$/Ar), NiIr-200-CL (NiIr-200 after chemical leaching), and NiIr-300-CL (NiIr-300 after chemical leaching).

Scanning Electron Microscopy Characterization.

Figure 22:
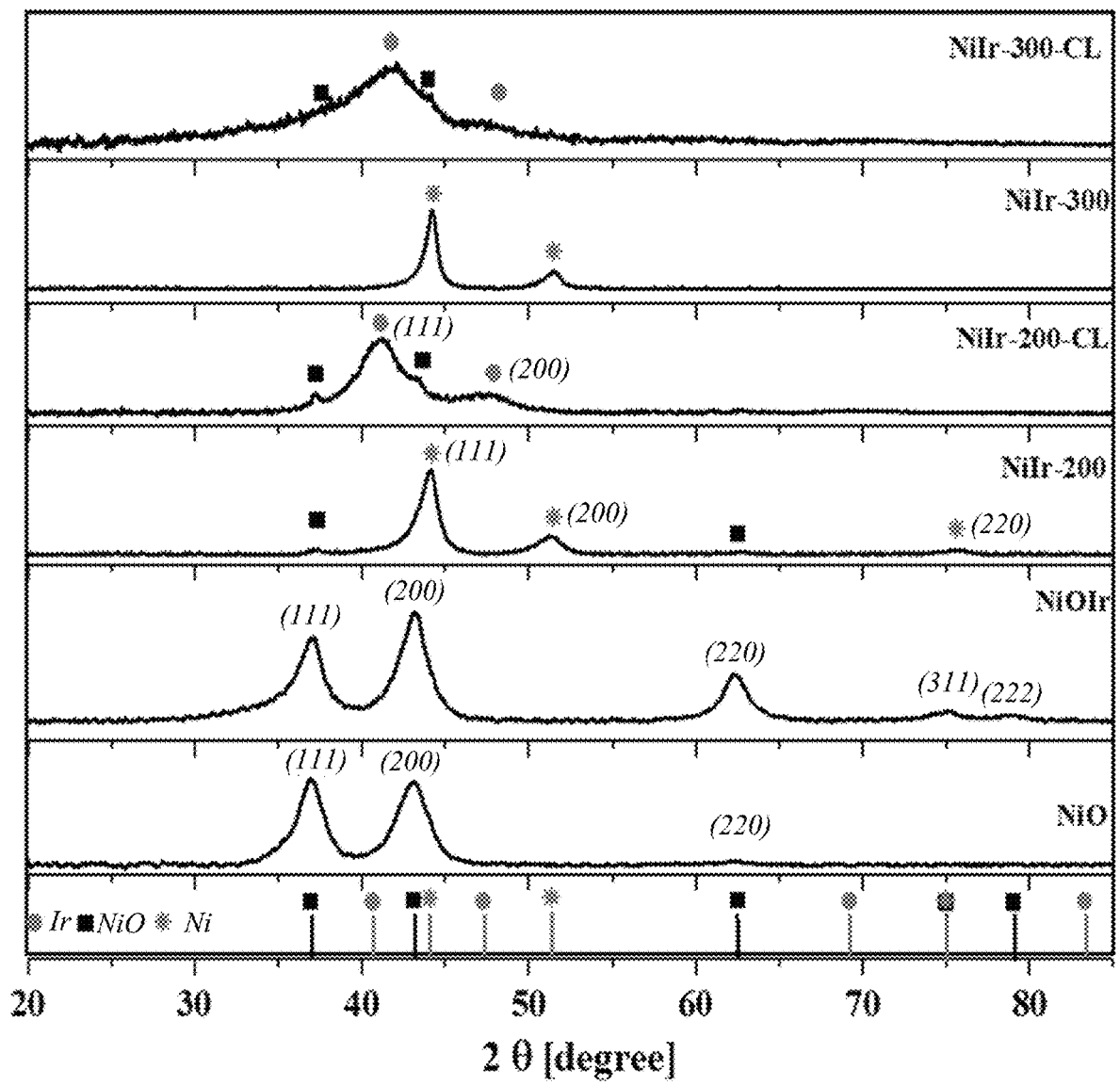
FIG. 22 depicts X-ray diffraction (XRD) of NiOx nanosheets, NiIr nanoframes, and their corresponding references.

The $Ni(OH)_2$ nanosheets were synthesized using a microwave-assisted process and showed a nanosheet structure from the Scanning electron microscopy (SEM) image and the X-ray diffraction (XRD) pattern which was consistent with the α-$Ni(OH)_2$ phase (FIG. 22). After thermal treatment in air, the α-$Ni(OH)_2$ nanosheets were transformed to NiO phase (as supported by analysis from XRD, as discussed below) and the nanosheet structure was retained with lateral sizes of ~1 μm (FIG. 20B). After Ir deposition, the NiO:Ir sample still exhibited the presence of nanosheets with similar lateral dimensions as observed within NiO (FIG. 20C).

A particularly important attribute of this material is that the structure is an interconnected solid network (rather than separate particles) and an interconnected pore network as observed within the SEM images (FIGS. 20D-E). After chemical leaching, the NiIr-200-CL, and NiIr-300-CL samples maintain the interconnected network structure (FIGS. 20F-G), however as discussed below significant structural changes are observed after the chemical leaching step. After chemical leaching, the elemental composition of NiIr-200-CL was determined to be 65.5±1.1 wt % Ir and 18.0±0.6% Ni from ICP analysis.

X-Ray Diffraction Characterization

The X-ray diffraction patterns (XRD) of NiO nanosheets as well as NiO:Ir and integrated 2D-NiIr structures treated at different temperatures (i.e. 200 and 300° C.), are shown in FIG. 22. All diffraction patters were indexed to the face-centered cubic (FCC) phase. The XRD pattern for the NiO nanosheets shows reflections at 2θ values of 36.82°, 42.98° corresponding to the (111) and (200) diffraction planes of NiO. After the iridium deposition onto the NiO nanosheets, a clear modification of the NiO structure was observed; in addition to peaks at 2θ values of 36.81° and ~43.9° associated to lattice planes (111) and (200), reflections at 2θ values 62.31°, 74.91° and 78.8°, corresponding to the planes (220), (311) and (222) were observed, but no clearly evident peaks that correspond to metallic iridium or iridium oxide were observed. However, the presence of Ir within the NiO:Ir sample was evident for EDS mapping (FIG. 21). The Ir may be present as small clusters rather than highly ordered nanoparticles. After thermal treatment under a $H_2$ atmosphere, significant structural modifications were observed in the XRD patterns. The thermally treated samples showed two main XRD peaks at 2θ values of 43.98° and 51.09° for NiIr-200 and 44.09° and 51.33° for NiIr-300 corresponding to the (111) and (200) planes of metallic Ni. The 2θ values were slightly lowered compared with values for a pure metallic Ni phase (2θ values of 44.34° and 51.67°) which is consistent with the incorporation of Ir within the structure and the formation of a Ni-rich Ni—Ir solid solution. In addition, NiIr-200 shows the presence of NiO (111) and (220) peaks at small relative intensities indicating the presence of a NiO phase remains. For the sample heated to 300° C., Nib-300, no reflections due to NiO are observed. After the chemical leaching step, significant changes were observed within the XRD patterns. Within the XRD patterns of NiIr-200-CL and NiIr-300-CL peaks due to metallic nickel were no longer observed, but peaks with peak positions that were in the range of metallic Ir were now present. The peak positions were shifted to higher 2θ values compared with pure metallic Ir which is consistent with the presence of Ni within the structure and the formation of a Ir-rich Ir—Ni solid solution with results in contraction of the Ir lattice due to the interaction with Ni These observations suggest that a significant percentage of Ni is leached out the chemical leaching step, however some Ni remains within the structure, which is consistent with EDS and ICP data.

Structure and Morphology from Scanning Electron Microscopy

Scanning transmission electron microscopy (STEM) was used to characterize the morphology and structural of the Mk catalysts. The STEM image of the NiIr-200 sample prior to chemical leaching shows the interconnected network of nanoparticles and lattice fringes of small domains. Both Z contrast imaging (Ir shows up brighter than Ni) and EDS mapping show a distribution of Ir and Ni within the structure at the atomic level (FIGS. 23A-D).

Cyclic Voltammetry and Carbon Monoxide Stripping Analysis

Figures 24A, 24B, 24C:
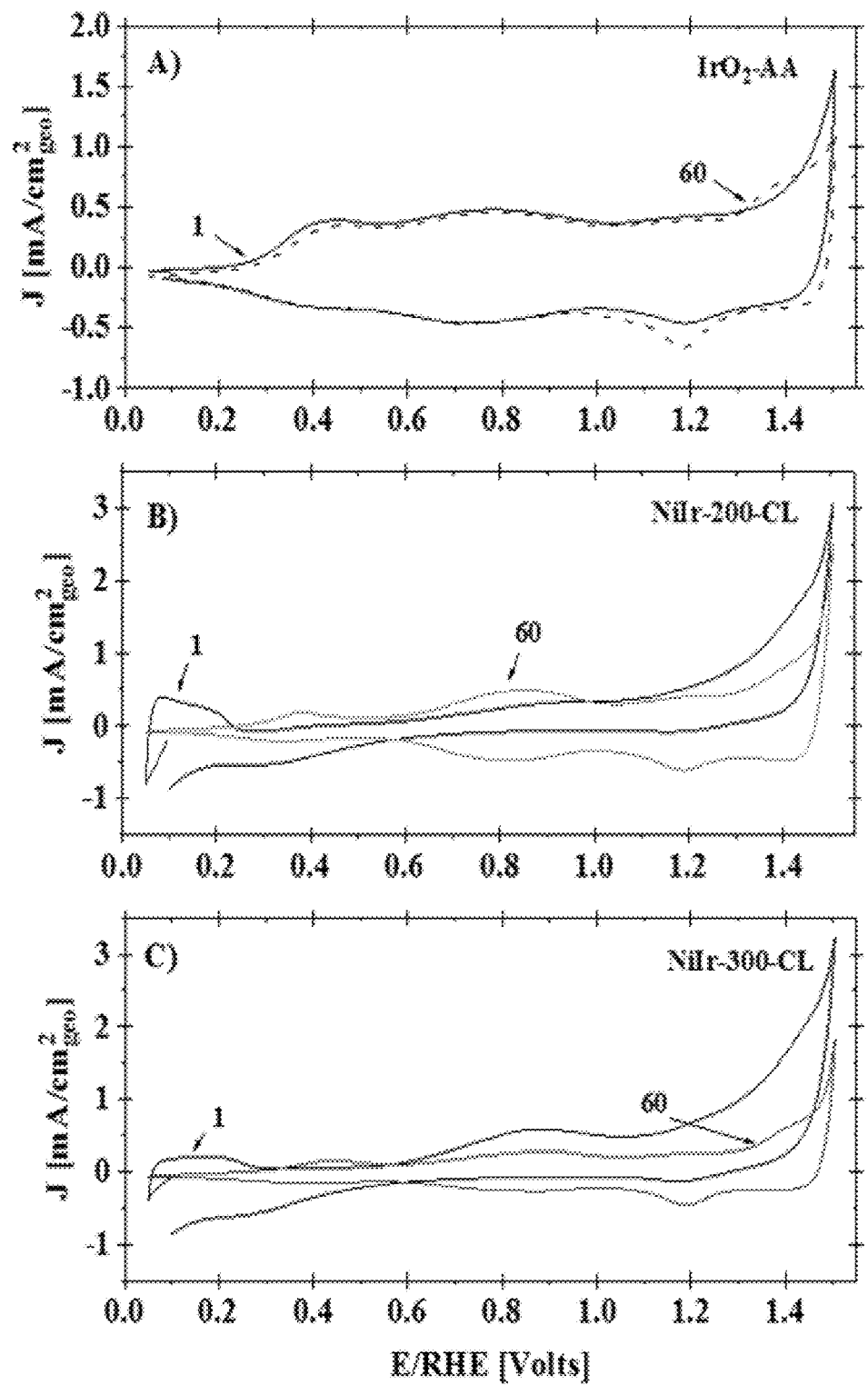
FIGS. 24A-F depict Cyclic voltammetry before (A-C) and after electrochemical condition step (D-F) for $IrO_2$, NiIr-200-CL, and NiIr-300-CL.
Figure 24D:
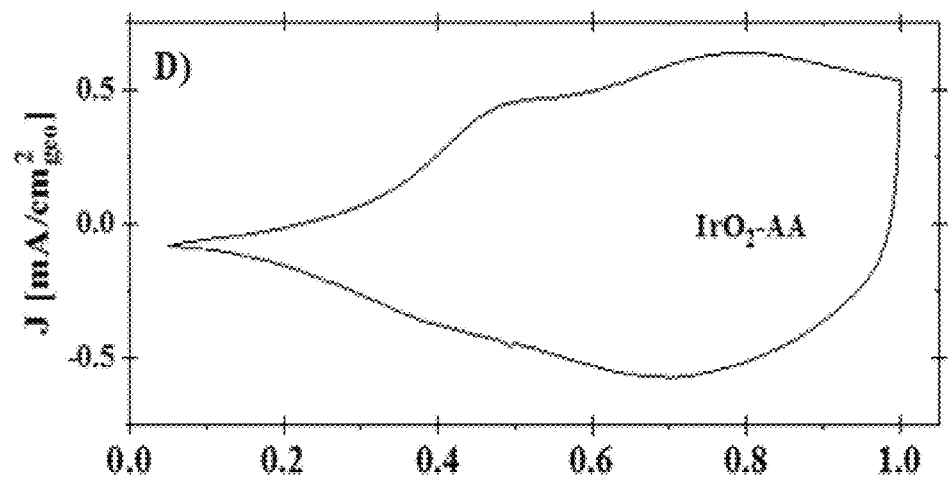
Figure 24E:
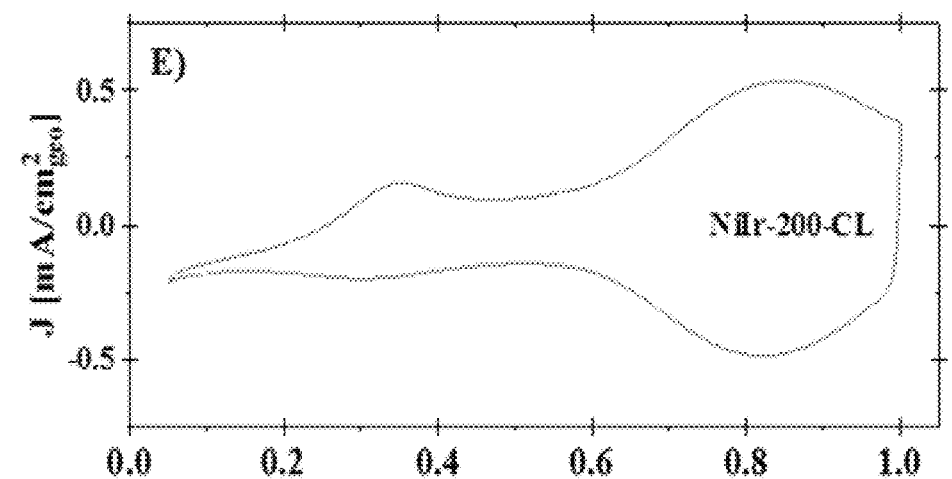
Figure 24F:
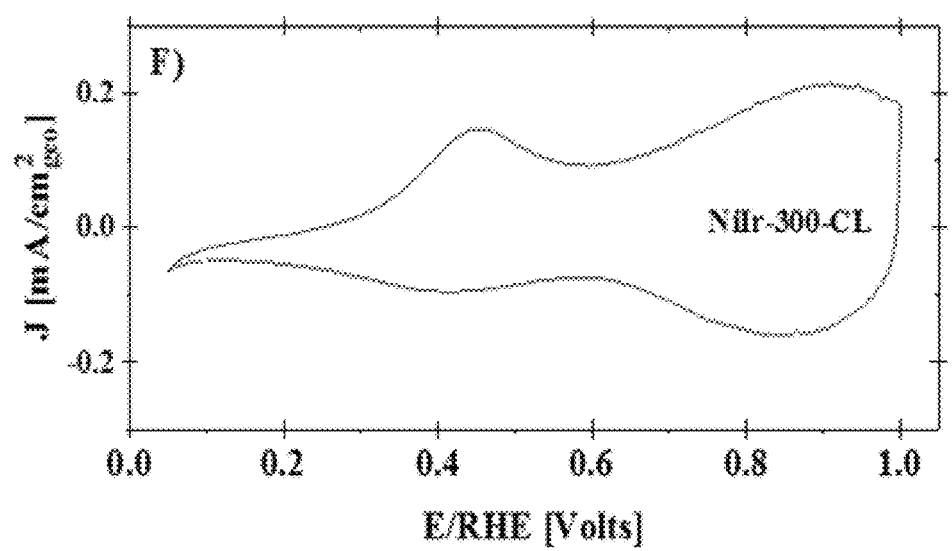

The NiIr-200-CL and Ni—Ir-300-CL catalysts were first electrochemically conditioned by cycling the electrodes from 0.05 to 1.5 $V_{RHE}$ for 60 cycles. The first CV scan of both NiIr-200-CL and Ni—Ir-300-CL (FIGS. 24A,B) shows the presence of Hupd features at low potentials that are consistent with hydrogen adsorption/desorption on metallic Ir. The presence of metallic Ir is also supported by the XRD patterns of these samples (FIG. 22). Following successive CV scans from 0.05 to 1.5 $V_{RHE}$, peaks attributed to iridium oxide/hydroxide appeared and the Hupd features were no longer present after 60 cycles for both the NiIr-200-CL and Ni—Ir-300-CL samples. The changes support that a surface oxide/hydroxide layer is formed by the electrochemically conditioning step. As shown in FIGS. 24A-C, after the electrochemical conditioning step, the samples showed anodic peaks centered at ~0.35 and ~0.82 $V_{RHE}$ which are assigned to the oxidation of Ir within different surface structures. The low potential peaks in the CVs of NiIr-200-CL and Ni—Ir-300-CL are not clearly observed in $IrO_2$ nanoparticles and may be related to an Ir hydroxide (Ir—OH) structure formed at the surface. Based on this observation, the higher potential feature observed within the CV is attributed to oxidation of $Ir^{3+}$ within an oxide structure (Ir—O) and the lower potential feature observed within the CV is attributed to oxidation of $Ir^{3+}$ within a hydroxide structure (Ir—OH). It is possible the peaks are significantly shifted to lower potentials by the interaction of Ir with Ni. After electrochemical conditioning, the significant relative peak current of the low potential feature within the CVs of the Ni—Ir 2D nanoframes supports the presence of Ir—OH in addition to the presence of Ir—O surface species.

Oxygen Evolution Activity Measurements.

Figure 25A:
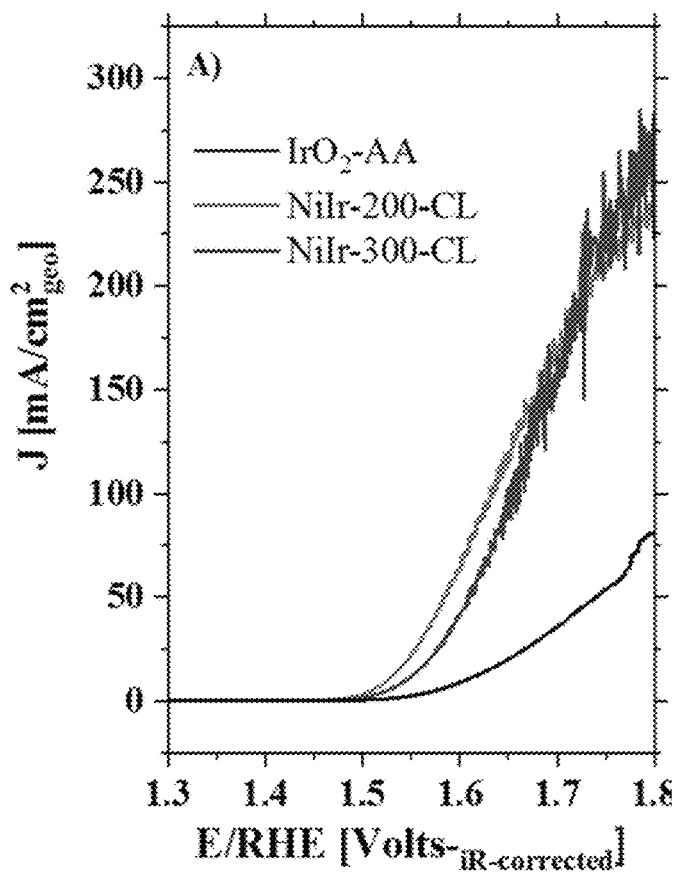
FIGS. 25A-B depict (A) voltametry in the oxygen evolution reaction (OER) region obtained in Ar-saturated 0.1 M $HClO_4$. Scan rate 20 mV/s at 1600 rpm. The plots are normalized respect to electrode geometric area; (B) Tafel plots.
Figure 25B:
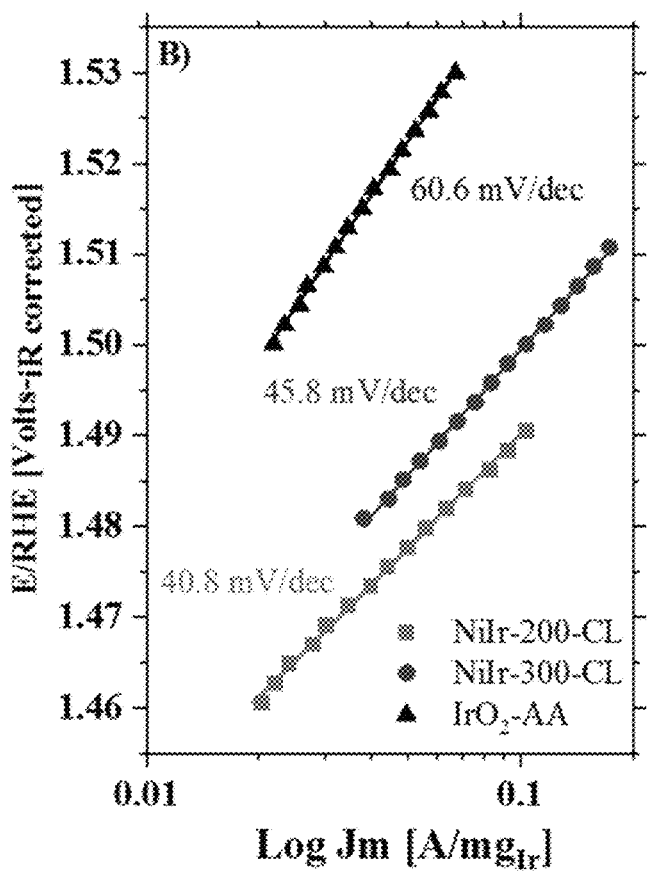
Figure 26A:
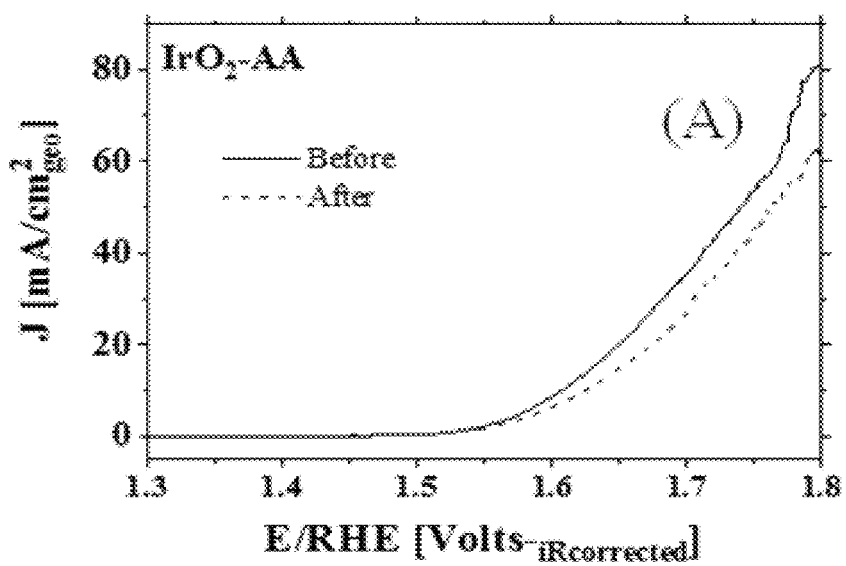
FIGS. 26A-I depict comparison of voltammetry in the oxygen evolution reaction (OER) before and after accelerated durability testing; Cyclic voltammetry before and after accelerated durability testing; Tafel slopes before and after accelerated durability testing; (A-C) $IrO_2$; (D-F) NiIr-200-CL; (G-I) NiIr-300-CL.
Figure 26B:
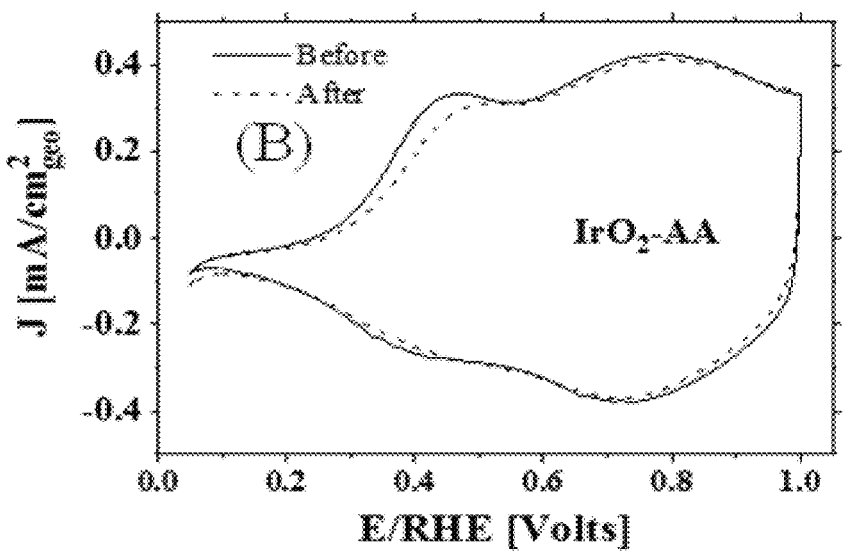
Figure 26C:
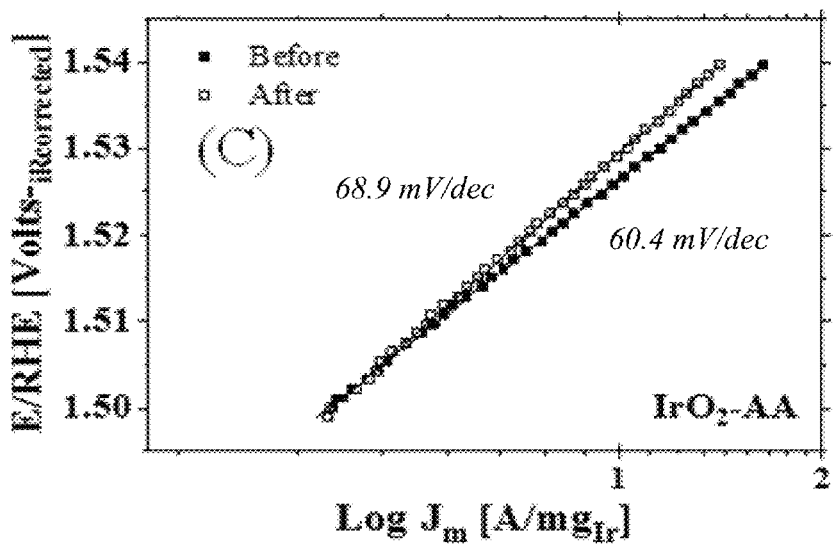
Figure 26D:
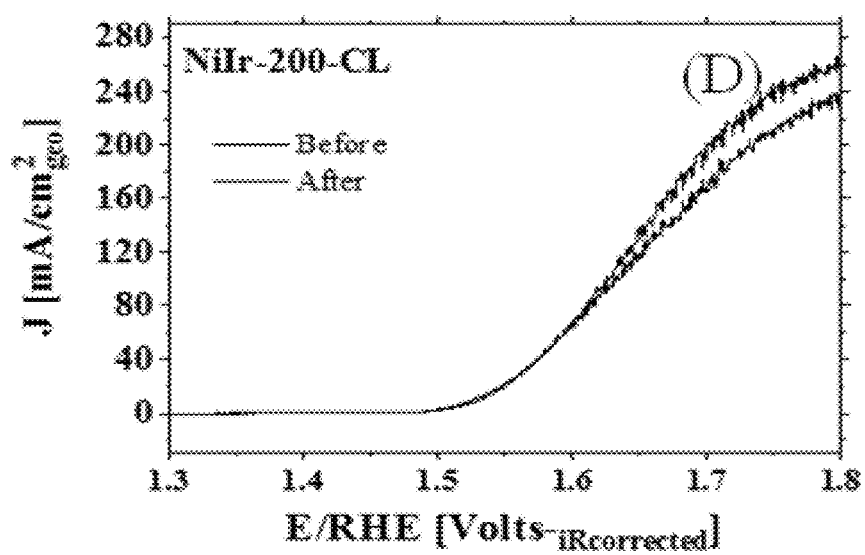
Figure 26E:
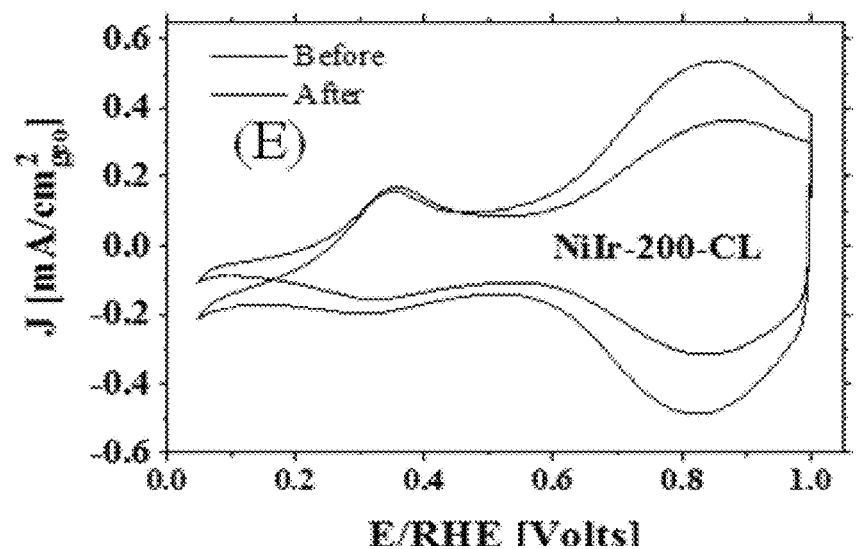
Figure 26F:
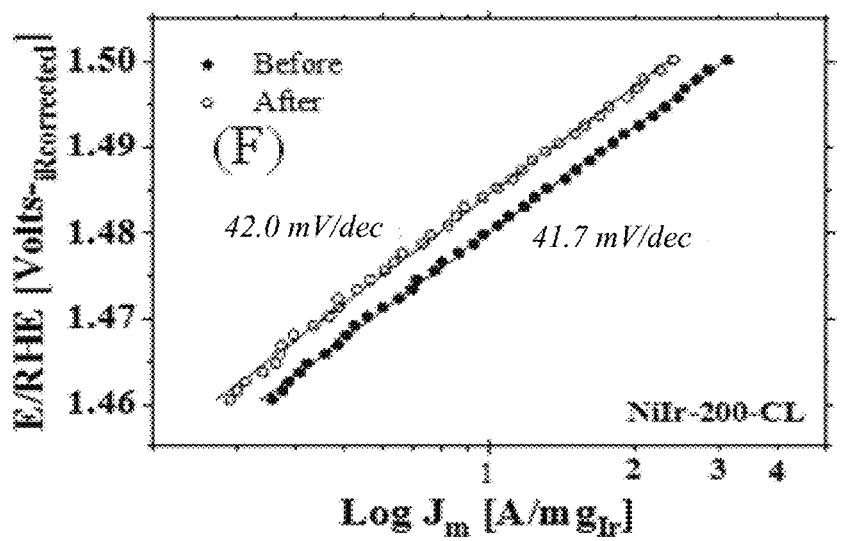
Figure 26G:
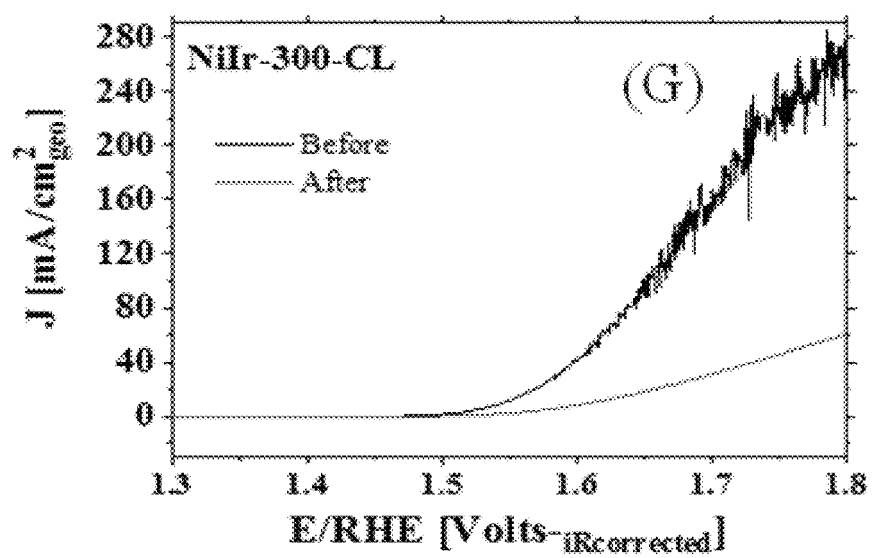
Figure 26H:
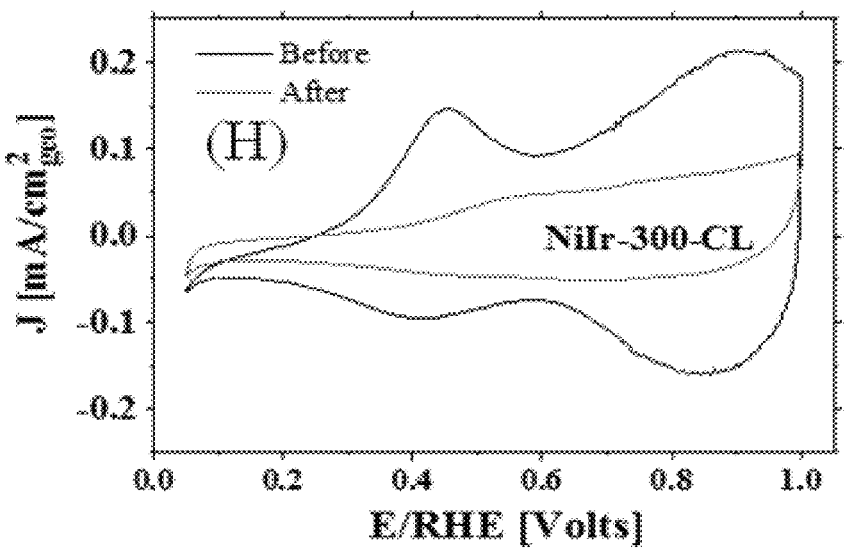
Figure 26I:
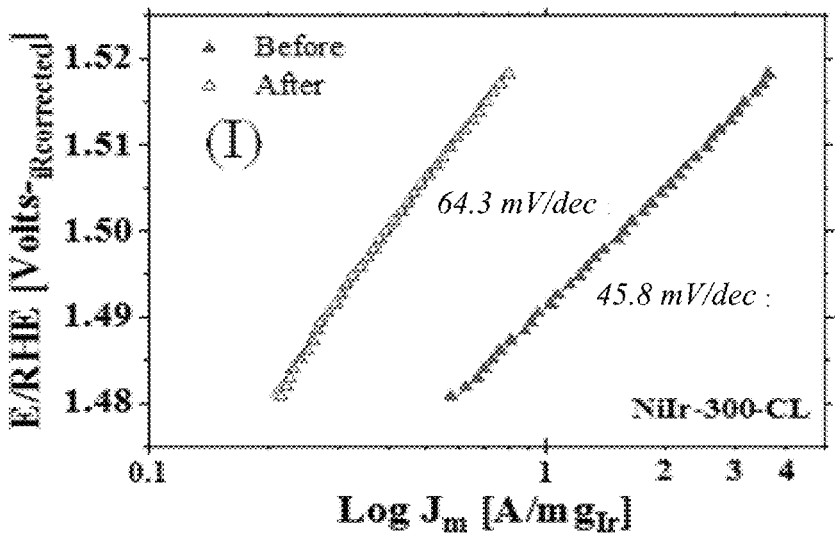

Following the electrochemical condition step and CV measurements, the materials were electrochemically tested for OER using a rotating disc electrode (RDE) configuration at 1600 rpm in 0.1 M $HClO_4$. For reference, the catalysts were compared with the OER activity of a commercial $IrO_2$ sample. The NiIr-200-CL exhibited significantly higher current than the Ni—Ir-300-CL or commercial $IrO_2$ material, with current normalized based on geometric area of the electrode disk (FIG. 25A). To evaluate the mass activity (A $g_{Ir}^{-1}$), currents were determined at both 1.5 and 1.55 $V_{RHE(IR-corrected)}$. However, the Tafel plots shows that the current deviates from linear behavior at 1.55 V which supports that this voltage region is still mass-transport limited and not just controlled by the reaction kinetics. The mass-normalized activities of the NiIr-200-CL, Ni—Ir-300-CL, and $IrO_2$ are shown in Table 2. The catalysts had similar Ir loadings. As shown in Table 2, the NiIr-200-CL catalyst showed significantly higher mass activity than the Ni—Ir-300-CL or the commercial $IrO_2$ catalyst. The significantly higher mass activity of NiIr-200-CL compared with $IrO_2$ is attributed to the interaction of Ir with Ni within the mixed oxide/hydroxide nanoarchitecture. The Tafel slope has been shown to be strongly correlated with the reaction mechanism, and generally a lower Tafel slope value corresponds to higher activity. For $IrO_2$, the Tafel slope in the kinetic region was determined to be 60.8 mV/decade (FIG. 25B). The NiIr-200-CL catalyst showed a Tafel slope of 40.8 and the Ni—Ir-300-CL catalyst showed a Tafel slope of 45.8 mV/decade (FIG. 25B) which supports that the OER activation energy is lower on the Ni—Ir 2D nanoframe catalysts than on $IrO_2$.

TABLE 2

Comparison of oxygen evolution activity for NiIr-200-CL, Ni—Ir-300-CL and IrO$_2$.

| | | Initial | | | After Durability Testing | | | Final/ |
|---|---|---|---|---|---|---|---|---|
| Sample | Loading ($\mu g_{Ir}$ cm$^{-2}_{geo}$) | $I_{geo}^{1.55\ V}$ (mA cm$^{-2}_{geo}$) | $I_m^{1.55\ V}$ (A $g_{Ir}^{-1}$) | $I_m^{1.50\ V}$ (A $g_{Ir}^{-1}$) | $I_{geo}^{1.55\ V}$ (mA cm$^{-2}_{geo}$) | $I_m^{1.55\ V}$ (A $g_{Ir}^{-1}$) | $I_m^{1.50\ V}$ (A $g_{Ir}^{-1}$) | Initial (%)* |
| NiIr-200-CL | 17.5 | 22.6 | 1290 | 180 | 14.32 | 820 | 120 | 66% |
| NiIr-300-CL | 15.3 | 11.8 | 550 | 112 | 2.45 | 210 | 10 | 27% |
| IrO$_2$-AA | 17.2 | 2.34 | 136 | 28 | 1.95 | 113 | 22 | 83% |

*Final/initial mass activity at 1.55 $V_{RHE}$, with the final value taken after the accelerated durability testing.

Evaluation of Oxygen Evolution Reaction Electrocatalyst Stability.

The stability of the catalyst is a particularly important parameter to evaluate since catalyst degradation will significantly reduce the lifetime of an electrolyzer which is a critical metric. An accelerated durability test (ADT) using a constant potential of 1.6 V for 13.5 hours was used. Shown in FIGS. 26A-I are comparisons of the linear sweep voltammetry in the OER region, CVs, and Tafel slopes of the IrO$_2$ catalyst, NiIr-200-CL, Ni—Ir-300-CL, before and after the durability testing. The comparison of the OER mass activities at 1.55 $V_{RHE}$ as well as the percent change (from initial to final) are presented in Table 2. The IrO$_2$ sample showed some degradation in the OER current. The CVs and the Tafel slopes of the IrO$_2$ sample showed small but minor changes after the durability test. The NiIr-200-CL catalyst exhibited a relative stability of 66% after the durability tests indicating a stability in the range of IrO$_2$. The CVs showed similar features before and after the accelerated durability test. Notably, the higher potential peak in the CV decreased in relative area, however the lower potential peak maintained a similar peak area which suggests that the lower potential (hydroxide) peak was highly stable and degradation may result from the oxide peak. The Tafel slopes remained similar suggesting the reaction mechanism was similar before and after the durability test. For the NiIr-300-CL sample, significant degradation occurred over the durability test. The OER current and mass activity significantly decreased, the peak currents within the CV were also significantly decreased, and the Tafel slope dramatically increased from ~46 mV/decade to ~64 mV/decade, which is in the range of that of IrO$_2$.

For Ni—Pt 2D nanoframes for ORR catalysts, heating to 300° C. resulted in higher activity than heating to 200° C. However, in the case of Ni—Ir 2D nanoframes used for OER catalysts, higher temperature treatments resulted in lower activity and stability. It is possible that higher temperature treatment results in a metallic Ir-rich surface with subsurface Ni. The elemental composition (from EDS) showed higher amounts of Ni were present for 300° C. compared with 200° C. which may result from a protective Ir shell that stabilizes Ni from dissolution. However for the 200° C. sample, the specific interaction of Ir with Ni and the presence of higher amounts of oxide within the structure may contribute to higher OER activity and stability.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of forming a catalytic structure, comprising:
heating the combination of a non-catalytic metal compound that is within a first architecture, comprising a network composed of interconnected solid domains and porosity, and a catalytic metal within a specified temperature range and atmosphere, wherein the specified temperature range ranges from 150 to 350 degrees Celsius, and wherein the first architecture is formed from a non-catalytic metal moiety and nonmetallic moieties of the non-catalytic metal compound;
transforming the first architecture composed of the non-catalytic metal compound and the catalytic metal to a second architecture comprising openings in the second architecture, wherein the second architecture does not comprise carbon, and wherein the first and the second architecture comprises a two-dimensional architecture consisting of nanosheets;
resulting in interaction of the catalytic metal with the non-catalytic metal within an integrated network of domains within the second architecture; and
increasing a catalytic activity or stability of the catalytic metal by interaction of the catalytic metal with the non-catalytic metal within the second architecture.

2. The method of claim 1, wherein the nanosheets comprise thicknesses of less than 20 nm and thickness to lateral dimensions (width or length) ratios of at least 4.

3. The method of claim 1, further comprising heating the combination of non-catalytic metal compound and a catalytic metal within a hydrogen-containing atmosphere.

4. The method of claim 1, further comprising heating the combination of non-catalytic metal compound and a catalytic metal within an ammonia-containing atmosphere.

5. The method of claim 1, wherein the network is composed of interconnected solid domains with at least one dimension of at least 100 nm.

6. The method of claim 1, wherein the network is composed of pores with dimensions of at least 2 nm.

7. The method of claim 1, wherein the specified temperature range ranges from 150 to 250 degrees Celsius.

8. The method of claim 1, wherein the non-catalytic metal compound contains nickel, cobalt, iron, manganese, chromium, vanadium, copper, zinc, zirconium, niobium, molybdenum, indium, tin, tantalum, tungsten, aluminum or gallium, lead or bismuth.

9. The method of claim 1, wherein the non-catalytic metal compound comprises a combination of more than one transitional metal including nickel, cobalt, iron, manganese, chromium, vanadium, copper, zinc, zirconium, niobium, molybdenum, indium, tin, tantalum, tungsten, aluminum or gallium, lead or bismuth.

10. The method of claim 1, wherein the non-catalytic metal compound comprises a metal hydroxide.

11. The method of claim 1, wherein the non-catalytic metal compound comprises a nickel hydroxide or cobalt hydroxide.

12. The method of claim 1, wherein the non-catalytic metal compound comprises a metal oxide.

13. The method of claim 1, wherein the non-catalytic metal compound comprises a nickel oxide or cobalt oxide.

14. The method of claim 1, wherein the non-catalytic metal compound comprises a metal oxyhydroxide.

15. The method of claim 1, wherein the catalytic metal comprises platinum, iridium, osmium, gold, silver, palladium, rhodium, or ruthenium.

16. The method of claim 1, wherein the non-catalytic metal compound is combined with more than one catalytic metal comprising platinum, iridium, osmium, gold, silver, palladium, rhodium, or ruthenium.

17. The method of claim 1, further utilizing chemical leaching to remove unstable metals within the second architecture.

18. The method of claim 1, further utilizing a second temperature/atmosphere treatment step to modify the second architecture.

19. The method of claim 1, further utilizing an electrochemical treatment step to modify the second architecture.

* * * * *